US012804379B2

(12) United States Patent
Eldar et al.

(10) Patent No.: US 12,804,379 B2
(45) Date of Patent: Nov. 17, 2026

(54) INTERFACE FOR DIGITAL OPERATOR PLATFORM

(71) Applicant: Boost SubscriberCo L.L.C., Englewood, CO (US)

(72) Inventors: Eran Eldar, Littleton, CO (US); Robert Bennett, Castle Rock, CO (US); Yaolin Daniel Wu, Arvada, CO (US); Kara Rector, Denver, CO (US); Haoyang Li, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 311 days.

(21) Appl. No.: 18/595,194

(22) Filed: Mar. 4, 2024

(65) Prior Publication Data

US 2025/0280284 A1 Sep. 4, 2025

(51) Int. Cl.
*H04W 8/18* (2009.01)
*H04W 4/50* (2018.01)

(52) U.S. Cl.
CPC ............... *H04W 8/18* (2013.01); *H04W 4/50* (2018.02)

(58) Field of Classification Search
CPC .................................. H04W 8/18; H04W 4/50
USPC ...................................... 455/418, 403, 550.1
See application file for complete search history.

(56) References Cited

U.S. PATENT DOCUMENTS 4,423,287 A 12/1983 Zeidler
6,073,139 A 6/2000 Jain et al.
6,832,089 B2 12/2004 Jean Henry-Labordere
7,631,331 B2 12/2009 Sie et al.
7,877,511 B1 1/2011 Berger et al.
(Continued)

FOREIGN PATENT DOCUMENTS

CN 102143474 A 8/2011
CN 111970686 A 11/2020
(Continued)

OTHER PUBLICATIONS

Analysis On the Awareness and Effect of Mobile Number Portability in Aizawl, Mizoram. Francis Lalmuansanga. (Year: 2022).
(Continued)

*Primary Examiner* — Juan A Torres
(74) *Attorney, Agent, or Firm* — Kipman T. Werking; Frontier IP Law PLLC

(57) ABSTRACT

A method may include (i) receiving, by a mobile virtual network operator from a client of the mobile virtual network operator, a request to perform a task relating to a telecommunication account of the client with the mobile virtual network operator, (ii) forwarding, by the mobile virtual network operator, the request to perform the task to a mobile virtual network enabler by referencing a first client identifier that the mobile virtual network enabler assigned to the telecommunication account, (iii) mapping, by the mobile virtual network operator, the first client identifier that the mobile virtual network enabler assigned to the telecommunication account onto a second client identifier that the mobile virtual network operator assigned to the telecommunication account and that is distinct from the first client identifier, and (iv) reporting that the task has been completed.

20 Claims, 31 Drawing Sheets

(56) References Cited

U.S. PATENT DOCUMENTS

| | | | |
|---|---|---|---|
| 7,958,029 | B1 | 6/2011 | Bobich et al. |
| 8,516,119 | B2 | 8/2013 | Banger et al. |
| 8,855,107 | B1 | 10/2014 | Kirchhoff et al. |
| 9,106,606 | B1 | 8/2015 | Hasson et al. |
| 9,369,544 | B1 | 6/2016 | Morgan et al. |
| 9,661,380 | B2 | 5/2017 | Major et al. |
| 9,763,093 | B2 | 9/2017 | Richards et al. |
| 9,848,249 | B2 | 12/2017 | Freed et al. |
| 10,171,514 | B2 | 1/2019 | Ramachandran et al. |
| 10,334,428 | B1 | 6/2019 | Chen et al. |
| 10,638,310 | B2 | 4/2020 | Subramaniam |
| 10,645,196 | B1 | 5/2020 | Sharipov et al. |
| 10,708,759 | B1 | 7/2020 | Roy et al. |
| 10,716,021 | B1 | 7/2020 | Peden et al. |
| 10,945,048 | B2 | 3/2021 | Major et al. |
| 11,082,839 | B2 | 8/2021 | Jacobson et al. |
| 11,172,269 | B2 | 11/2021 | Major |
| 11,178,215 | B1 | 11/2021 | Kaukl et al. |
| 11,178,469 | B2 | 11/2021 | Major |
| 11,533,611 | B2 | 12/2022 | Berard et al. |
| 11,632,714 | B2 | 4/2023 | Opsenica et al. |
| 11,641,579 | B1 | 5/2023 | Mukherjee et al. |
| 12,602,354 | B1 | 4/2026 | Camp et al. |
| 2002/0177438 | A1 | 11/2002 | Sakai et al. |
| 2003/0093709 | A1 | 5/2003 | Ogawa et al. |
| 2005/0079855 | A1 | 4/2005 | Jethi et al. |
| 2005/0192035 | A1 | 9/2005 | Jiang |
| 2007/0155382 | A1 | 7/2007 | Jiang |
| 2007/0174491 | A1 | 7/2007 | Still et al. |
| 2007/0191011 | A1 | 8/2007 | Jiang |
| 2007/0192772 | A1 | 8/2007 | De Bonet |
| 2007/0201361 | A1 | 8/2007 | Kumar et al. |
| 2007/0203880 | A1 | 8/2007 | Kumar et al. |
| 2008/0085707 | A1 | 4/2008 | Fadell |
| 2008/0092150 | A1 | 4/2008 | Jethi et al. |
| 2008/0132226 | A1 | 6/2008 | Carnall |
| 2008/0167853 | A1 | 7/2008 | Fernsler et al. |
| 2008/0176535 | A1* | 7/2008 | Cai .................... H04M 15/00 455/414.1 |
| 2008/0216157 | A1 | 9/2008 | Huuhtanen et al. |
| 2008/0260161 | A1 | 10/2008 | Yokota et al. |
| 2009/0017809 | A1 | 1/2009 | Jethi et al. |
| 2009/0077201 | A1 | 3/2009 | Nakamura et al. |
| 2009/0077580 | A1 | 3/2009 | Konig et al. |
| 2009/0086726 | A1 | 4/2009 | Savage et al. |
| 2009/0191857 | A1 | 7/2009 | Horn et al. |
| 2009/0193129 | A1 | 7/2009 | Agarwal et al. |
| 2009/0304358 | A1 | 12/2009 | Rashkovskiy et al. |
| 2010/0017861 | A1 | 1/2010 | Krishnaswamy et al. |
| 2010/0131659 | A1 | 5/2010 | Narayana et al. |
| 2011/0026501 | A1* | 2/2011 | Sharaga ................ H04W 48/16 370/338 |
| 2011/0099467 | A1 | 4/2011 | Kapur et al. |
| 2011/0194838 | A1 | 8/2011 | Meijer |
| 2011/0197224 | A1 | 8/2011 | Meijer |
| 2011/0276323 | A1 | 11/2011 | Seyfetdinov |
| 2012/0147824 | A1 | 6/2012 | Van et al. |
| 2012/0185561 | A1 | 7/2012 | Klein et al. |
| 2012/0275442 | A1 | 11/2012 | Malets et al. |
| 2012/0287781 | A1 | 11/2012 | Maria |
| 2012/0317261 | A1 | 12/2012 | Ahmavaara |
| 2013/0072257 | A1 | 3/2013 | Evans et al. |
| 2013/0139235 | A1 | 5/2013 | Counterman |
| 2013/0262404 | A1 | 10/2013 | Daga et al. |
| 2013/0311546 | A1 | 11/2013 | Fischer et al. |
| 2013/0336210 | A1 | 12/2013 | Connor et al. |
| 2013/0336337 | A1 | 12/2013 | Gopinath et al. |
| 2014/0051417 | A1 | 2/2014 | Wuerch et al. |
| 2014/0249937 | A1 | 9/2014 | McNally |
| 2014/0273944 | A1 | 9/2014 | Ramprasad |
| 2014/0274034 | A1 | 9/2014 | Trapp |
| 2014/0298037 | A1 | 10/2014 | Xiao et al. |
| 2014/0342776 | A1 | 11/2014 | Viswanadham et al. |
| 2015/0019199 | A1 | 1/2015 | Andrews et al. |
| 2015/0189615 | A1 | 7/2015 | Rembarz et al. |
| 2015/0334646 | A1 | 11/2015 | Buckley et al. |
| 2015/0349824 | A1 | 12/2015 | Cho et al. |
| 2015/0381593 | A1 | 12/2015 | Low et al. |
| 2016/0149605 | A1 | 5/2016 | Vecera et al. |
| 2016/0183081 | A1 | 6/2016 | Flores Cuadrado et al. |
| 2016/0192240 | A1 | 6/2016 | Duan |
| 2016/0285822 | A1 | 9/2016 | Adams |
| 2016/0306965 | A1 | 10/2016 | Iyer et al. |
| 2016/0316070 | A1 | 10/2016 | Bobich et al. |
| 2016/0323193 | A1 | 11/2016 | Zhou et al. |
| 2017/0031574 | A1 | 2/2017 | Dhawal |
| 2017/0048566 | A1 | 2/2017 | Srinivasan |
| 2017/0048773 | A1 | 2/2017 | Miao et al. |
| 2017/0201876 | A1 | 7/2017 | Tamagawa |
| 2017/0208369 | A1 | 7/2017 | Major et al. |
| 2017/0223598 | A1 | 8/2017 | Ho et al. |
| 2017/0264592 | A1 | 9/2017 | Yoda et al. |
| 2017/0264951 | A1 | 9/2017 | Mitra et al. |
| 2017/0310411 | A1 | 10/2017 | Dillon et al. |
| 2018/0040011 | A1 | 2/2018 | Milton |
| 2018/0084504 | A1 | 3/2018 | Lindoff et al. |
| 2018/0167853 | A1 | 6/2018 | Wang |
| 2018/0189276 | A1 | 7/2018 | Fonseca, Jr. et al. |
| 2018/0255132 | A1 | 9/2018 | Yasukawa et al. |
| 2018/0285372 | A1 | 10/2018 | Dosovitsky et al. |
| 2018/0310238 | A1 | 10/2018 | Opsenica et al. |
| 2018/0331974 | A1 | 11/2018 | He et al. |
| 2018/0359540 | A1 | 12/2018 | Major |
| 2019/0007082 | A1 | 1/2019 | Dumoulin et al. |
| 2019/0075344 | A1 | 3/2019 | Brown |
| 2019/0115950 | A1 | 4/2019 | Kakinada et al. |
| 2019/0191282 | A1 | 6/2019 | Sanyal et al. |
| 2019/0200065 | A1 | 6/2019 | Haberman et al. |
| 2019/0230501 | A1* | 7/2019 | He ........................ H04W 12/35 |
| 2019/0253836 | A1 | 8/2019 | Sinha et al. |
| 2019/0261165 | A1 | 8/2019 | Kumar |
| 2019/0313135 | A1 | 10/2019 | Pathak et al. |
| 2020/0051161 | A1 | 2/2020 | Dylla |
| 2020/0084614 | A1 | 3/2020 | Xu |
| 2020/0100097 | A1 | 3/2020 | Zheng et al. |
| 2020/0213673 | A1 | 7/2020 | Major et al. |
| 2020/0311096 | A1 | 10/2020 | Murthy |
| 2021/0006656 | A1* | 1/2021 | Gramacho .......... H04M 3/5191 |
| 2021/0021704 | A1 | 1/2021 | Arutyunyan et al. |
| 2021/0092568 | A1 | 3/2021 | Namiranian |
| 2021/0096825 | A1 | 4/2021 | Gray et al. |
| 2021/0112382 | A1 | 4/2021 | Oswal et al. |
| 2021/0152598 | A1 | 5/2021 | Kapelevich et al. |
| 2021/0176820 | A1 | 6/2021 | Zhang et al. |
| 2021/0195392 | A1 | 6/2021 | Kojima et al. |
| 2021/0203719 | A1 | 7/2021 | Miyagi |
| 2021/0250430 | A1 | 8/2021 | Moon |
| 2021/0282127 | A1 | 9/2021 | Chaudhary et al. |
| 2021/0297941 | A1 | 9/2021 | Brown et al. |
| 2022/0022014 | A1 | 1/2022 | Li et al. |
| 2022/0053607 | A1 | 2/2022 | Rice et al. |
| 2022/0086532 | A1 | 3/2022 | Major |
| 2022/0150686 | A1 | 5/2022 | Nitsch |
| 2022/0171983 | A1 | 6/2022 | Chen et al. |
| 2022/0263825 | A1 | 8/2022 | Gregus et al. |
| 2022/0286839 | A1 | 9/2022 | Zhao et al. |
| 2022/0291851 | A1 | 9/2022 | Tylik et al. |
| 2022/0295343 | A1 | 9/2022 | Pefkianakis et al. |
| 2022/0368441 | A1 | 11/2022 | Lee |
| 2022/0369094 | A1 | 11/2022 | Rajwar et al. |
| 2023/0030905 | A1 | 2/2023 | Mao et al. |
| 2023/0084923 | A1 | 3/2023 | Hieb et al. |
| 2023/0107904 | A1 | 4/2023 | Wang et al. |
| 2023/0359760 | A1* | 11/2023 | Karia .................... H04L 9/3218 |
| 2023/0362583 | A1 | 11/2023 | Tawhidur |
| 2023/0385561 | A1 | 11/2023 | Kennedy, Jr. |
| 2023/0396979 | A1 | 12/2023 | Kanchiraju et al. |
| 2023/0421469 | A1 | 12/2023 | Bhattacharjee |
| 2024/0015806 | A1 | 1/2024 | Kahn |
| 2024/0031356 | A1 | 1/2024 | Jiang |
| 2024/0040497 | A1 | 2/2024 | Ohno |
| 2024/0073674 | A1 | 2/2024 | Chughtai et al. |
| 2024/0098504 | A1 | 3/2024 | Demonget et al. |
| 2024/0121835 | A1 | 4/2024 | Kawakami et al. |

(56) References Cited

U.S. PATENT DOCUMENTS

| | | | |
|---|---|---|---|
| 2024/0129713 | A1 | 4/2024 | Mikuni et al. |
| 2024/0147215 | A1 | 5/2024 | Kim et al. |
| 2024/0147216 | A1 | 5/2024 | Kim et al. |
| 2024/0155327 | A1 | 5/2024 | Liu |
| 2024/0188067 | A1 | 6/2024 | Zhang et al. |
| 2024/0204978 | A1 | 6/2024 | Eldar et al. |
| 2024/0224020 | A1 | 7/2024 | Haswarey et al. |
| 2024/0224024 | A1 | 7/2024 | Mukherjee et al. |
| 2024/0244417 | A1 | 7/2024 | Wendeborn et al. |
| 2024/0251230 | A1 | 7/2024 | Gupta |
| 2024/0256797 | A1 | 8/2024 | Chollampatt Muhammed Ashraf et al. |
| 2024/0259783 | A1 | 8/2024 | Hegde et al. |
| 2024/0273570 | A1 | 8/2024 | Bender et al. |
| 2024/0284165 | A1 | 8/2024 | Li |
| 2024/0305598 | A1 | 9/2024 | Narayan et al. |
| 2024/0305961 | A1 | 9/2024 | Simon et al. |
| 2025/0028525 | A1 | 1/2025 | Allen |
| 2025/0142318 | A1 | 5/2025 | Eldar |
| 2025/0209396 | A1 | 6/2025 | Thakur et al. |
| 2025/0238372 | A1 | 7/2025 | Shveidel et al. |
| 2025/0267461 | A1 | 8/2025 | Eriksson |
| 2025/0274750 | A1 | 8/2025 | Eldar et al. |
| 2025/0274825 | A1 | 8/2025 | Eldar et al. |
| 2025/0279942 | A1 | 9/2025 | Eldar et al. |
| 2025/0280327 | A1 | 9/2025 | Eldar et al. |
| 2025/0284985 | A1 | 9/2025 | Shirrell et al. |
| 2025/0362665 | A1 | 11/2025 | Koziolek et al. |
| 2026/0059297 | A1 | 2/2026 | Bei et al. |
| 2026/0059485 | A1 | 2/2026 | Bei et al. |
| 2026/0095755 | A1 | 4/2026 | Wendeborn |
| 2026/0119332 | A1 | 4/2026 | Venkatanarayanan et al. |
| 2026/0133790 | A1 | 5/2026 | Hadian et al. |

FOREIGN PATENT DOCUMENTS

| | | | |
|---|---|---|---|
| CN | 113391972 | A | 9/2021 |
| EP | 3282358 | A1 | 2/2018 |
| EP | 3742771 | A1 | 11/2020 |
| EP | 3840439 | A2 | 6/2021 |
| JP | 2005-267014 | A | 9/2005 |
| KR | 10-2011-0056058 | A | 5/2011 |
| WO | 99/01975 | A1 | 1/1999 |
| WO | 2009/137882 | A1 | 11/2009 |
| WO | 2011/036484 | A2 | 3/2011 |
| WO | 2012/079380 | A1 | 6/2012 |
| WO | 2015/036816 | A1 | 3/2015 |
| WO | 2015/080639 | A1 | 6/2015 |
| WO | 2021/051219 | A1 | 3/2021 |
| WO | 2022/092805 | A1 | 5/2022 |
| WO | 2022/124679 | A1 | 6/2022 |

OTHER PUBLICATIONS

Techno-Economic and Regulation Impact Analysis of Mobile Number Portability Implementation. Rizal. IEEE. (Year: 2013).

Bei et al., "Network Switch Systems and Methods," U.S. Appl. No. 18/812,899, filed Aug. 22, 2024.

Bei et al., "Network Switch Systems and Methods," U.S. Appl. No. 18/812,900, filed Aug. 22, 2024.

Bei et al., "Network Switch Systems and Methods," U.S. Appl. No. 18/812,902, filed Aug. 22, 2024.

Bei et al., "Network Switch Systems and Methods," U.S. Appl. No. 18/812,903, filed Aug. 22, 2024.

Dynamically Updating Sim Cards Over the Air—Filed: Nov. 14, 2023—U.S. Appl. No. 18/508,931—First Named Inventor: Prayash Mukherjee.

Dyoniziak et al., "Detecting Content of Interest in Streaming Media, "U.S. Appl. No. 17/827,211; filed May 27, 2022. (36 Pages).

Eldar et al., "Interface for Digital Operator Platform Including Mobile Virtual Network Enabler Selector," U.S. Appl. No. 18/595,203, filed Mar. 4, 2024.

Eldar et al., "Interface for Digital Operator Platform Including Task Disaggregation," U.S. Appl. No. 18/595,233, filed Mar. 4, 2024.

Eldar et al., "Network Switching Including Client Identifier Query," U.S. Appl. No. 18/587,513, filed Feb. 26, 2024.

Eldar et al., "Network Switching Including New Account Identifier Generation and Database Management," U.S. Appl. No. 18/587,470, filed Feb. 26, 2024.

Eldar et al., "Network Switching Including Proactive Network Switch Initiation," U.S. Appl. No. 18/587,528, filed Feb. 26, 2024.

Eldar et al., "Network Switching Including User Profile Field Cloning," U.S. Appl. No. 18/587,500, filed Feb. 26, 2024.

Eldar et al., 'Network Switching Including Network Switch Availability Verification, U.S. Appl. No. 18/587,460, filed Feb. 26, 2024.

Eldar et al., 'Network Switching Including Porting in a Phone Number To a Target Network, U.S. Appl. No. 18/587,440 filed Feb. 26, 2024.

GSM Association, "Embedded SIM Remote Provisioning Architecture Version 1.1," Official Document SGP.01, Jan. 30, 2014, 85 pages.

GSM Association, "Internet of Things—How It Works," 2021, retrieved from https://www.gsma.com/iot/embedded-sim/how-it-works/, retrieved on Sep. 15, 2021, 4 pages.

GSM Association, "Remote Provisioning Architecture for Embedded UICC Test Specification Version 4.0," Official Document SGP.11, May 20, 2019, 782 pages.

GSM Association, "Requirements for Multi SIM Devices," Version 8.0, Jul. 1, 2021, 26 pages.

GSM Association, "RSP Technical Specification Version 2.3," Official Document SGP.22, Jun. 30, 2021, 274 pages.

GSMA Association et al: "Remote Provisioning Architecture for Embedded UICC Technical Specification (Version 3.2)", Official Document, Jun. 27, 2017, pp. 1-309.

Hieb et al., "Carrier Controlled Cellular Telephone Network Migration," U.S. Appl. No. 19/191,910. filed Apr. 28, 2025.

International Search Report and Written Opinion of the International Searching Authority (EPO) issued in PCT Application No. PCT/US2023/074581 on Nov. 29, 2023.

International Search Report and Written Opinion received for PCT Patent Application No. PCT/US2022/043348, mailed on Dec. 23, 2022, 14 pages.

International Search Report and Written Opinion received for PCT Patent Application No. PCT/US23/74585, mailed on Mar. 12, 2024, 18 pages.

International Search Report and Written Opinion received for PCT Patent Application No. PCT/US24/46589, mailed on Oct. 24, 2024, 14 pages.

Localization of Wireless Equipment Based On Network Usage Data—Filed: Dec. 28, 2023—U.S. Appl. No. 18/399,201—First Named Inventor: Dmitry Dimov.

Nemalipuri et al., "Advertisement Caching for Targeted Delivery," U.S. Appl. No. 18/488,726; filed Oct. 17, 2023. (23 pages).

Nemalipuri, "Prefetching Advertisements for Streaming Delivery," U.S. Appl. No. 18/449,976; filed Aug. 15, 2023. (22 pages).

Partial International Search Results Communication issued by the European Patent Office as the International Searching Authority in PCT Application No. PCT/US2023/074585 on Jan. 17, 2024.

Pre-Download Customization of Electronic Subscriber Identity Module (ESIM)—Filed: Feb. 16, 2023—U.S. Appl. No. 18/110,690—First Named Inventor: Yongjia Li.

Providing Wireless Services Based On Using Subscriber Geospatial Activity—Filed: Dec. 11, 2023—U.S. Appl. No. 18/535,633—First Named Inventor: Mikhail Arbuzov Suzuki et al., "Standardization of Embedded UICC Remote Provisioning," NTT DOCOMO Technical Journal 16 (2):36-41, 2014.

The 3G4G Blog, "M2M embedded UICC (eSIM) Architecture and Use Cases," Dec. 23, 2014, retrieved from https://blog.3g4g.co.uk/20 l 4/12/m2m-embedded-uicc-esim-architecture- and.html, retrieved on Sep. 15, 2021, 3 pages.

Wendeborn et al., "Network Move Systems and Methods," U.S. Appl. No. 18/902,230, filed Sep. 30, 2024.

Wendeborn et al., "Network Move Systems and Methods," U.S. Appl. No. 18/902,236, filed Sep. 30, 2024.

(56) References Cited

OTHER PUBLICATIONS

Wendeborn et al., "Network Move Systems and Methods," U.S. Appl. No. 18/902,241, filed Sep. 30, 2024.

Wendeborn et al., "Network Move Systems and Methods," U.S. Appl. No. 18/902,244, filed Sep. 30, 2024.

* cited by examiner

INTERFACE FOR DIGITAL OPERATOR PLATFORM

BRIEF SUMMARY

This disclosure is generally directed to improvements in interactions and configurations between mobile virtual network operators and mobile virtual network enablers. Generally speaking, mobile network operators may provide or administer infrastructure for telecommunication network services. Illustrative examples of mobile network operators may include VERIZON, T-MOBILE, AT&T, and DISH NETWORK, for example. Additionally, a mobile virtual network operator may provide telecommunication network services indirectly by leveraging the infrastructure of a distinct mobile network operator. Accordingly, a mobile virtual network operator may form an agreement with a mobile network operator such that the mobile virtual network operator provides a client-facing business and organization for mobile telecommunication service while nevertheless using the infrastructure of a distinct mobile network operator in accordance with this agreement for the actual implementation of mobile telecommunication service.

In some scenarios, mobile virtual network operators may benefit from outsourcing one or more tasks to another entity, which can be described as a mobile virtual network enabler. Illustrative examples of such tasks may include billing tasks and/or line provisioning tasks, as discussed in more detail below. In various scenarios, the mobile virtual network enabler may not enter into a direct relationship with the client himself or herself, but nevertheless the mobile virtual network enabler may assist the mobile virtual network operator in providing telecommunication services to the client.

In related scenarios, a mobile virtual network enabler may assign an identifier to a client or an item associated with the client (e.g., an account or a telecommunication line). As part of outsourcing a task to the mobile virtual network enabler, the mobile virtual network operator may also use the same identifier that the mobile virtual network enabler assigned (or vice versa). Furthermore, the mobile virtual network operator may also expose the identifier assigned by the mobile virtual network enabler to the client as part of communications with the client. Nevertheless, in some scenarios this can create a subversive lock on the mobile virtual network enabler that creates friction when attempting to remove or substitute the original mobile virtual network enabler. For example, a structure or formatting of the identifier assigned by the mobile virtual network enabler may be specific to the mobile virtual network enabler and may, therefore, not be readily usable by a substitute mobile virtual network enabler. Moreover, exposing the identifier assigned by the mobile virtual network enabler to the client may tend to associate or bind the client to that particular mobile virtual network enabler.

As a second drawback associated with related scenarios, the same mobile virtual network enabler may be tightly associated with multiple yet distinct types of tasks associated with servicing the mobile virtual network operator. For example, a single mobile virtual network enabler may provide services for both a first type of task (e.g., billing or resource exchange) and also a second type of task (e.g., telecommunication line provisioning). The tight coupling of these two types of tasks within the same mobile virtual network enabler can create friction when attempting to decouple these two types of tasks and/or when attempting to split the tasks between two separate mobile virtual network enablers or when attempting to substitute one virtual mobile network enabler with another virtual mobile network enabler. In view of the above, this application describes a number of different embodiments and technologies that may address or improve on one or more of the deficiencies that are outlined above. Generally speaking, rather than the hard configuration or tight coupling between mobile virtual network enablers and the mobile virtual network operator, as outlined above, this application discloses technologies that implement a "light" or "feather" touch that can render the assignment, disconnection, and/or substitution of one or more different mobile virtual network enablers to one or more clients and/or one or more types of tasks to be performed for a specific client in a simpler or more streamlined manner, as discussed in more detail below.

In a first embodiment, a method comprises (i) receiving, by a mobile virtual network operator from a client of the mobile virtual network operator, a request to perform a task relating to a telecommunication account of the client with the mobile virtual network operator, (ii) forwarding, by the mobile virtual network operator, the request to perform the task to a mobile virtual network enabler by referencing a first client identifier that the mobile virtual network enabler assigned to the telecommunication account, (iii) mapping, by the mobile virtual network operator, the first client identifier that the mobile virtual network enabler assigned to the telecommunication account onto a second client identifier that the mobile virtual network operator assigned to the telecommunication account and that is distinct from the first client identifier, and (iv) reporting, by the mobile virtual network operator to the client, that the task has been completed at least in part by referencing the second client identifier such that the mobile virtual network operator avoids exposing the first client identifier to the client as part of completing the task.

In some examples of the first embodiment, the mapping provides a modular application programming interface that enables the mobile virtual network enabler to be replaced while persisting the second client identifier that the mobile virtual network operator assigned to the telecommunication account.

In some examples of the first embodiment, the mapping prevents locking of the mobile virtual network operator onto the mobile virtual network enabler.

In some examples of the first embodiment, the task relating to the telecommunication account of the client comprises a resource exchange task.

In some examples of the first embodiment, the task relating to the telecommunication account of the client comprises a line provisioning task.

In some examples of the first embodiment, the mobile virtual network enabler is configured to handle both line provisioning tasks and resource exchange tasks for the mobile virtual network operator.

In some examples of the first embodiment, the mobile virtual network operator assigns the mobile virtual network enabler to handle one of line provisioning and resource exchange tasks for the client and assigns a different mobile virtual network enabler to handle the other of line provisioning and resource exchange tasks for the client.

In some examples of the first embodiment, the mobile virtual network operator maintains a profile for the client that includes a field that designates the mobile virtual network enabler as handling a type of the task for the client.

In some examples of the first embodiment, the profile includes a second field that designates a different mobile virtual network enabler as handling a second and distinct type of task for the client.

In some examples of the first embodiment, the mobile virtual network operator maintains the first client identifier as secret from the client or the mobile virtual network operator maintains the second client identifier as secret from the mobile virtual network enabler.

In some examples of the first embodiment, a non-transitory computer-readable medium has instructions stored thereon that, when executed by at least one physical computing processor, cause a computing device to perform operations comprising: (i) receiving, by a mobile virtual network operator from a client of the mobile virtual network operator, a request to perform a task relating to a telecommunication account of the client with the mobile virtual network operator, (ii) forwarding, by the mobile virtual network operator, the request to perform the task to a mobile virtual network enabler by referencing a first client identifier that the mobile virtual network enabler assigned to the telecommunication account, (iii) mapping, by the mobile virtual network operator, the first client identifier that the mobile virtual network enabler assigned to the telecommunication account onto a second client identifier that the mobile virtual network operator assigned to the telecommunication account and that is distinct from the first client identifier, and (iv) reporting, by the mobile virtual network operator to the client, that the task has been completed at least in part by referencing the second client identifier such that the mobile virtual network operator avoids exposing the first client identifier to the client as part of completing the task.

In some examples of the first embodiment, a system comprises at least one physical computing processor of a computing device a non-transitory computer-readable medium that has instructions stored thereon that, when executed by the at least one physical computing processor, cause the computing device to perform operations comprising: (i) receiving, by a mobile virtual network operator from a client of the mobile virtual network operator, a request to perform a task relating to a telecommunication account of the client with the mobile virtual network operator, (ii) forwarding, by the mobile virtual network operator, the request to perform the task to a mobile virtual network enabler by referencing a first client identifier that the mobile virtual network enabler assigned to the telecommunication account, (iii) mapping, by the mobile virtual network operator, the first client identifier that the mobile virtual network enabler assigned to the telecommunication account onto a second client identifier that the mobile virtual network operator assigned to the telecommunication account and that is distinct from the first client identifier, and (iv) reporting, by the mobile virtual network operator to the client, that the task has been completed at least in part by referencing the second client identifier such that the mobile virtual network operator avoids exposing the first client identifier to the client as part of completing the task.

In a second embodiment, the method comprises (i) receiving, by a mobile virtual network operator from a client of the mobile virtual network operator, a request to perform a task relating to a telecommunication account of the client with the mobile virtual network operator, (ii) applying, by the mobile virtual network operator, a mobile virtual network enabler selection policy that automatically matches task requests to mobile virtual network enablers based on an analysis of at least one differentiating factor, (iii) selecting, by the mobile virtual network operator based on applying the mobile virtual network enabler selection policy, a selected mobile virtual network enabler to perform the task from among a plurality of available mobile virtual network enablers that have each established a configuration with the mobile virtual network operator to accept the request to perform the task, (iv) forwarding, by the mobile virtual network operator, the request to perform the task to the selected mobile virtual network enabler, and (v) reporting, by the mobile virtual network operator to the client after the selected mobile virtual network enabler has completed the task, that the task has been completed.

In some examples of the second embodiment, the task relating to the telecommunication account of the client comprises a resource exchange task.

In some examples of the second embodiment, the task relating to the telecommunication account of the client comprises a line provisioning task.

In some examples of the second embodiment, the selected mobile virtual network enabler is configured to handle both line provisioning tasks and resource exchange tasks for the mobile virtual network operator.

In some examples of the second embodiment, the mobile virtual network operator assigns the mobile virtual network enabler to handle one of line provisioning and resource exchange tasks and assigns a different mobile virtual network enabler to handle the other of line provisioning and resource exchange tasks for the client.

In some examples of the second embodiment, selecting, by the mobile virtual network operator based on applying the mobile virtual network enabler selection policy, the selected mobile virtual network enabler to perform the task is based on the mobile virtual network operator having assigned a type of the task to the selected mobile virtual network enabler for the client.

In some examples of the second embodiment, the mobile virtual network operator maintains a profile for the client that includes a field that designates the selected mobile virtual network enabler as handling the type of the task for the client.

In some examples of the second embodiment, the profile includes a second field that designates a different mobile virtual network enabler as handling a second and distinct type of task for the client.

In some examples of the second embodiment, the at least one differentiating factor comprises an indication of at least one mobile virtual network enabler being unavailable from a candidate pool of mobile virtual network enablers.

In some examples of the second embodiment, the at least one differentiating factor comprises an indication that the selected mobile virtual network enabler is configured to handle a type of the request in contrast to a different mobile virtual network enabler in a candidate pool of mobile virtual network enablers.

In some examples of the second embodiment, a non-transitory computer-readable medium that has instructions stored thereon that, when executed by at least one physical computing processor, cause a computing device to perform operations comprising: (i) receiving, by a mobile virtual network operator from a client of the mobile virtual network operator, a request to perform a task relating to a telecommunication account of the client with the mobile virtual network operator, (ii) applying, by the mobile virtual network operator, a mobile virtual network enabler selection policy that automatically matches task requests to mobile virtual network enablers based on an analysis of at least one differentiating factor, (iii) selecting, by the mobile virtual network operator based on applying the mobile virtual network enabler selection policy, a selected mobile virtual network enabler to perform the task from among a plurality of available mobile virtual network enablers that have each established a configuration with the mobile virtual network operator to accept the request to perform the task, (iv) forwarding, by the mobile virtual network operator, the request to perform the task to the selected mobile virtual network enabler, and (v) reporting, by the mobile virtual network operator to the client after the selected mobile virtual network enabler has completed the task, that the task has been completed.

In some examples of the second embodiment, a system comprises at least one physical computing processor of a computing device and a non-transitory computer-readable medium that has instructions stored thereon that, when executed by the at least one physical computing processor, cause the computing device to perform operations comprising: (i) receiving, by a mobile virtual network operator from a client of the mobile virtual network operator, a request to perform a task relating to a telecommunication account of the client with the mobile virtual network operator, and (ii) applying, by the mobile virtual network operator, a mobile virtual network enabler selection policy that automatically matches task requests to mobile virtual network enablers based on an analysis of at least one differentiating factor, (iii) selecting, by the mobile virtual network operator based on applying the mobile virtual network enabler selection policy, a selected mobile virtual network enabler to perform the task from among a plurality of available mobile virtual network enablers that have each established a configuration with the mobile virtual network operator to accept the request to perform the task, (iv) forwarding, by the mobile virtual network operator, the request to perform the task to the selected mobile virtual network enabler, and (v) reporting, by the mobile virtual network operator to the client after the selected mobile virtual network enabler has completed the task, that the task has been completed.

In a third embodiment, a method comprises (i) receiving, by a mobile virtual network operator over a synchronous network connection from a client of the mobile virtual network operator, a request to perform a task relating to a telecommunication account of the client with the mobile virtual network operator, (ii) forwarding, by the mobile virtual network operator, the request to perform the task to a mobile virtual network enabler over an asynchronous network connection, (iii) transforming, by the mobile virtual network operator, a first hypertext transfer protocol response code that the mobile virtual network enabler issued in response to the request into a second and distinct hypertext transfer protocol response code, and (iv) reporting, by the mobile virtual network operator to the client, the second and distinct hypertext transfer protocol response code.

In some examples of the third embodiment, transforming, by the mobile virtual network operator, the first hypertext transfer protocol response code that the mobile virtual network enabler issued in response to the request into the second and distinct hypertext transfer protocol response code comprises transforming a 2XX status code into a 5XX status code.

In some examples of the third embodiment, the 5XX status code comprises a 520 status code.

In some examples of the third embodiment, transforming, by the mobile virtual network operator, the first hypertext transfer protocol response code that the mobile virtual network enabler issued in response to the request into a second and distinct hypertext transfer protocol response code resolves a conflict that would otherwise result from a difference between the synchronous network connection and the asynchronous network connection.

In some examples of the third embodiment, transforming, by the mobile virtual network operator, the first hypertext transfer protocol response code that the mobile virtual network enabler issued in response to the request into a second and distinct hypertext transfer protocol response code prevents the client from interpreting the first hypertext transfer protocol response code as indicating that the mobile virtual network enabler has completed the task relating to the telecommunication account of the client.

In some examples of the third embodiment, the method further comprises transforming, by the mobile virtual network operator, an original response to the request from the mobile virtual network enabler after the mobile virtual network enabler completes the task into a transformed response that is agnostic between mobile virtual network enablers.

In some examples of the third embodiment, the method further comprises mapping, by the mobile virtual network operator, a first client identifier that the mobile virtual network enabler assigned to the telecommunication account onto a second client identifier that the mobile virtual network operator assigned to the telecommunication account and that is distinct from the first client identifier.

In some examples of the third embodiment, transforming, by the mobile virtual network operator, the original response to the request from the mobile virtual network enabler after the mobile virtual network enabler completes the task into the transformed response that is agnostic between mobile virtual network enablers comprises transforming the first client identifier into the second client identifier within the transformed response.

In some examples of the third embodiment, the mobile virtual network operator maintains the first client identifier as secret from the client or the mobile virtual network operator maintains the second client identifier as secret from the mobile virtual network enabler.

In some examples of the third embodiment, the task relating to the telecommunication account of the client comprises a resource exchange task or the task relating to the telecommunication account of the client comprises a line provisioning task.

In some examples of the third embodiment, a non-transitory computer-readable medium has instructions stored thereon that, when executed by at least one physical computing processor, cause a computing device to perform operations comprising: (i) receiving, by a mobile virtual network operator over a synchronous network connection from a client of the mobile virtual network operator, a request to perform a task relating to a telecommunication account of the client with the mobile virtual network operator, (ii) forwarding, by the mobile virtual network operator, the request to perform the task to a mobile virtual network enabler over an asynchronous network connection, (iii) transforming, by the mobile virtual network operator, a first hypertext transfer protocol response code that the mobile virtual network enabler issued in response to the request into a second and distinct hypertext transfer protocol response code, and (iv) reporting, by the mobile virtual network operator to the client, the second and distinct hypertext transfer protocol response code.

In some examples of the third embodiment, a system comprises at least one physical computing processor of a computing device and a non-transitory computer-readable medium that has instructions stored thereon that, when executed by the at least one physical computing processor, cause the computing device to perform operations comprising: (i) receiving, by a mobile virtual network operator over a synchronous network connection from a client of the mobile virtual network operator, a request to perform a task relating to a telecommunication account of the client with the mobile virtual network operator, (ii) forwarding, by the mobile virtual network operator, the request to perform the task to a mobile virtual network enabler over an asynchronous network connection, (iii) transforming, by the mobile virtual network operator, a first hypertext transfer protocol response code that the mobile virtual network enabler issued in response to the request into a second and distinct hypertext transfer protocol response code, and (iv) reporting, by the mobile virtual network operator to the client, the second and distinct hypertext transfer protocol response code.

In a fourth embodiment, a method comprises (i) receiving, by a mobile virtual network operator from a client of the mobile virtual network operator, a request to perform a task relating to a telecommunication account of the client with the mobile virtual network operator, (ii) forwarding, by the mobile virtual network operator, the request to perform the task to a mobile virtual network enabler, (iii) transforming, by the mobile virtual network operator, an original response to the request from the mobile virtual network enabler after the mobile virtual network enabler completes the task into a transformed response that is agnostic between mobile virtual network enablers, (iv) caching, by the mobile virtual network operator after the transforming, the original response to the request for reference by a troubleshooting component, and (v) reporting, by the mobile virtual network operator to the client, the transformed response.

In some examples of the fourth embodiment, the method further comprises mapping, by the mobile virtual network operator, a first client identifier that the mobile virtual network enabler assigned to the telecommunication account onto a second client identifier that the mobile virtual network operator assigned to the telecommunication account and that is distinct from the first client identifier.

In some examples of the fourth embodiment, transforming, by the mobile virtual network operator, the original response to the request from the mobile virtual network enabler after the mobile virtual network enabler completes the task into the transformed response that is agnostic between mobile virtual network enablers comprises transforming the first client identifier into the second client identifier within the transformed response.

In some examples of the fourth embodiment, transforming, by the mobile virtual network operator, the original response to the request from the mobile virtual network enabler after the mobile virtual network enabler completes the task into the transformed response that is agnostic between mobile virtual network enablers comprises transforming the first client identifier into the second client identifier within the transformed response.

In some examples of the fourth embodiment, the mobile virtual network operator maintains the first client identifier as secret from the client or the mobile virtual network operator maintains the second client identifier as secret from the mobile virtual network enabler.

In some examples of the fourth embodiment, the task relating to the telecommunication account of the client comprises a resource exchange task or the task relating to the telecommunication account of the client comprises a line provisioning task.

In some examples of the fourth embodiment, transforming, by the mobile virtual network operator, the original response to the request from the mobile virtual network enabler after the mobile virtual network enabler completes the task into the transformed response that is agnostic between mobile virtual network enablers obfuscates an identity of the mobile virtual network enabler from a perspective of the client.

In some examples of the fourth embodiment, transforming, by the mobile virtual network operator, the original response to the request from the mobile virtual network enabler after the mobile virtual network enabler completes the task into the transformed response that is agnostic between mobile virtual network enablers comprises stripping at least one value from the original response.

In some examples of the fourth embodiment, transforming, by the mobile virtual network operator, the original response to the request from the mobile virtual network enabler after the mobile virtual network enabler completes the task into the transformed response that is agnostic between mobile virtual network enablers comprises enriching the original response with at least one value.

In some examples of the fourth embodiment, the mobile virtual network operator maintains separation between a mobile virtual network enabler orchestration layer and a mobile virtual network enabler integration layer, and the mobile virtual network operator is configured such that the mobile virtual network enabler orchestration layer only communicates with the mobile virtual network enabler through the mobile virtual network enabler integration layer.

In some examples of the fourth embodiment, a non-transitory computer-readable medium has instructions stored thereon that, when executed by at least one physical computing processor, cause a computing device to perform operations comprising (i) receiving, by a mobile virtual network operator from a client of the mobile virtual network operator, a request to perform a task relating to a telecommunication account of the client with the mobile virtual network operator, (ii) forwarding, by the mobile virtual network operator, the request to perform the task to a mobile virtual network enabler, (iii) transforming, by the mobile virtual network operator, an original response to the request from the mobile virtual network enabler after the mobile virtual network enabler completes the task into a transformed response that is agnostic between mobile virtual network enablers, (iv) caching, by the mobile virtual network operator after the transforming, the original response to the request for reference by a troubleshooting component, and (v) reporting, by the mobile virtual network operator to the client, the transformed response.

In some examples of the fourth embodiment, a system comprises at least one physical computing processor of a computing device and a non-transitory computer-readable medium that has instructions stored thereon that, when executed by the at least one physical computing processor, cause the computing device to perform operations comprising (i) receiving, by a mobile virtual network operator from a client of the mobile virtual network operator, a request to perform a task relating to a telecommunication account of the client with the mobile virtual network operator, (ii) forwarding, by the mobile virtual network operator, the request to perform the task to a mobile virtual network enabler, (iii) transforming, by the mobile virtual network operator, an original response to the request from the mobile virtual network enabler after the mobile virtual network enabler completes the task into a transformed response that is agnostic between mobile virtual network enablers, (iv) caching, by the mobile virtual network operator after the transforming, the original response to the request for reference by a troubleshooting component, and (v) reporting, by the mobile virtual network operator to the client, the transformed response.

In a fifth embodiment, a method comprises (i) receiving, by a mobile virtual network operator from a client of the mobile virtual network operator, a request to perform a task relating to a telecommunication account of the client with the mobile virtual network operator, (ii) retrieve, by the mobile virtual network operator, a value that identifies a mobile virtual network enabler that was assigned to a type of the request from a corresponding field of a profile for the client with the mobile virtual network operator, (iii) forwarding, by the mobile virtual network operator based on retrieving the value, the request to perform the task to the mobile virtual network enabler, and (iv) reporting, by the mobile virtual network operator to the client after the mobile virtual network enabler has completed the task, that the task has been completed.

In some examples of the fifth embodiment, the task relating to the telecommunication account of the client comprises a resource exchange task or the task relating to the telecommunication account of the client comprises a line provisioning task.

In some examples of the fifth embodiment, the mobile virtual network enabler is configured to handle both line provisioning tasks and resource exchange tasks for the mobile virtual network operator.

In some examples of the fifth embodiment, the mobile virtual network operator assigns the mobile virtual network enabler to handle one of line provisioning and resource exchange tasks for the client and assigns a different mobile virtual network enabler to handle the other of line provisioning and resource exchange tasks for the client.

In some examples of the fifth embodiment, the profile includes a second field that designates a different mobile virtual network enabler as handling a second and distinct type of task for the client.

In some examples of the fifth embodiment, the value was inserted into the corresponding field of the profile for the client by the mobile virtual network operator applying a mobile virtual network enabler selection policy that automatically matches task requests to mobile virtual network enablers based on an analysis of at least one differentiating factor.

In some examples of the fifth embodiment, the client and the mobile virtual network operator are configured according to a synchronous network connection or the mobile virtual network operator and the mobile virtual network enabler are configured according to an asynchronous network connection.

In some examples of the fifth embodiment, the method further comprises transforming, by the mobile virtual network operator, a first hypertext transfer protocol response code that the mobile virtual network enabler issued in response to the request into a second and distinct hypertext transfer protocol response code.

In some examples of the fifth embodiment, the method further comprises transforming, by the mobile virtual network operator, an original response to the request from the mobile virtual network enabler after the mobile virtual network enabler completes the task into a transformed response that is agnostic between mobile virtual network enablers.

In some examples of the fifth embodiment, the method further comprises mapping, by the mobile virtual network operator, a first client identifier that the mobile virtual network enabler assigned to the telecommunication account onto a second client identifier that the mobile virtual network operator assigned to the telecommunication account and that is distinct from the first client identifier.

In some examples of the fifth embodiment, a non-transitory computer-readable medium that has instructions stored thereon that, when executed by at least one physical computing processor, cause a computing device to perform operations comprising: (i) receiving, by a mobile virtual network operator from a client of the mobile virtual network operator, a request to perform a task relating to a telecommunication account of the client with the mobile virtual network operator, (ii) retrieve, by the mobile virtual network operator, a value that identifies a mobile virtual network enabler that was assigned to a type of the request from a corresponding field of a profile for the client with the mobile virtual network operator, (iii) forwarding, by the mobile virtual network operator based on retrieving the value, the request to perform the task to the mobile virtual network enabler, and (iv) reporting, by the mobile virtual network operator to the client after the mobile virtual network enabler has completed the task, that the task has been completed.

In some examples of the fifth embodiment, a system comprises at least one physical computing processor of a computing device and a non-transitory computer-readable medium that has instructions stored thereon that, when executed by the at least one physical computing processor, cause the computing device to perform operations comprising: (i) receiving, by a mobile virtual network operator from a client of the mobile virtual network operator, a request to perform a task relating to a telecommunication account of the client with the mobile virtual network operator, (ii) retrieve, by the mobile virtual network operator, a value that identifies a mobile virtual network enabler that was assigned to a type of the request from a corresponding field of a profile for the client with the mobile virtual network operator, (iii) forwarding, by the mobile virtual network operator based on retrieving the value, the request to perform the task to the mobile virtual network enabler, and (iv) reporting, by the mobile virtual network operator to the client after the mobile virtual network enabler has completed the task, that the task has been completed.

BRIEF DESCRIPTION OF THE DRAWINGS

For a better understanding of the present invention, reference will be made to the following Detailed Description, which is to be read in association with the accompanying drawings.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
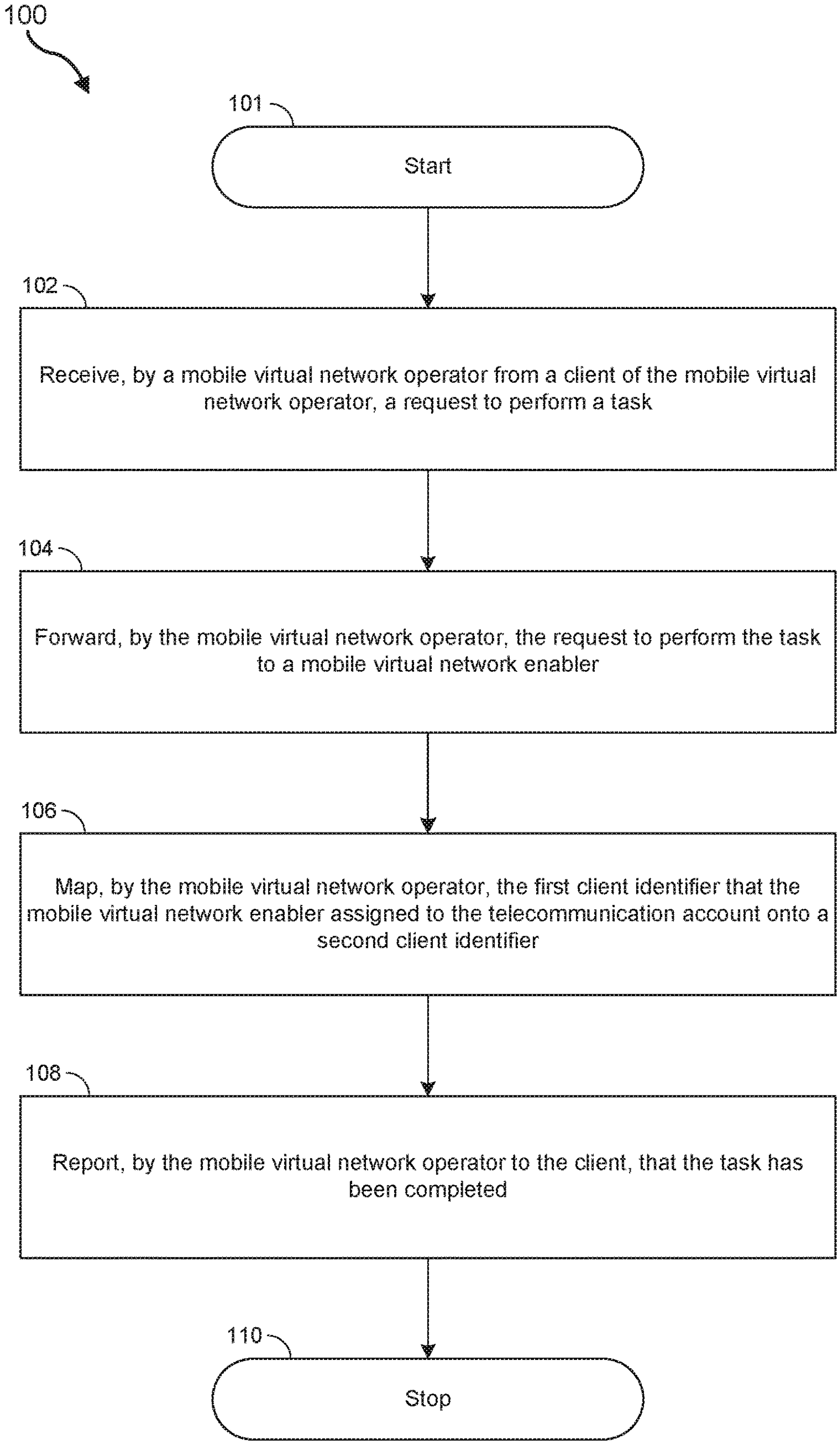
FIG. 1A shows a flow diagram for a method relating to an interface for a digital operator platform.

FIG. 1A shows a flow diagram for a method 100 relating to an interface for a digital operator platform. At step 101, method 100 may start or begin. At step 102, method 100 may include receiving, by a mobile virtual network operator from a client of the mobile virtual network operator, a request to perform a task relating to a telecommunication account of the client with the mobile virtual network operator. At step 104, method 100 may include forwarding, by the mobile virtual network operator, the request to perform the task to a mobile virtual network enabler by referencing a first client identifier that the mobile virtual network enabler assigned to the telecommunication account. At step 106, method 100 may include mapping, by the mobile virtual network operator, the first client identifier that the mobile virtual network enabler assigned to the telecommunication account onto a second client identifier that the mobile virtual network operator assigned to the telecommunication account and that is distinct from the first client identifier. At step 108, method 100 may include reporting, by the mobile virtual network operator to the client, that the task has been completed at least in part by referencing the second client identifier such that the mobile virtual network operator avoids exposing the first client identifier to the client as part of completing the task. At step 110, method 100 may stop or conclude.

As used herein, the phrase "first client identifier that the mobile virtual network enabler assigned to the telecommunication account" can refer to either the mobile virtual network enabler originally creating and assigning the first client identifier to the client or to the mobile virtual network enabler copy the first client identifier in a scenario where the mobile virtual network operator originally created the first client identifier. In the latter scenario, the mobile virtual network operator can create the second client identifier for communications with the client while using the first client identifier for communications with the mobile virtual network enabler, as discussed in more detail below. Similarly, the phrase "assigned to the telecommunication account" can generally refer to assigning an identifier to the telecommunication account associated with the particular client and/or assigning the identifier to an item or component of the telecommunication account (e.g., a particular device, user, subscription offer, mobile value added service, telecommunication line, etc.). In various embodiments, this disclosure may focus upon identifiers assigned to client accounts (e.g., billing accounts) and/or identifiers assigned to particular telecommunication lines, as well as identifiers assigned to particular offers or mobile value added services that are attached to a particular client account. In other words, in various examples of the first embodiment, the task relating to the telecommunication account of the client includes a resource exchange task (e.g., billing task) and/or a line provisioning task.

As used herein, the term "client" can generally refer to a user, subscriber, and/or customer of a mobile network operator or mobile virtual network operator, consistent with the discussion below. Moreover, as used herein, the term "digital operator platform" can generally refer broadly to any platform for onboarding and/or managing clients of a mobile virtual network operator or mobile network operator, consistent with the discussion below.

Figure 1B:
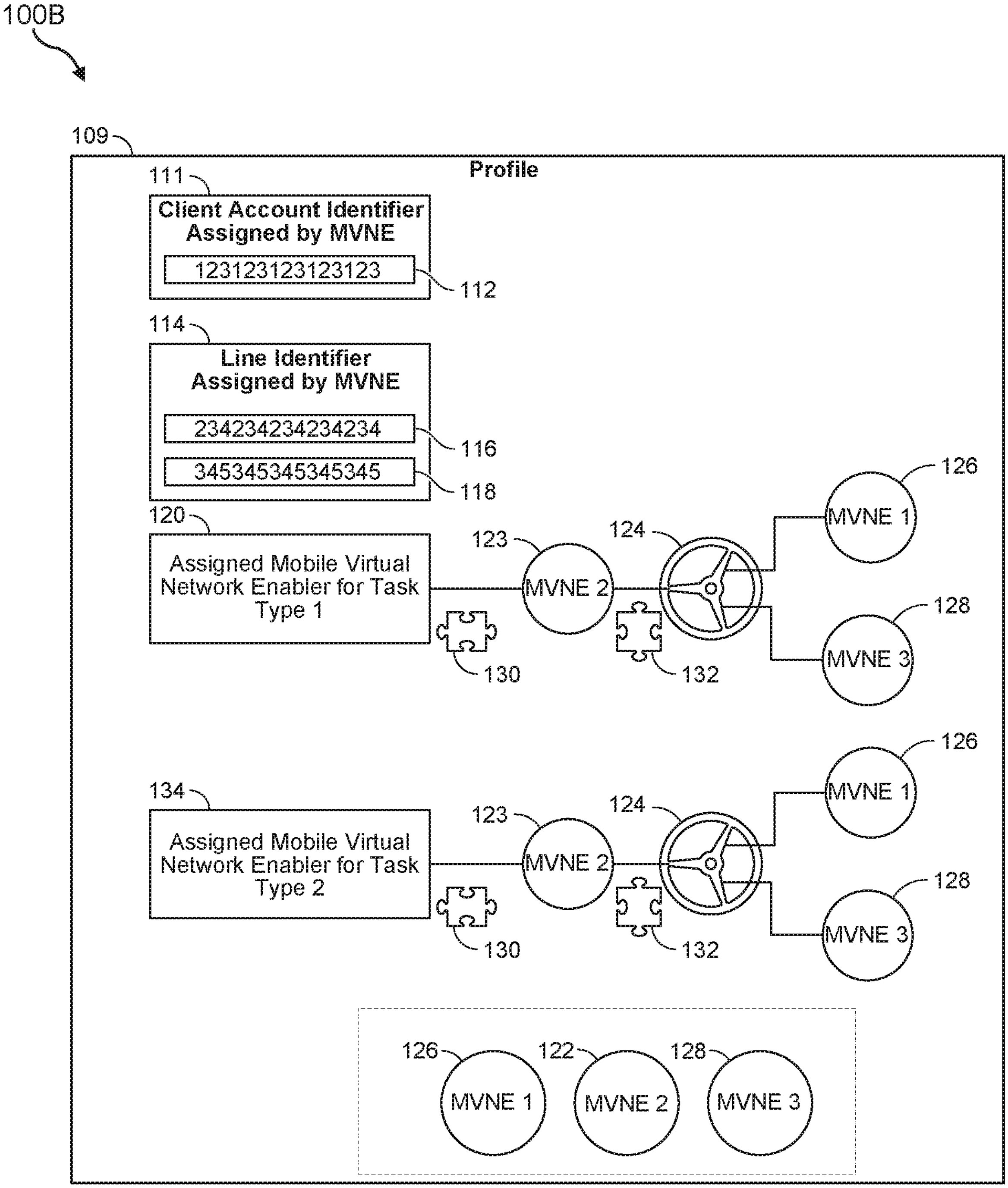
FIG. 1B shows a diagram indicating how a profile for a client may designate an account identifier, line identifiers, and mobile virtual network enabler identifiers for different types of tasks. The identifiers may be assigned by the mobile virtual network enabler.

FIG. 1B shows a diagram 100B indicating how a profile 109 for a client may designate an account identifier 111 including an account number 112, line identifiers 114 including a line number 116 and a line number 118, and mobile virtual network enabler identifiers for different types of tasks including a first mobile virtual network enabler 120 for a task type one and a second mobile virtual network enabler 134 for a task type two. The identifiers may be assigned by the mobile virtual network enabler, as shown. Diagram 100B further illustrate how, in this example, a pool of candidate mobile virtual network enablers, including a mobile virtual network enabler 126, a mobile virtual network enabler 122, and a mobile virtual network enabler 128, may have established a setup or configuration or other agreement with the mobile virtual network operator to accept one or more particular types of tasks. In the example of this figure, mobile virtual network enabler 122 has been assigned to both task type one and task type two. Nevertheless, a wheel indicator 124 indicates to the viewer that the mobile virtual network operator may seamlessly switch between various ones of the mobile virtual network enabler. Plug-and-play indicators 130 and 132 indicate that the digital operator platform is configured to attach, or detach, a particular mobile virtual network enabler to a particular client account and/or a particular type of task for a particular client account, as shown, in a streamlined manner. Accordingly, simply rotating wheel indicator 123, the mobile virtual network operator may figuratively switch between the various mobile virtual network enablers that are previously established in a configuration or pool to service the mobile virtual network operator.

Generally speaking, each one of the mobile virtual network enablers may assign or utilize its own client identifier for the corresponding client. Nevertheless, the mobile virtual network operator may also assign its own client identifier to the client, which can correspond to a persistent, universal, canonical, and/or client-facing client identifier. The mobile virtual network operator may assign its own client identifier in this more persistent manner even in scenarios where the mobile virtual network operator originally generates one or more of the client identifiers that any one of the mobile virtual network enablers copies or assigns to the client. These may correspond to enabler-specific or otherwise less persistent client identifiers for the client. In various examples, the mobile virtual network operator may keep the enabler-specific client identifier secret from the client or otherwise prevent exposing the enabler-specific client identifier to the client to help prevent a subversive lock on the mobile virtual network enabler and/or to help prevent tying the client to that particular mobile virtual network enabler. More generally, in some examples of the first embodiment, the mobile virtual network operator maintains the first client identifier as secret from the client or the mobile virtual network operator maintains the second client identifier as secret from the mobile virtual network enabler. In further example, the mapping provides a modular application programming interface that enables the mobile virtual network enabler to be replaced while persisting the second client identifier that the mobile virtual network operator assigned to the telecommunication account. Accordingly, in some examples of the first embodiment, the mapping prevents locking of the mobile virtual network operator onto the mobile virtual network enabler. Moreover, in some examples maintaining the second client identifier as secret from the mobile virtual network enabler.

Figure 1C:
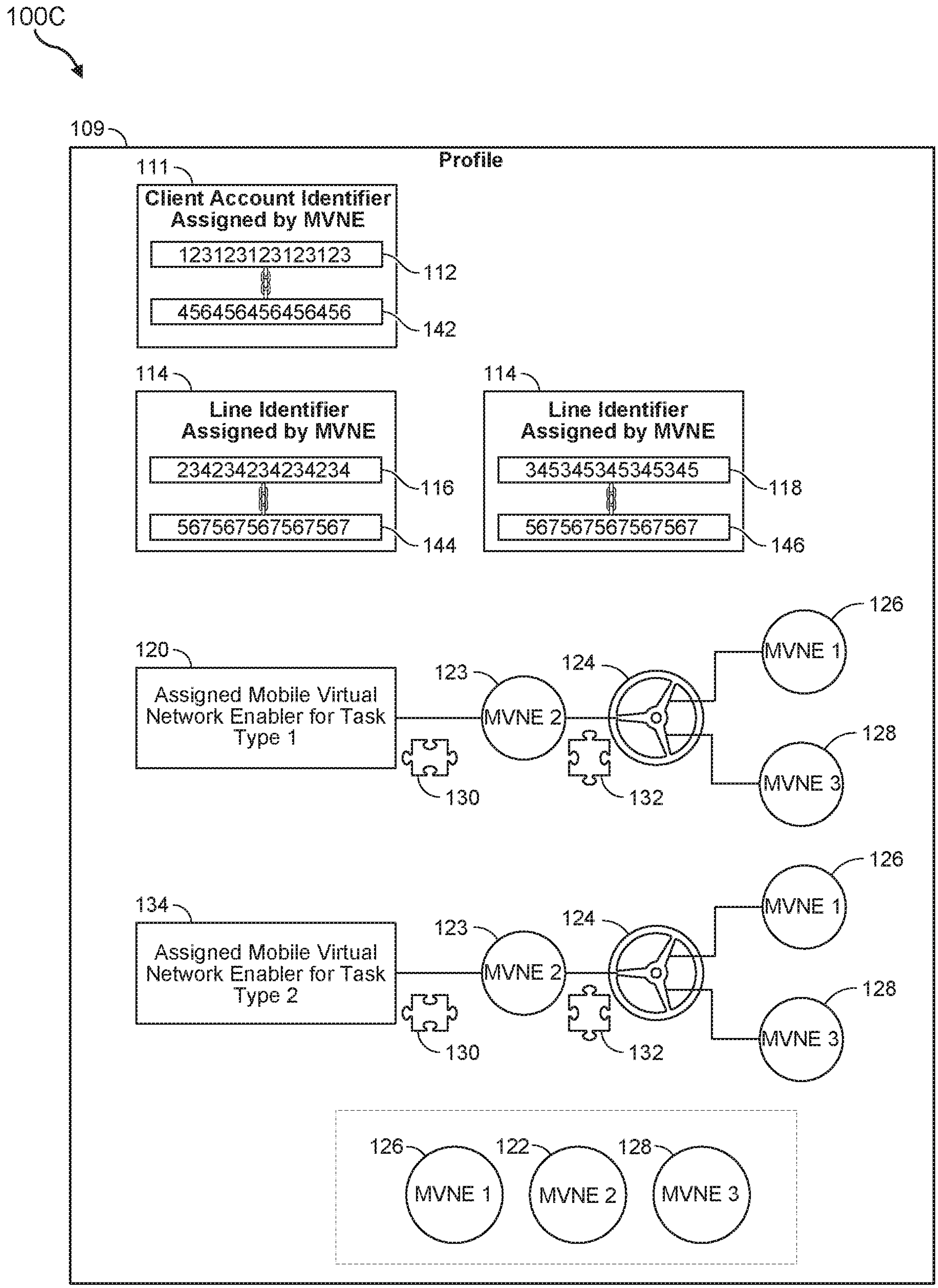
FIG. 1C shows a diagram indicating how the profile for the client may further designate how the identifiers assigned by the mobile virtual network enabler have been mapped to identifiers assigned by the mobile virtual network operator.

FIG. 1C shows a diagram 100C indicating how the profile for the client may further designate how the identifiers assigned by one or more mobile virtual network enablers have been mapped to identifiers assigned by the mobile virtual network operator. In particular, diagram 100C further includes an account number 142, a line number 144, and a line number 146. In contrast to the numbers assigned by the mobile virtual network enabler in the previous figure, account number 142, line number 144, and line number 146 may have been assigned by the mobile virtual network operator. These may correspond to the more universal, canonical, persistent, and/or client-facing client identifiers discussed above. In other words, although the mobile virtual network operator may consistently use its own more persistent client identifiers for one or more items associated with the client, such as a billing account and/or a telecommunication line, these more persistent client identifiers may be further consistently mapped to one or more enabler-specific client identifiers, which may be more ephemeral in the sense that the mobile virtual network operator retains the ability or option to attach, detach, substitute, replace, and/or otherwise switch one or more mobile virtual network enablers. Because, in some examples, the mobile virtual network operator maintains enabler-specific client identifiers as secret from the client, the mobile virtual network operator retains the ability to perform any one or more of these attaching, detaching, and/or switching procedures in a manner that is substantially, effectively, or entirely invisible from the perspective of the client or in a manner that is otherwise performed in the background from the perspective of the client. In other words, when the mobile virtual network operator exercises the option to attach, detach, switch, and/or substitute one mobile virtual network enabler with another mobile virtual network enabler, the mobile virtual network operator may continue to communicate with the client using the same client identifier that is client-facing. In the background, the mobile virtual network operator may continuously update a mapping table or translation table that maps the more persistent client identifier assigned by the mobile virtual network operator to the various enabler-specific client identifiers assigned by various mobile virtual network enablers. Using the continuous updating of the translation table, the mobile virtual network operator may seamlessly continue to provide services to the client through one or more mobile virtual network enablers without the client necessarily having any inconvenient or distracting visibility into, or awareness of, the switching procedures and, instead, the client may simply perceive a generally smooth and continuously positive customer experience.

Figure 1D:
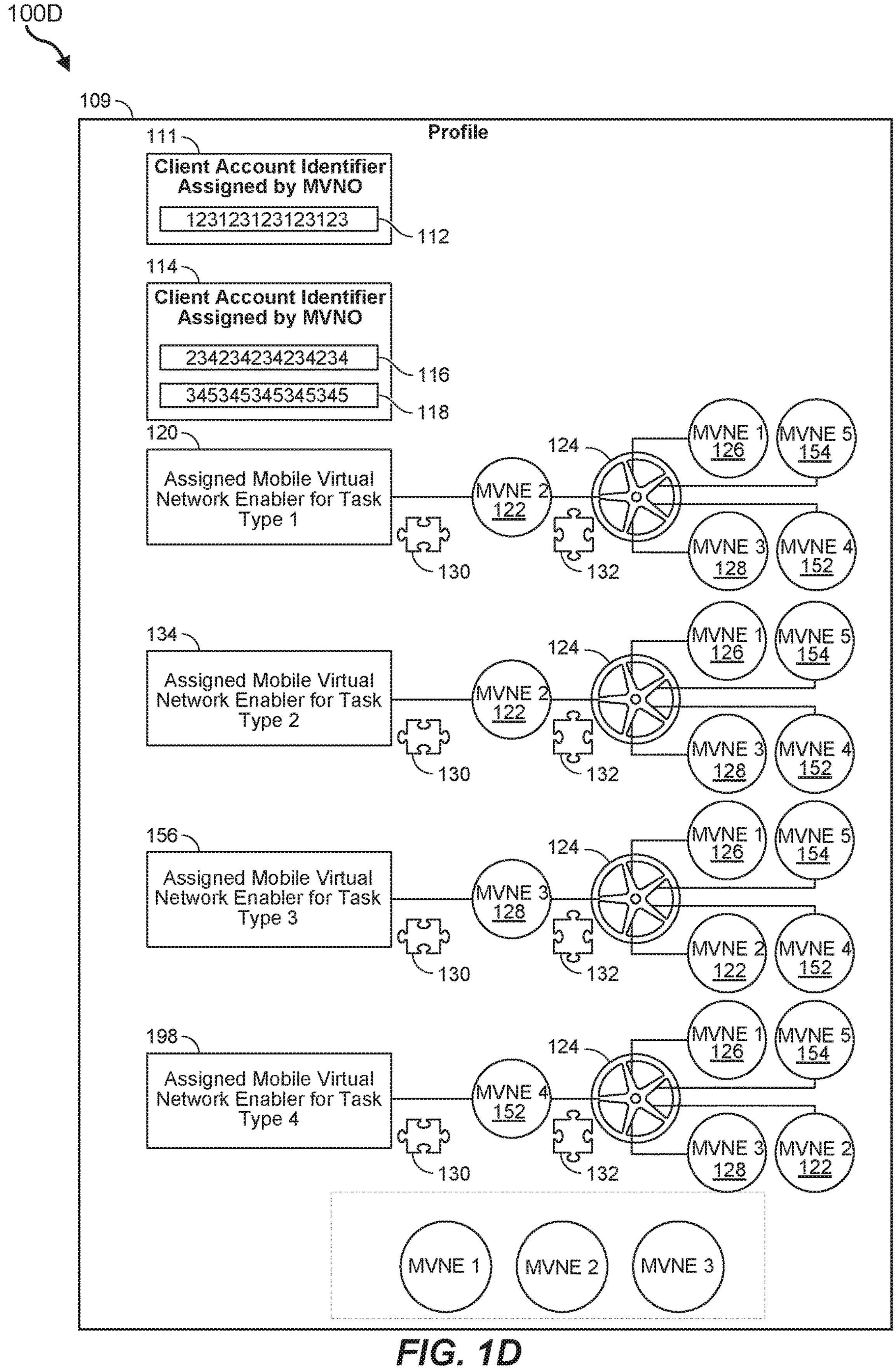
FIG. 1D shows a diagram indicating how the profile for the client may be expandable to include a larger pool of candidate mobile virtual network enablers.

FIG. 1D shows a diagram 100D indicating how the profile for the client may be expandable to include a larger pool of candidate mobile virtual network enablers. Accordingly, this figure differs from the previous figure in the sense that the number of mobile virtual network enablers has been expanded to include a mobile virtual network enabler 152 and a mobile virtual network enabler 154. Although the example of five separate mobile virtual network enablers is used within this diagram, this number is arbitrarily used for illustrative purposes and those having skill in the art can readily ascertain that, in other examples, any suitable number of mobile virtual network enablers may be used and the interface for the digital operator platform may be expanded correspondingly.

In addition to expanding the number of mobile virtual network enablers, the diagram of this figure also helps to illustrate how the number of types of tasks that are uniquely assigned to a particular mobile virtual network enabler may be expanded as well. Accordingly, diagram 100D further shows a third mobile virtual network enabler 156 and a fourth mobile virtual network enabler 198, which have been mapped to, or slotted to, corresponding mobile virtual network enablers identified along wheel indicator 124.

Diagram 100D helps illustrate how the mobile virtual network operator may assign one or more specific mobile virtual network enablers to client accounts at different levels of granularity. In some examples, the mobile virtual network operator may assign a single mobile virtual network enabler to handle all tasks for a particular client account. In other examples, as shown within diagram 100D, the mobile virtual network operator may assign specific mobile virtual network enablers to specific types of tasks to be performed by each respective mobile virtual network enabler for that particular client account. Illustrative examples of such types of tasks may include billing tasks and/or telecommunication line provisioning tasks. In other examples, any other suitable type of task to be performed by, or outsourced to, a mobile virtual network enabler, may be mapped to a corresponding specific mobile virtual network enabler. This mapping information may be stored within the profile for the corresponding client account, as discussed above. In the manner shown within diagram 100D, different types of tasks may be successfully or effectively disentangled, or otherwise disaggregated, such that different mobile virtual network enablers can be assigned to distinct different types of tasks, as shown, rather than a single mobile virtual network enabler being used for all tasks. In other words, in some examples of the first embodiment, the mobile virtual network operator maintains a profile for the client that includes a field that designates the mobile virtual network enabler as handling a type of the task for the client, and the profile includes a second field that designates a different mobile virtual network enabler as handling a second and distinct type of task for the client.

Disentangling different types of tasks to be performed by the mobile virtual network enabler may become helpful in the context of billing tasks coupled with line provisioning task. Generally speaking, some mobile virtual network enablers enable both billing tasks and line provisioning tasks to be performed or outsourced by the mobile virtual network enabler on behalf of a mobile virtual network operator. In such scenarios, it can become challenging or inconvenient to disentangle the billing tasks from the line provisioning task for a particular client account even when it would become more prudent or preferred for a different mobile virtual network enabler to take on one or both of these two types of tasks. Accordingly, in some examples of the first embodiment, the mobile virtual network enabler is configured to handle both line provisioning tasks and resource exchange tasks for the mobile virtual network operator, and the mobile virtual network operator assigns the mobile virtual network enabler to handle one of line provisioning and resource exchange tasks for the client and assigns a different mobile virtual network enabler to handle the other of line provisioning and resource exchange tasks for the client.

Additionally, or alternatively, in some examples specific tasks may be assigned to specific mobile virtual network enablers, as distinct from specific types of tasks being assigned to respective mobile virtual network enablers. In other words, in some examples specific tasks may be assigned to specific mobile virtual network enablers without the higher-level type of those tasks being assigned to a specific mobile virtual network enabler. In scenarios where the type of the task is assigned to a specific mobile virtual network enabler, then a specific task may be assigned to a specific mobile virtual network enabler by checking a type of task, checking which specific mobile virtual network enabler is assigned to that particular type of task, and then assigning that particular task to the mobile virtual network enabler that has been previously assigned to that particular type of task, as discussed further below. In other words, in various examples the technology of this disclosure generates new and inventive profile fields for respective types of tasks to be performed by mobile virtual network enablers and these profile fields may specify values that identify the particular mobile virtual network enablers that are assigned to perform those tasks. The creation of these new and inventive profile fields enables convenient plug-and-play and/or seamless or streamlined attachment, detaching, switching, and/or substitution of mobile virtual network enablers for different types of tasks while nevertheless maintaining a streamlined and positive customer experience for the client account.

Figure 1E:
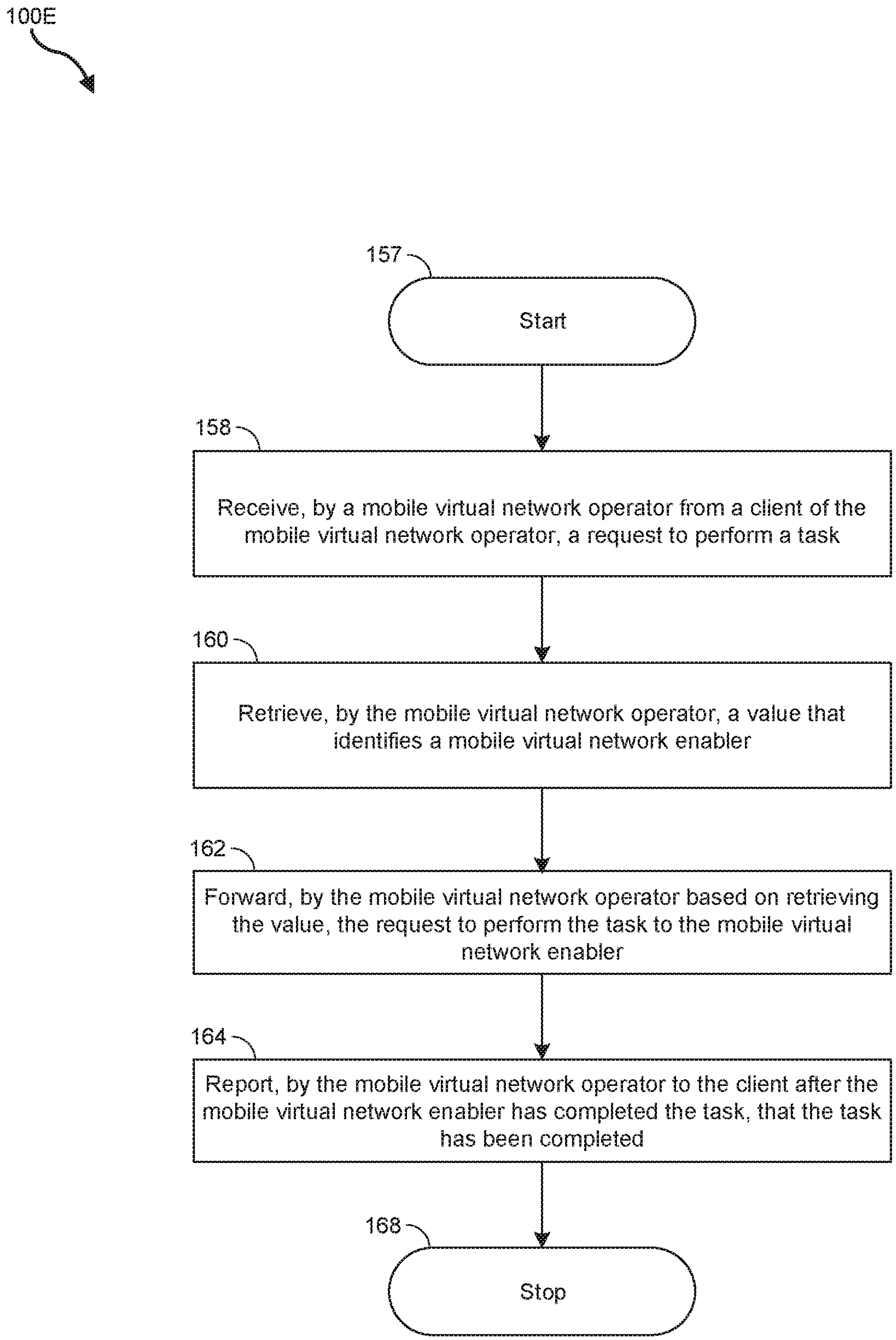
FIG. 1E shows a flow diagram for a method relating to an interface for the digital operator platform including retrieving and applying a value identifying a mobile virtual network enabler.

FIG. 1E shows a flow diagram for a method 100E relating to an interface for the digital operator platform including retrieving and applying a value identifying a mobile virtual network enabler. At step 157, method 100E may start or begin. At step 158, method 100E may include receiving, by a mobile virtual network operator from a client of the mobile virtual network operator, a request to perform a task relating to a telecommunication account of the client with the mobile virtual network operator. At step 160, method 100E may include retrieving, by the mobile virtual network operator, a value that identifies a mobile virtual network enabler that was assigned to a type of the request from a corresponding field of a profile for the client with the mobile virtual network operator. At step 162, method 100E may include forwarding, by the mobile virtual network operator based on retrieving the value, the request to perform the task to the mobile virtual network enabler. At step 164, method 100E may include reporting, by the mobile virtual network operator to the client after the mobile virtual network enabler has completed the task, that the task has been completed. At step 168, method 100E may stop or conclude.

Diagram 100C of FIG. 1C helps to illustrate the performance of method 100E in various embodiments. In particular, the mobile virtual network operator may receive a request to perform a task relating to the telecommunication account of the client. The task may relate to billing services, line provisioning services, and/or a mobile value added service, etc. The request to perform the task may identify the telecommunication account using an identifier assigned by the mobile virtual network operator, which can correspond to a client-facing identifier such as account number 142, line number 144, and/or line number 146. Upon receiving the request, the mobile virtual network operator may check what the type of the request is. For example, a billing request can correspond to a first type of request and a line provisioning request can correspond to a second type of request. More generally, in some examples, the profile includes a second field that designates a different mobile virtual network enabler as handling a second and distinct type of task for the client. Based on which type the request has, the mobile virtual network operator can retrieve or ascertain which specific mobile virtual network enabler has been selected, or assigned to, that particular type of request. This can include mobile virtual network enabler 120 for the first type of request or the mobile virtual network enabler 134 for the second type of request. After having verified the identity of the mobile virtual network enabler that is assigned request that was received, the mobile virtual network operator can forward the request to that particular mobile virtual network enabler.

Figure 1F:
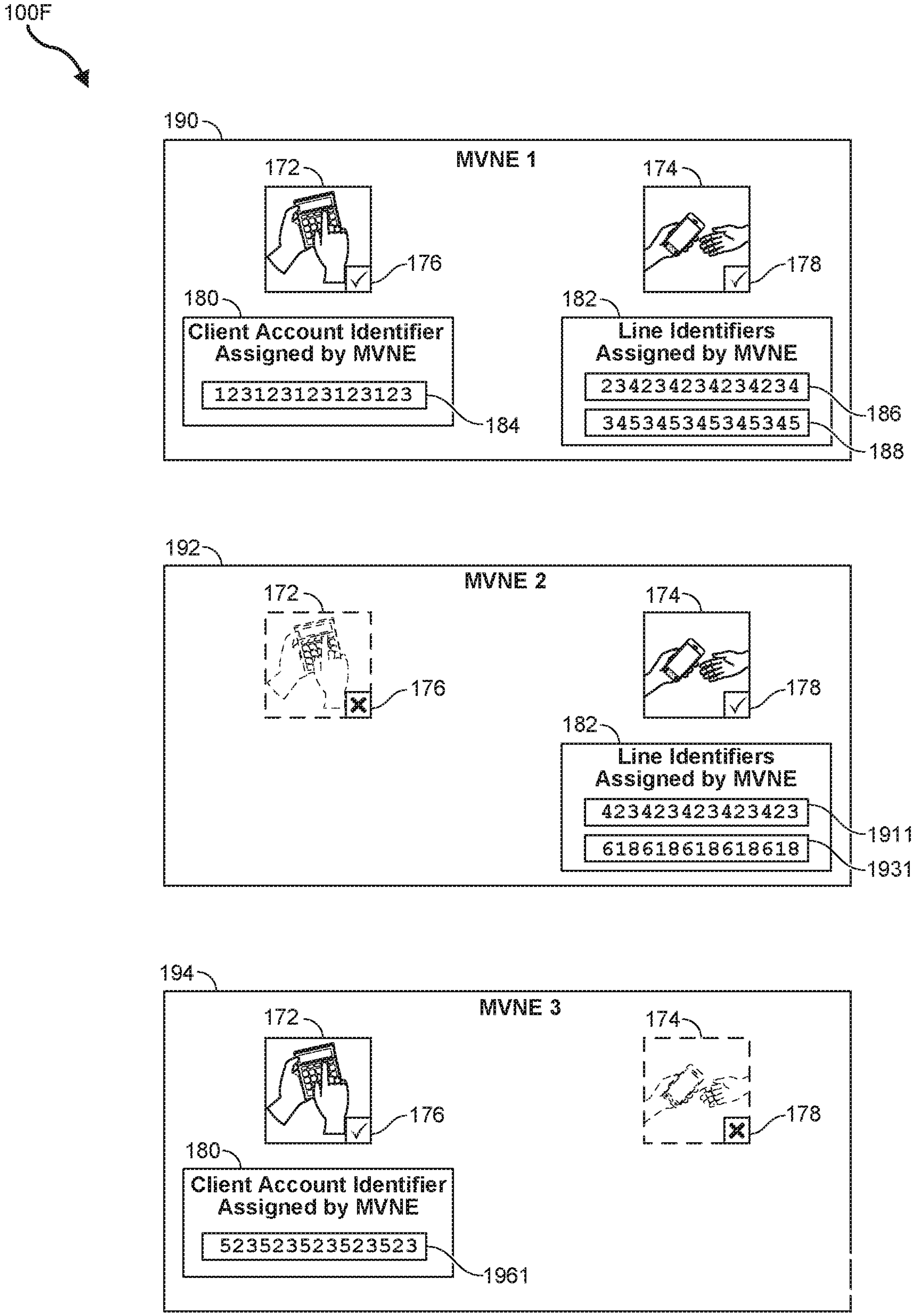
FIG. 1F shows a series of diagrams indicating how different examples of mobile virtual network enablers may provide billing services, line provisioning services, and/or both of these types of services while assigning corresponding identifiers.

FIG. 1F shows a series 100F and of diagrams, including a diagram 190, a diagram 192, and a diagram 194, which indicate how different examples of mobile virtual network enablers may provide billing services, line provisioning services, and/or both of these types of services while assigning corresponding identifiers. Each one of these diagrams may correspond to a separate mobile virtual network enabler. As shown, each of these diagrams may include a billing icon 172 and a line provisioning icon 174. Additionally, each of these diagrams includes a checkbox 176 and a check box 178, which further indicates whether that particular mobile virtual network enabler provides the corresponding type of service or functionality, in terms of either billing services or line provisioning services. The mobile virtual network enabler for diagram 190 provides both billing services and line provisioning services. Accordingly, diagram 190 shows a client account identifier 180 assigned by the mobile virtual network enabler including an account number 184, and line identifiers 182 assigned by the mobile virtual network enabler, including a number 186 and a line number 188. Accordingly, in this example the mobile virtual network enabler of diagram 190 is configured to handle both line provisioning tasks and resource exchange tasks for the mobile virtual network operator.

In contrast, the mobile virtual network enabler for diagram 192 does not provide billing services while nevertheless it does provide line provisioning services. Accordingly, this mobile virtual network enabler includes a line number 1911 and a line number 1931 that have been assigned by the mobile virtual network enabler. Similarly, the mobile virtual network enabler for diagram 194 provides billing services but does not provide line provisioning services. Accordingly, this mobile virtual network enabler includes an account number 1961 that was assigned by the mobile virtual network enabler, as shown.

As outlined above, the mobile virtual network enabler may generally map identifiers assigned by one or more mobile virtual network enablers onto identifiers assigned by the mobile virtual network operator. The identifiers assigned by the mobile virtual network operator may correspond to client-facing and/or more persistent or canonical identifiers for use in communications between the mobile virtual network operator and the client. In contrast, the mobile virtual network enablers may assign enabler-specific identifiers onto these accounts and/or items, and the mobile virtual network operator may maintain these enabler-specific identifiers as secret between the mobile virtual network enablers and the mobile virtual network operator and/or may prevent exposing these enabler-specific identifiers to the client, thereby achieving one or more of the benefits outlined above.

Series 100F helps to illustrate how, in some scenarios, the mobile virtual network operator assigns a first mobile virtual network enabler (e.g., for diagram 192) to handle one of line provisioning and resource exchange tasks for the client and assigns a different mobile virtual network enabler (e.g., for diagram 194) to handle the other of line provisioning and resource exchange tasks for the client. In this manner, two separate types of request to be performed by, or outsource two, respective mobile virtual network enablers may be effectively disentangled or decoupled between them while nevertheless the mobile virtual network operator maintains mapping information that identifies which specific has been assigned to, and his maintains responsibility for servicing, which particular types of tasks for a particular client account.

Figure 1G:
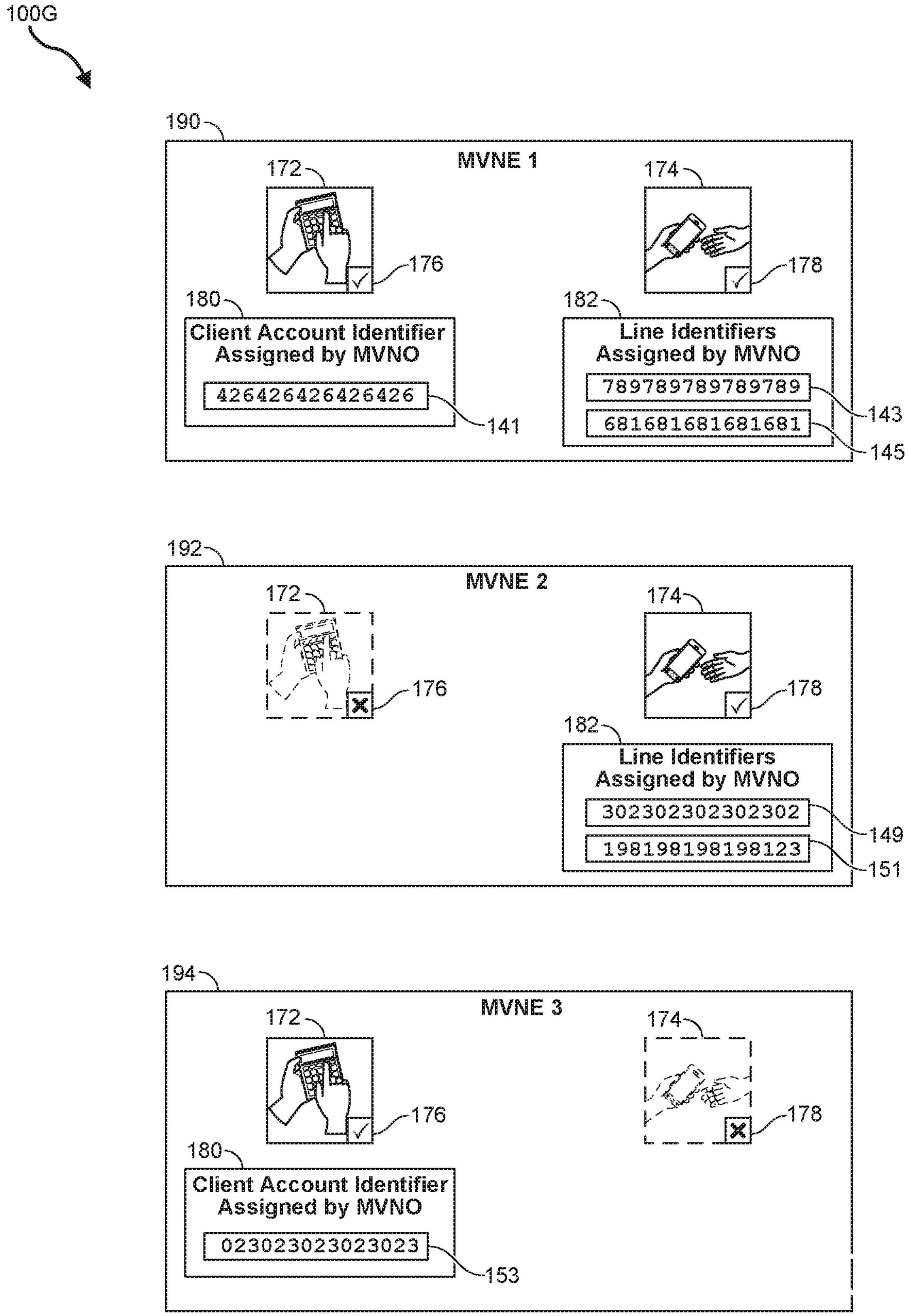
FIG. 1G shows a series of diagrams indicating how the identifiers assigned by the mobile virtual network enabler may be replaced by identifiers assigned by the mobile virtual network operator.

In view of the above, FIG. 1G shows a series 100G that repeats a version of diagram 190, a version of diagram 192, and a version of diagram 194. Series 100G may differ from the series of the previous figure in the sense that the various account numbers and/or line numbers assigned by the respective mobile virtual network enabler have been replaced, within the diagrams, the corresponding numbers assigned by the mobile virtual network operator, consistent with the discussion above. Specifically, these identifiers have been replaced by an account number 141, a line number 143, a line number 145, a line number 149, a line number 151, and an account number 153, as shown. Moreover, the mobile virtual network operator may maintain a mapping or translation table that records this mapping or translation information such that the mobile virtual network operator can translate identifiers assigned by the mobile virtual network operator onto identifiers assigned by respective mobile virtual network enablers, and vice versa, as discussed in more detail below.

Figure 1H:
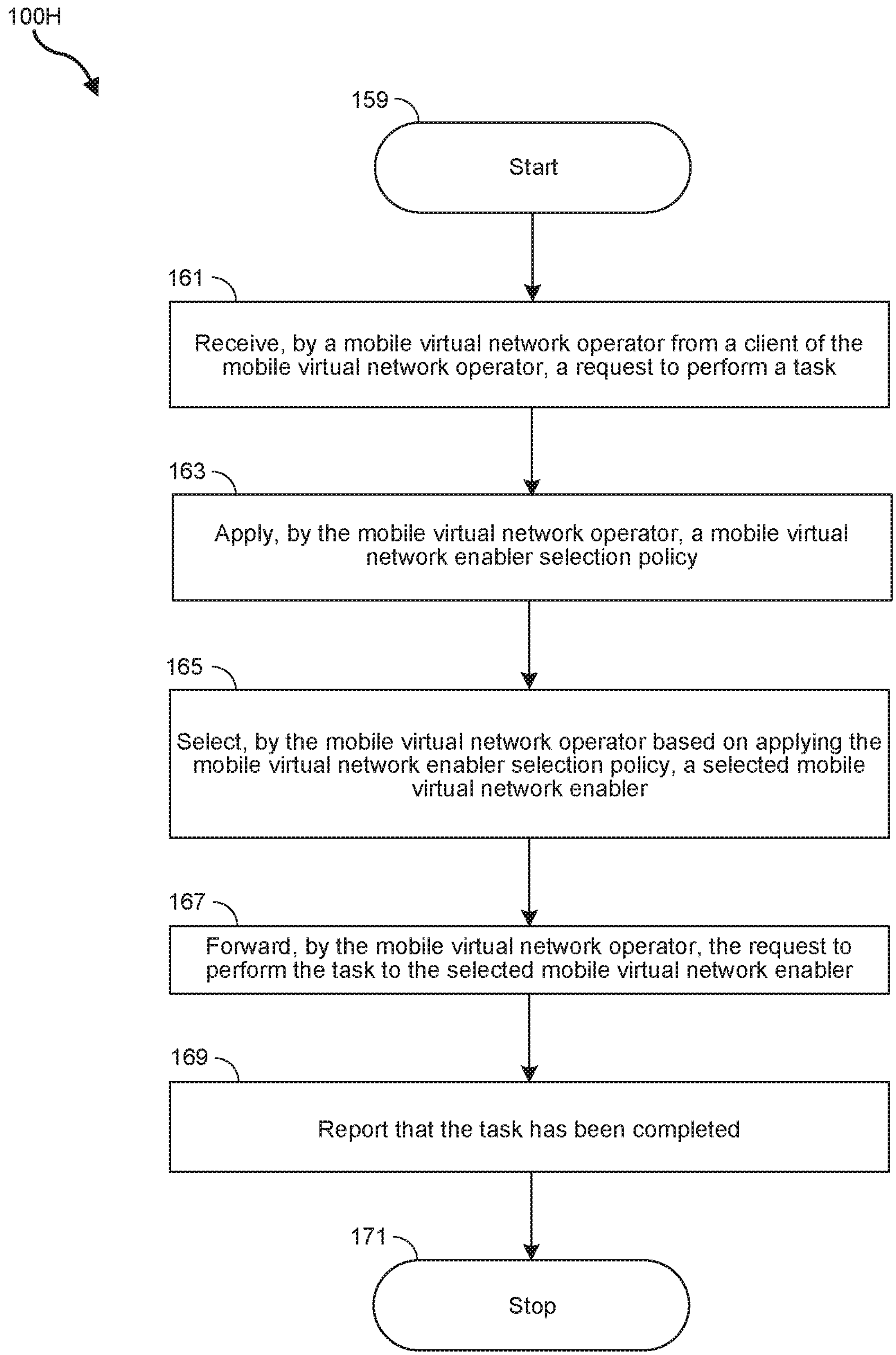
FIG. 1H shows a flow diagram for a method relating to an interface for the digital operator platform including the application of a policy for selecting a mobile virtual network enabler.

FIG. 1H shows a flow diagram for a method 100H relating to the interface for the digital operator platform including the application of a policy for selecting a mobile virtual network enabler. At step 159, method 100H may start or begin. At step 161, method 100H may include receiving, by a mobile virtual network operator from a client of the mobile virtual network operator, a request to perform a task relating to a telecommunication account of the client with the mobile virtual network operator. At step 163, method 100H may include applying, by the mobile virtual network operator, a mobile virtual network enabler selection policy that automatically matches task requests to mobile virtual network enablers based on an analysis of at least one differentiating factor.

At step 165, method 100H may include selecting, by the mobile virtual network operator based on applying the mobile virtual network enabler selection policy, a selected mobile virtual network enabler to perform the task from among a plurality of available mobile virtual network enablers that have each established a configuration with the mobile virtual network operator to accept the request to perform the task. At step 167, method 100H may include forwarding, by the mobile virtual network operator, the request to perform the task to the selected mobile virtual network enabler. At step 169, method 100H may include reporting, by the mobile virtual network operator to the client after the selected mobile virtual network enabler has completed the task, that the task has been completed. At step 171, method 100H may stop or conclude.

Figure 1I:
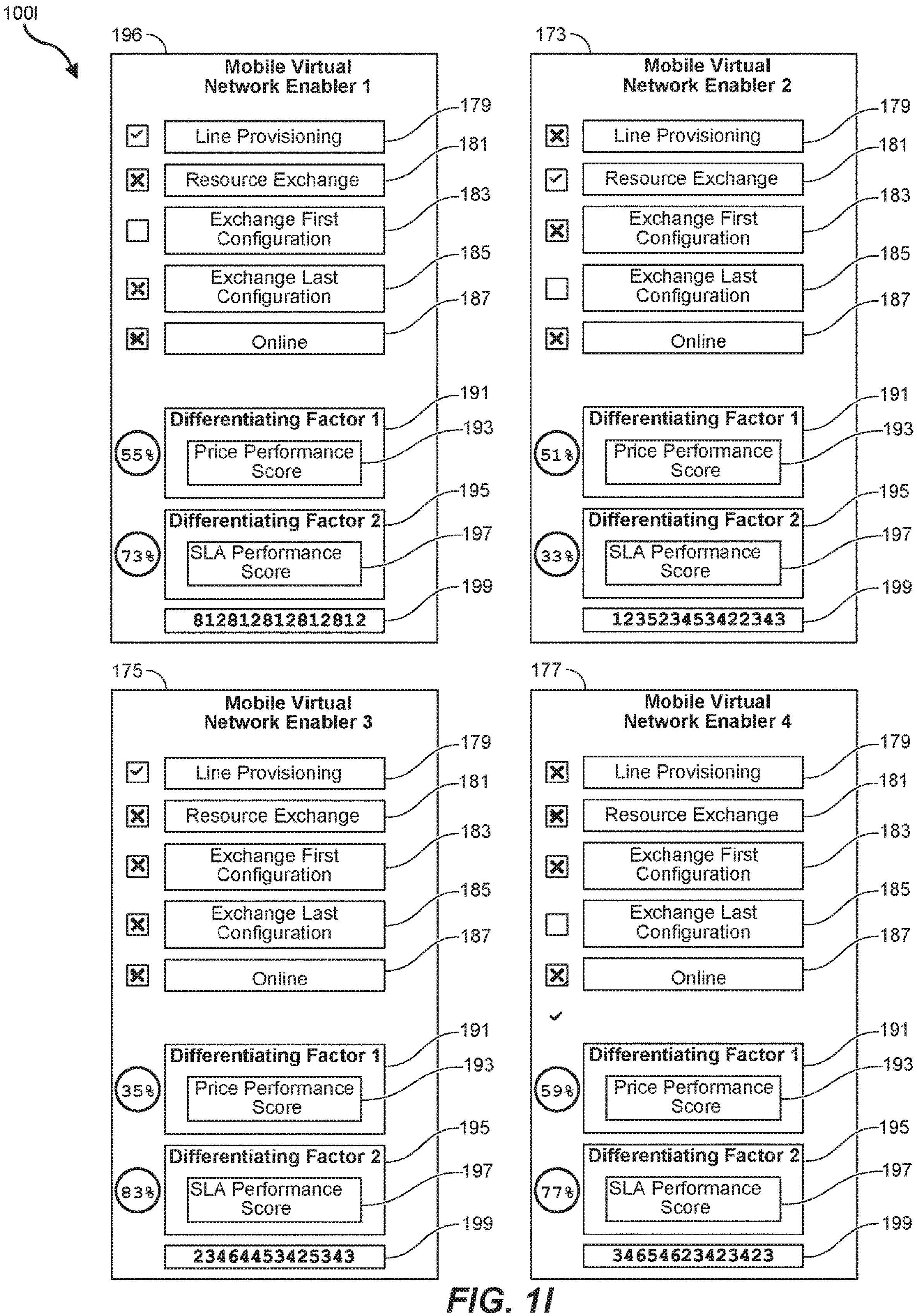
FIG. 1I shows a diagram indicating how different mobile virtual network enablers may have different attributes or features that can be considered as differentiating factors when selecting a mobile virtual network enabler to perform a particular task for a mobile virtual network operator.

FIG. 1I shows a series 100I of diagrams, including a diagram 196, a diagram 173, a diagram 175, and a diagram 177. These four separate diagrams correspond to profiles for four separate mobile virtual network enablers, as shown. Each profile for each respective mobile virtual network enabler may include various fields specifying one or more attributes or values describing the corresponding mobile virtual network enabler. A line provisioning option 179 indicates whether the mobile virtual network enabler provides line provisioning services. A resource exchange option 181 indicates with the mobile virtual network enabler provides billing or resource exchange services. An exchange first configuration option 183 and/or an exchange last configuration option 185 indicates whether the corresponding mobile virtual network enabler provides prepaid or postpaid billing services. An online option 187 indicates whether the corresponding mobile virtual network enabler is currently online and/or operational. Any one or more of these various factors outlined above may correspond to differentiating factors. Additionally, or alternatively, the various profiles for these mobile virtual network enablers also include a differentiating factor 191, which can include a price performance score 193, as well as a differentiating factor 195, which can include a service level agreement performance score 197. Service level agreement performance score 197 can indicate a measurement of how well the mobile virtual network enabler is perceived to be performing one nevertheless satisfying a baseline minimum level of performance established by a service level agreement. Optionally, the profile for the mobile virtual network enabler may further include an account number 199, which can identify at least one client account make serviced by the respective mobile virtual network enabler, and consistent with the discussion above.

In the context of method 100H, the mobile virtual network operator may apply a mobile virtual network enabler selection policy that matches respective mobile virtual network enablers to respective requests and/or that matches respective mobile virtual network enablers to respective types of requests. The mobile virtual network enabler selection policy may perform the matching procedure at least in part by referencing one or more of the various factors shown within series 100I and/or described above.

In some examples, the task relating to the telecommunication account of the client comprises a resource exchange task or a line provisioning task. Accordingly, the mobile virtual network enabler selection policy may assign a particular task to a mobile virtual network enabler based at least in part on a factor establishing that the task includes a line provisioning task and that the assigned mobile virtual network enabler provides line provisioning services. Similarly, the mobile virtual network enabler selection policy may assign a particular task to a mobile virtual network enabler based at least in part on a factor establishing that the task includes a billing task and that the assigned mobile virtual network enabler provides billing services. In some examples, the selected mobile virtual network enabler is configured to handle both line provisioning tasks and resource exchange tasks for the mobile virtual network operator (see, e.g., diagram 177).

Additionally, or alternatively, in some examples the task may be associated with a particular mobile network operator that is servicing the client on behalf of the mobile virtual network operator. In such scenarios, different mobile network operators may provide or require different types of billing resource exchange arrangements. For example, some mobile network operators and/or some plans provided by specific mobile network operators may enable or require prepaid billing arrangement. Additionally, or alternatively, some mobile network operators and/or some plans provided by specific mobile network operators may enable or require postpaid billing arrangements. Accordingly, an additional factor that the mobile virtual network enabler selection policy may consider when matching tasks to respective mobile virtual network enablers may include a factor establishing that the assigned mobile virtual network enabler provides a billing arrangement consistent with the mobile network operator servicing the client to perform the task, consistent with exchange first configuration option (e.g., prepaid) 183 and/or exchange last configuration option (e.g., postpaid) 185.

Additionally, or alternatively, the mobile virtual network enabler selection policy may also consider a factor evaluating whether a particular mobile virtual network enabler is currently online and/or operational. In other words, in some examples, the at least one differentiating factor includes an indication of at least one mobile virtual network enabler being unavailable from a candidate pool of mobile virtual network enablers. In these simplified examples, the mobile virtual network enabler selection policy may only assign mobile virtual network enablers to particular tasks and/or to particular types of tasks based on a determination that the mobile virtual network enabler is currently online and/or operational, or based on a determination that no indication has been received indicating that the respective mobile virtual network enabler is inactive for non-operational.

Whereas one or more of the various factors outlined above may all constitute differentiating factors, the profiles shown within series 100I also include differentiating factor 191 and differentiating factor 195. Accordingly, the mobile virtual network enabler selection policy may also consider one or more of these differentiating factors when matching tasks or requests to respective mobile virtual network enablers. In other words, the various mobile virtual network enablers may compete on price performance and/or may compete on another performance metric indicating how well the respective mobile virtual network enabler goes above or beyond a baseline level of performance established by the service level agreement.

In various examples, the mobile virtual network enabler selection policy may also consider, as another factor, a number or identities of client accounts or other items that are previously assigned to the mobile virtual network enabler. Accordingly, in some examples, the mobile virtual network enabler selection policy may perform load-balancing in a manner that attempts to prevent one or more mobile virtual network enablers from being overloaded with client accounts and/or overloaded with items assigned to client accounts (e.g., types of requests). In various examples, the mobile virtual network enabler selection policy may consider an absolute or relative size of the client accounts and/or items assigned to the mobile virtual network enabler. Additionally, or alternatively, the mobile virtual network enabler selection policy may consider one or more performance metrics indicating a speed, latency, bandwidth, lag, congestion, and/or other attribute associated with whether the respective mobile virtual network enabler is overloaded or that otherwise indicates how well the virtual mobile network enablers performing, consistent with the discussion above.

The mobile virtual network enabler selection policy may consider any one or more of the factors outlined above, including any suitable permutation of such factors, in matching requests or types of requests to respective mobile virtual network enablers for a particular client account. In some examples, the mobile virtual network enabler selection policy may apply weights such that different ones of these factors are weighted differently than other ones of the factors, thereby indicating or reflecting how important one particular factor or attribute may be from the perspective of the mobile virtual network operator when selecting a particular mobile virtual network enabler to perform a particular task or type of task for the client account. The mobile virtual network operator may use any suitable heuristic or business logic, weighted or non-weighted, to implement the mobile virtual network enabler selection policy.

Figure 2:
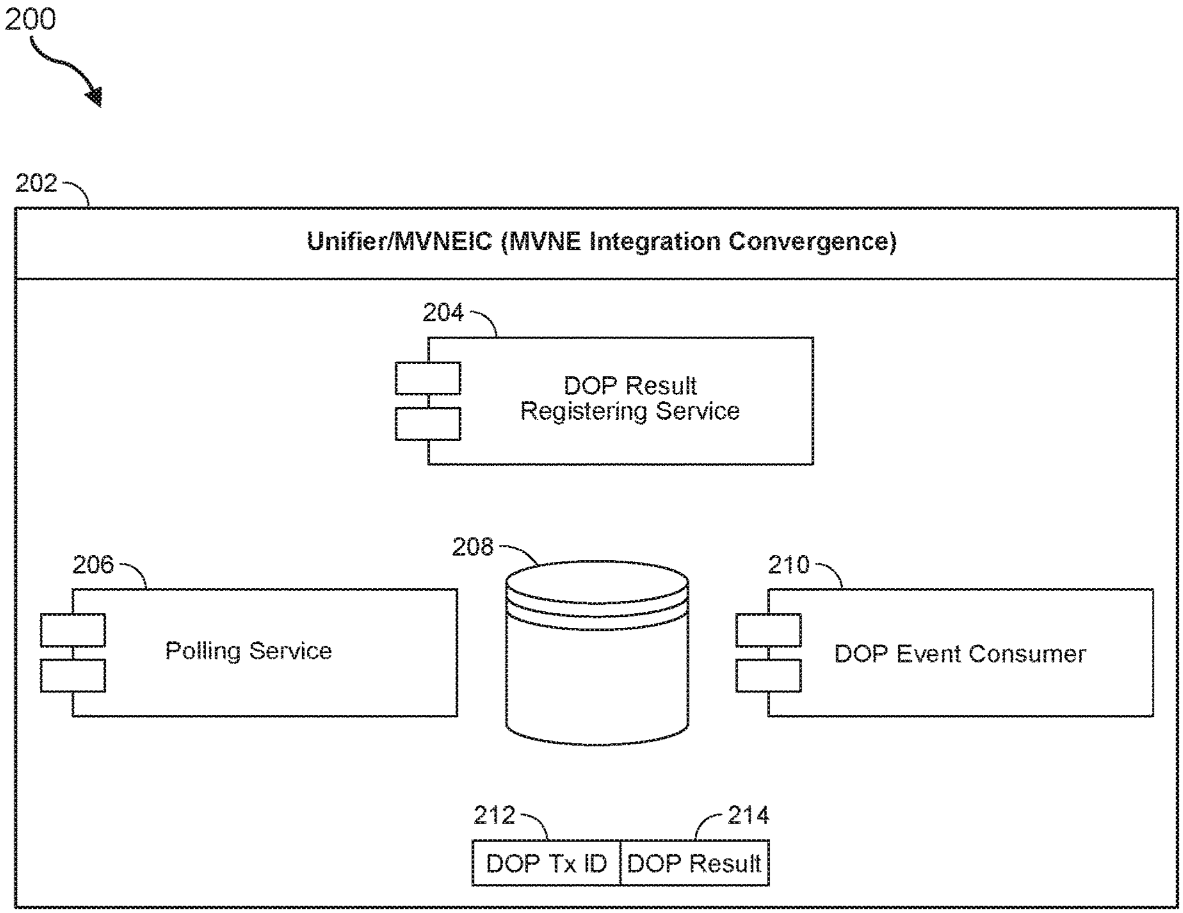
FIG. 2 shows a diagram of a mobile virtual network enabler unifier.
Figure 3:
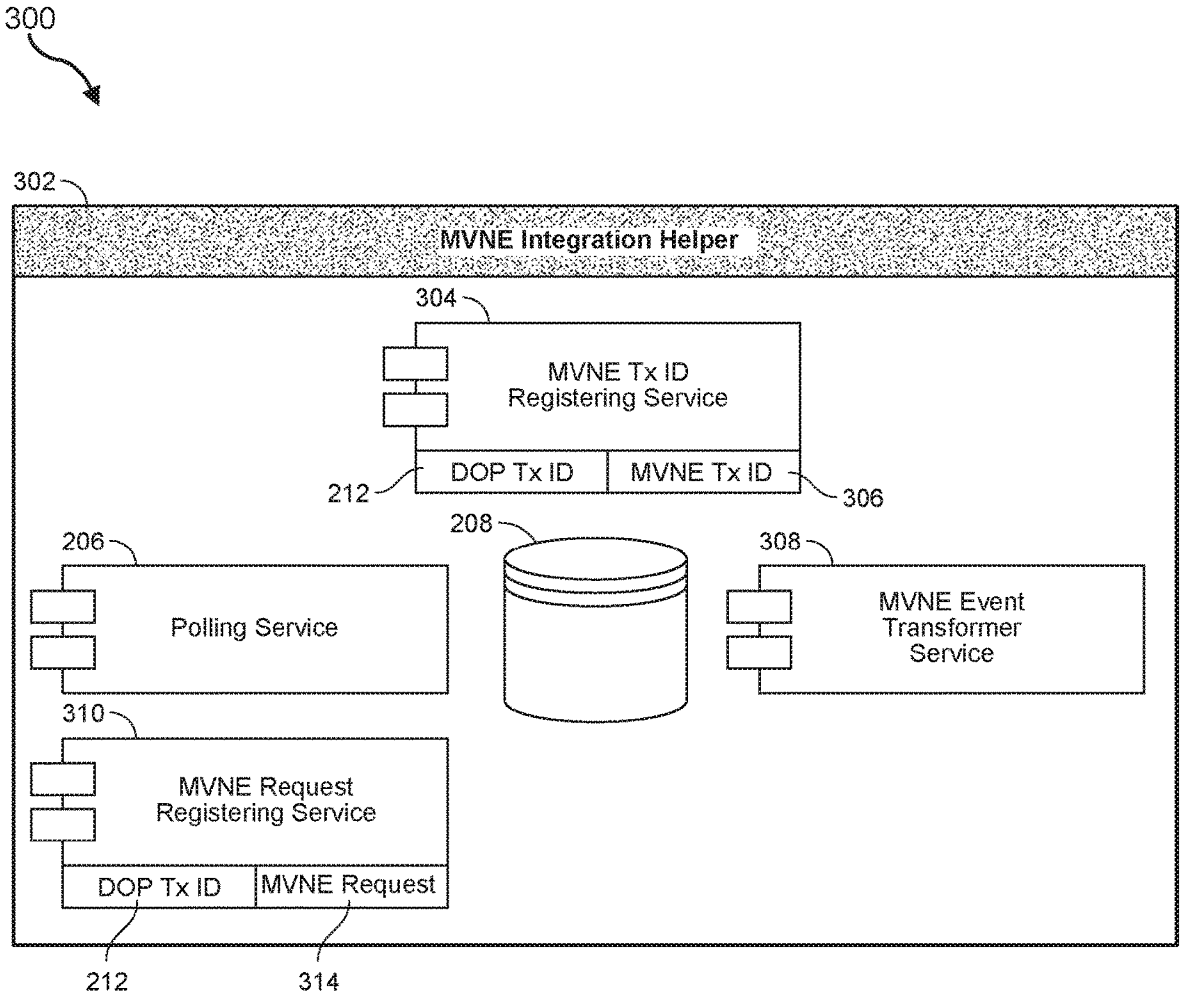
FIG. 3 shows a diagram of a mobile virtual network enabler integration helper.
Figure 4:
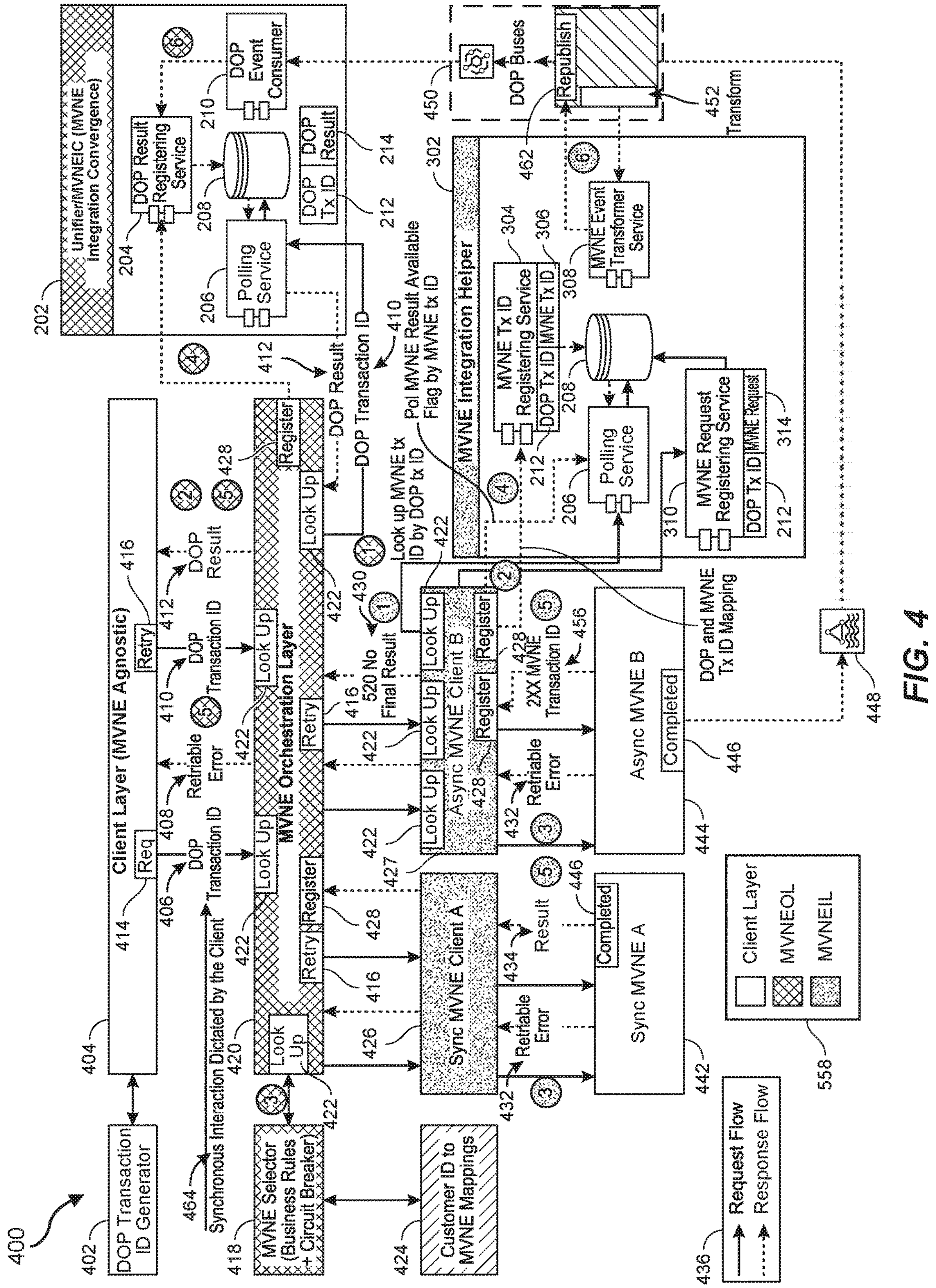
FIG. 4 shows a diagram of an interface for the digital operator platform.

To achieve one or more of the benefits or objectives outlined above, and/or to perform any one or more of the methods described within this disclosure, an overall interface to a digital operator platform for onboarding clients or customers to a mobile virtual network operator or mobile network operator is further described herein. FIGS. 2-4 provide a higher level overview of such an interface for the digital operator platform. Generally speaking, the digital operator platform may abstract away or separate conceptually two separate layers, a mobile virtual network enabler orchestration layer and a mobile virtual network enabler integration layer. In other words, in some examples, the mobile virtual network operator maintains separation between a mobile virtual network enabler orchestration layer and a mobile virtual network enabler integration layer, and the mobile virtual network operator can optionally be configured such that the mobile virtual network enabler orchestration layer only communicates with the mobile virtual network enabler through the mobile virtual network enabler integration layer. The mobile virtual network enabler orchestration layer may interface with the client while assigning particular mobile virtual network enablers to particular tasks and/or to particular types of tasks for a particular client account. In contrast, the mobile virtual network enabler integration layer may interface with the various mobile virtual network enablers while also translating and/or transforming responses and corresponding identifiers, as discussed in more detail below.

FIG. 2 shows a diagram 200 of a mobile virtual network enabler unifier or integration convergence. Mobile virtual network enabler unifier 202 may include a digital operator platform result registering service 204, a polling service 206, a database 208, and/or a digital operator platform event consumer 210. Database 208 may store items of information including a digital operator platform transaction identifier 212 and/or a digital operator platform result 214, as discussed in more detail below.

FIG. 3 shows a diagram 300 of a mobile virtual network enabler integration helper 302. As shown within this diagram, the mobile virtual network enabler integration helper may include a mobile virtual network enabler transaction identifier registering service 304, which can register respective instances of a digital operator platform transaction identifier 212 and/or a mobile virtual network enabler transaction identifier 306. The mobile virtual network enabler integration helper may also include a polling service 206, a mobile virtual network enabler event transformer service 308, and/or mobile virtual network enabler request registering service 310, which can further record instances of a digital operator platform transaction identifier 212 and/or a mobile virtual network enabler request 314. The various functions and operations to be performed by the mobile virtual network enabler unifier or unifier and/or the mobile virtual network enabler integration helper will be discussed in more detail below in connection with diagram 400 of FIG. 4 as well as the flow diagrams of FIGS. 6-7.

FIG. 4 shows a diagram 400 of an interface for the digital operator platform. According to a legend 558, diagram 400 may indicate, from a high-level perspective, a client layer, a mobile virtual network enabler orchestration layer, and/or a mobile virtual network enabler integration layer. Mobile virtual network enabler unifier 202 may be included within the mobile virtual network enabler orchestration layer. Mobile virtual network enabler integration helper 302 may be included within the mobile virtual network enabler integration layer, as shown. A legend 436 further indicates a direction of a request flow and a response flow in response to a respective request, as shown. Generally speaking, the client layer may correspond to one or more client entities, such as a customer or a retail location assisting the customer with onboarding to a mobile virtual network operator, for example. The mobile virtual network enabler orchestration layer may serve as an interface between the client layer and the mobile virtual network enabler integration layer, which may further serve as an interface between the mobile virtual network enabler orchestration layer and respective mobile virtual network enablers.

In view of the above, diagram 400 may include a digital operator platform transaction identifier generator 402, which can generate an identifier for a corresponding transaction requested by a client as part of a client layer 404. In various examples, client layer 404 may be mobile virtual network enabler-agnostic in the sense that client layer 404 may have no visibility into, and/or may have no interest in, which particular one of various mobile virtual network enablers, within a pool of candidate mobile virtual network enablers having established agreements, relationships, and/or configurations for servicing a corresponding mobile virtual network operator, has actually been assigned to performing a particular task on behalf of the client layer. In the simplified example of diagram 400, the interface to the digital operator platform is associated with at least two mobile virtual network enablers, including a synchronous mobile virtual network enabler 442 and an asynchronous mobile virtual network enabler 444, as shown. Client layer 404 may begin by issuing a request 414 to mobile virtual network enabler orchestration layer 420. Request 414 may include a digital operator platform transaction identifier 406. In response, mobile virtual network enabler orchestration layer 420 may optionally issue a retriable error 408, which can further trigger a retry 416 that further includes a digital operator platform transaction identifier 410 (e.g., which can be the same as digital operator platform transaction identifier 406). Eventually, client layer 404 may receive a digital operator platform result 412 from mobile virtual network enabler orchestration layer 420. An indicator 464 indicates that synchronous interactions between client layer 404 and mobile virtual network enabler orchestration layer 420 may be dictated by the client.

At mobile virtual network enabler orchestration layer 420, different instances of a look up 422 may be performed in response to the transmissions from client layer 404. In response to request 414, mobile virtual network enabler orchestration layer 420 may interface with the mobile virtual network enabler selector 418, which can optionally include business rules and/or a circuit breaker, as shown. Mobile virtual network enabler selector 418 may also interface with a database 424 that indicates customer identifier to mobile virtual network enabler mappings, which can correspond to the translation table discussed at length above. Accordingly, mobile virtual network enabler selector 418 may select a particular mobile virtual network enabler to perform the task associated with request 414.

Mobile virtual network enabler orchestration layer 420 may forward the request to synchronous mobile virtual network enabler 442 in a scenario where mobile virtual network enabler selector 418 selects that particular mobile virtual network enabler and/or specifies that the mobile virtual network enabler to be chosen should form a synchronous connection with the mobile virtual network enabler integration layer. In the case of a synchronous mobile virtual network enabler, a retriable error 432 and/or a result 434 may be issued by mobile virtual network enabler 442 toward a component 426 of the mobile virtual network enabler integration layer in response to the communications from mobile virtual network enabler orchestration layer 420. Mobile virtual network enabler orchestration layer 420 may issue a retriable error and/or register a result in response to communications from component 426. Mobile virtual network enabler 442 may register that the result is completed according to an indicator 446.

In contrast, in the case of an asynchronous mobile virtual network enabler, one or more instances of a look up 422 may be performed in order to look up one or more details regarding request 414 from client layer 404. A component 426 of the mobile virtual network enabler integration layer may receive a retriable error 432 and/or may receive a transaction identifier 456 with a corresponding hypertext transfer protocol status code, as shown. Another instance of indicator 446 shows how mobile virtual network enabler 444 may register that the result is completed. Mobile virtual network enabler 444 may issue a corresponding event 448 across an event bus, which can correspond to digital operator platform buses 450, for reporting the final result to mobile virtual network enabler unifier 202, as shown. In some examples, the event buses may include Amazon EventBridge event buses or other buses configured according to a serverless and/or event-driven architecture.

The differences between synchronous and asynchronous connections can be reflected in the differences between component 426 and component 427 within the mobile virtual network enabler integration layer, where component 426 is the portion of the mobile virtual network enabler integration layer directed to synchronous mobile virtual network enablers and component 427 is the portion of the mobile virtual network enabler integration layer directed to asynchronous mobile virtual network enablers. In particular, transaction identifier 456 and the corresponding hypertext transfer protocol status code, as well as a no final result indicator 430, show how the asynchronous connection does not necessarily provide the final result in a real-time or synchronized manner. Accordingly, the mobile virtual network enabler integration layer may translate a 2XX hypertext transfer protocol status code into a 520 hypertext transfer protocol status code such that client layer 404 is notified to retry its request despite the fact that the final result was not initially sent. This reflects the fact that, in some scenarios, client layer 404 may not necessarily have any visibility into, or any awareness of, the fact that the corresponding mobile virtual network enabler performing the task on behalf of the client layer is connected to the digital operator platform across an asynchronous connection. Rather, client layer 404 may establish a synchronous connection with mobile virtual network enabler orchestration layer 420, as discussed above. In various examples, the status codes and/or corresponding messages between mobile virtual network enablers and the digital operator platform may be formatted or issued according to a representational state transfer application programming interface.

Diagram 400 also includes a sequence of numbered steps that are shaded according to different types of hatching for the mobile virtual network enabler orchestration layer and for the mobile virtual network enabler integration layer, respectively. The steps correspond to the steps of the methods shown within FIGS. 6-7, as discussed in more detail below.

The mobile virtual network enabler integration layer and mobile virtual network enabler orchestration layer 420 may operate through the functionality of their respective subcomponents, which were introduced above in connection with FIGS. 2-3. Generally speaking, mobile virtual network enabler unifier 202 may provide polling service 206 that enables mobile virtual network enabler orchestration layer 420 to poll to check whether a final result has been issued for a corresponding transaction. These transactions and these final results are stored according to identifiers that are canonical or centralized with respect to the digital operator platform. In other words, these identifiers can be mobile virtual network enabler-agnostic. For example, one or more of the records associated with a corresponding transaction and/or a corresponding result would not necessarily reveal or indicate which particular mobile virtual network enabler performed the task generating a corresponding final result. Digital operator platform event consumer 210 may consume events across digital operator platform buses 450 indicating final results from corresponding mobile virtual network enablers. Digital operator platform result registering service 204 may register these final results in database 208, as shown.

In contrast, mobile virtual network enabler integration helper 302 may facilitate the translation between digital operator platform identifiers (e.g., identifiers assigned by the mobile virtual network operator), on the one hand, and mobile virtual network enabler identifiers (e.g., identifiers assigned by respective mobile virtual network enablers), on the other hand. Polling service 206 within mobile virtual network enabler integration helper 302 enables the mobile virtual network enabler integration layer to check whether a final result has been received for a corresponding transaction. Mobile virtual network enabler integration helper 302 may effectively translate a client-facing digital operator platform transaction identifier onto a mobile virtual network enabler transaction identifier used by the corresponding mobile virtual network enabler. Similarly, mobile virtual network enabler integration helper 302 may map a digital operator platform transaction identifier 212 onto a corresponding mobile virtual network enabler request 314, which uses an enabler-specific request identifier. Upon receiving a final result from one or more mobile virtual network enablers, mobile virtual network enabler event transformer service 308 may transform the received or original final result into a format that is mobile virtual network enabler-agnostic according to a transformation step 452. One or more details of these various transformation procedures will be discussed in more detail below in connection with FIGS. 5G-5I.

Figure 5A:
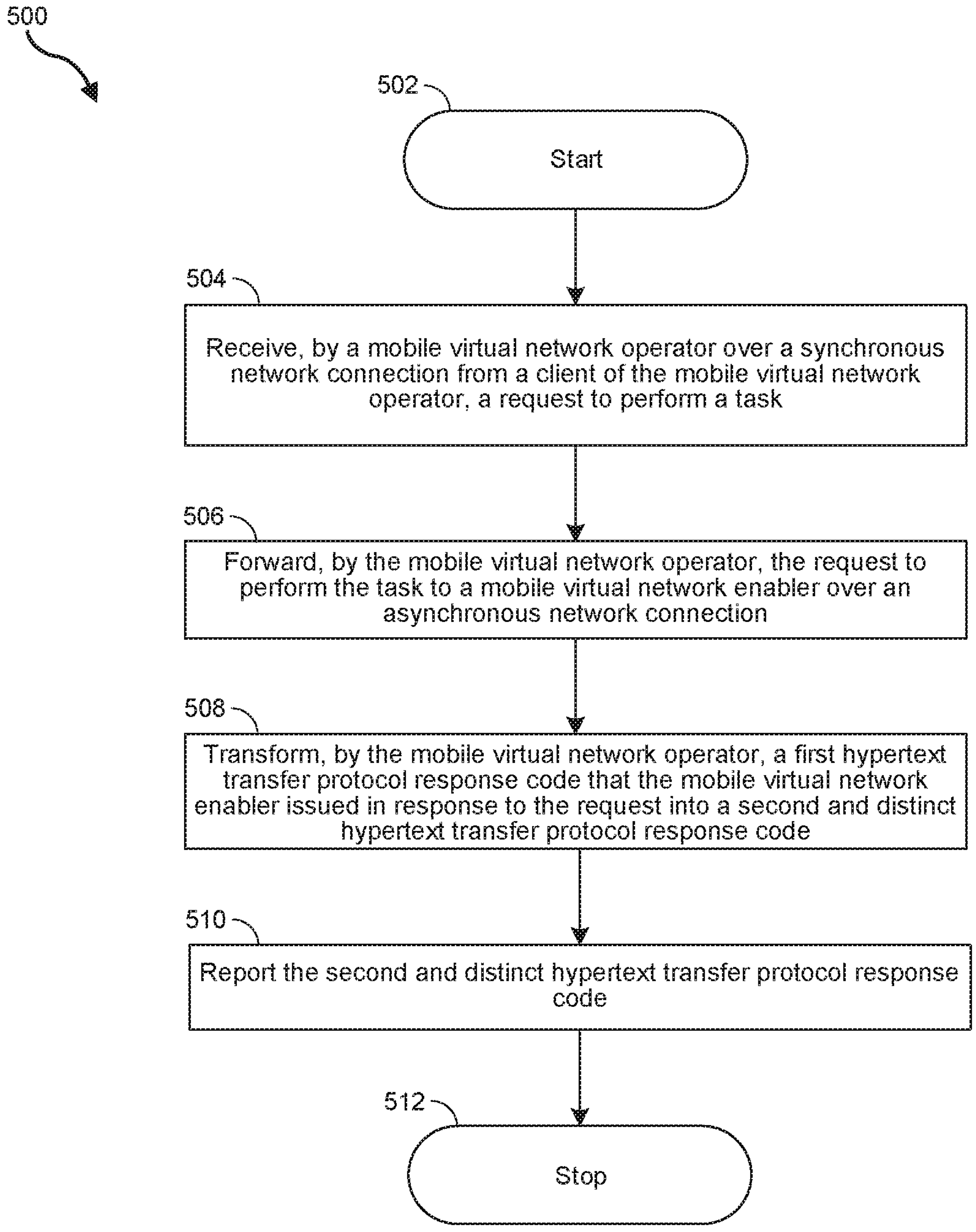
FIG. 5A shows a flow diagram for a method relating to the interface for the digital operator platform including a hypertext transfer protocol response code transformation feature.

FIG. 5A shows a flow diagram for a method 500 relating to the interface for the digital operator platform including a hypertext transfer protocol response code transformation feature. At step 502, method 500 may start or begin. At step 504, method 500 may include receiving, by a mobile virtual network operator over a synchronous network connection from a client of the mobile virtual network operator, a request to perform a task relating to a telecommunication account of the client with the mobile virtual network operator. At step 506, method 500 may include forwarding, by the mobile virtual network operator, the request to perform the task to a mobile virtual network enabler over an asynchronous network connection. At step 508, method 500 may include transforming, by the mobile virtual network operator, a first hypertext transfer protocol response code that the mobile virtual network enabler issued in response to the request into a second and distinct hypertext transfer protocol response code. At step 510, method 500 may include reporting, by the mobile virtual network operator to the client, the second and distinct hypertext transfer protocol response code. At step 512, method 500 may stop or conclude.

Figure 5B:
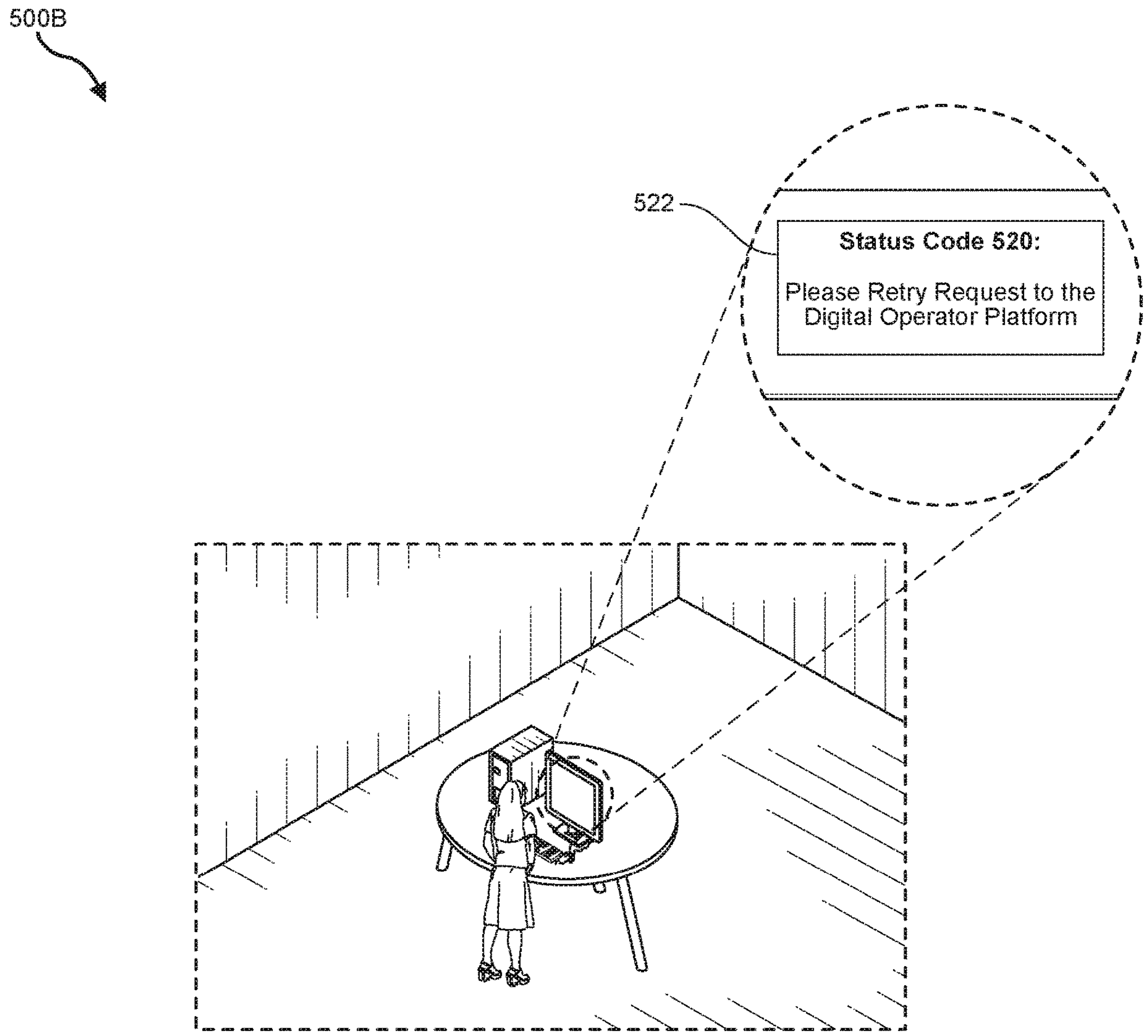
FIG. 5B shows a diagram of a client interacting with the interface for the digital operator platform.
Figure 5C:
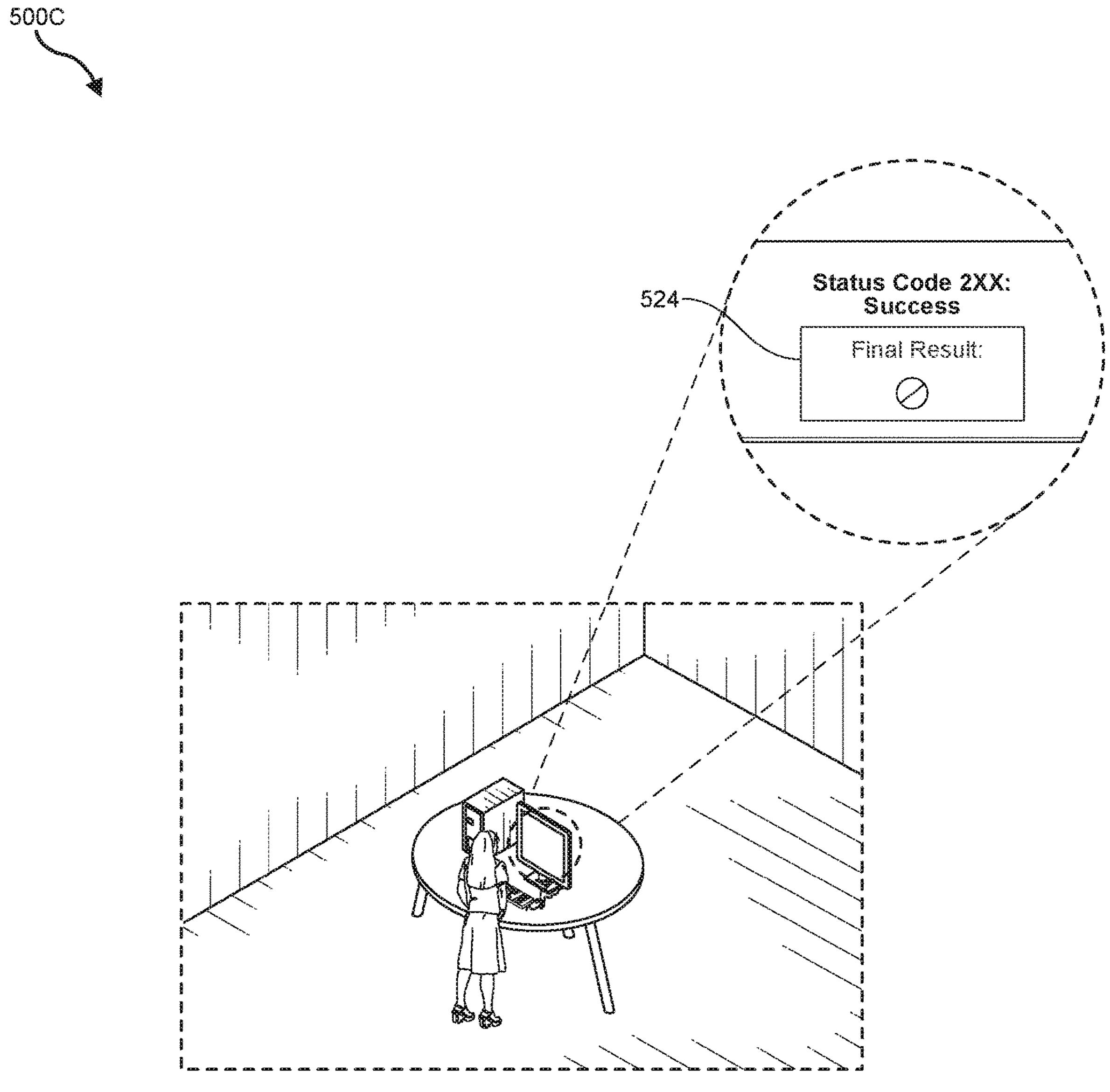
FIG. 5C shows another diagram of the client interacting with the interface with the digital operator platform.

FIGS. 5B-5C show a diagram 500B and a diagram 500C, respectively, indicating how method 500 may solve a problem associated with asynchronous and synchronous connections in the context of the interface to the digital operator platform. Diagram 500B shows an agent, who can be working on behalf of a client or customer, receiving a message 522 corresponding to a scenario in which the hypertext transfer protocol status code has been transformed. In this scenario, message 522 indicates a hypertext transfer protocol status code 520, which can correspond to a server-side error and/or indication for the client to retry the respective request. The agent can receive message 522 despite the fact that the respective mobile virtual network enabler was connected to the digital operator platform through an asynchronous connection and originally issued a 2XX status code. In other words, the mobile virtual network enabler may initially issue a success status code (e.g., 2XX) along with a transaction identifier in response to receiving the request from the client through the mobile virtual network enabler orchestration layer. The success status code indicates that the mobile virtual network enabler has successfully received the request and, consistent with the synchronous nature of the connection between the mobile virtual network enabler and the digital operator platform, the mobile virtual network enabler will subsequently supply the final result associated with the corresponding request.

Despite the above, the client may have established a synchronous connection with the digital operator platform and, furthermore, the client may have no visibility into, or awareness of, the fact that the mobile virtual network enabler has established an asynchronous connection with the digital operator platform. Accordingly, there is a risk that the client would expect the answer from the digital operator platform and mobile virtual network enabler to be consistent with a synchronous connection rather than an asynchronous connection. Consistent with a synchronous connection, a success status code should be accompanied with the final result being supplied in a real-time, simultaneous, and/or synchronous manner. Nevertheless, due to the fact that the mobile virtual network enabler is operating according to an asynchronous connection, the final result would be missing in the original message from the mobile virtual network enabler responding to the request from the client. For this reason, it can be beneficial for the digital operator platform including the mobile virtual network enabler integration layer to transform the hypertext transfer protocol status code from the success status code of 2XX to a server-side error, an indication to retry the request, and/or 5XX or 520 status code. By performing this transformation, the agent in diagram 500B receives the correct and appropriate indication to retry the request to the digital operator platform due to the server-side error indicating that the final result has not yet been supplied. The agent also avoids receiving an incorrect and inappropriate message 524 in diagram 500C. As further shown within this diagram, the agent would receive a status code indicating success, which would indicate to the client across the synchronous connection that the final result should be obtainable, and yet the final result is not included within the message returned from the mobile virtual network enabler, due to the fact that the mobile virtual network enabler is connected to the digital operator platform through an asynchronous connection. Accordingly, the transformation procedure of method 500 helps to overcome the above conflict that can result otherwise in the context of establishing a digital operator platform and corresponding interface that is agnostic with respect to various underlying mobile virtual network enablers providing services for the mobile virtual network operator. More generally, the act of transforming, by the mobile virtual network operator, the first hypertext transfer protocol response code that the mobile virtual network enabler issued in response to the request into a second and distinct hypertext transfer protocol response code resolves a conflict that would otherwise result from a difference between the synchronous network connection and the asynchronous network connection. In other words, the act of transforming, by the mobile virtual network operator, the first hypertext transfer protocol response code that the mobile virtual network enabler issued in response to the request into a second and distinct hypertext transfer protocol response code prevents the client from interpreting the first hypertext transfer protocol response code as indicating that the mobile virtual network enabler has completed the task relating to the telecommunication account of the client.

Figure 5D:
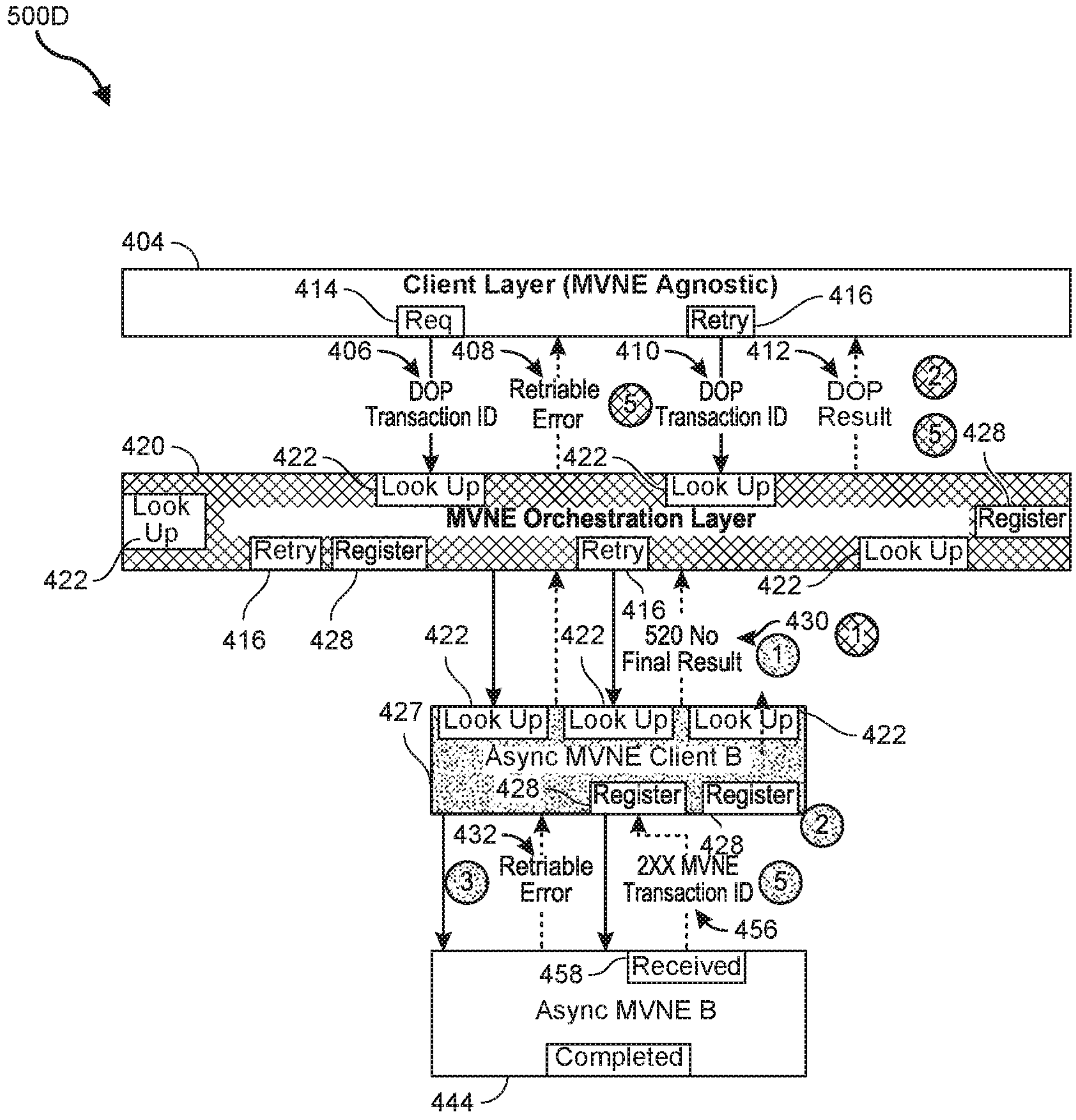
FIG. 5D shows an excerpt of the diagram of the interface with the digital operator platform that focuses upon an asynchronous connection with a mobile virtual network enabler.

FIG. 5D shows an excerpt 500D of diagram 400 of the interface with the digital operator platform that focuses upon an asynchronous connection with a mobile virtual network enabler. Excerpt 500D focuses on, and highlights, how component 427 of the mobile virtual network enabler integration layer receives a transaction identifier 456 with a corresponding hypertext transfer protocol status code indicating success across the asynchronous connection between the mobile virtual network enabler and the mobile virtual network enabler integration layer. Accordingly, excerpt 500D further illustrates how component 427 may transform the success status code 2XX into a 5XX or 520 status code indicating that no final result has been received, consistent with the asynchronous nature of the connection between the mobile virtual network enabler and component 427, despite the fact that client layer 404 has established a synchronous connection with the digital operator platform including mobile virtual network enabler orchestration layer 420.

Figure 5E:
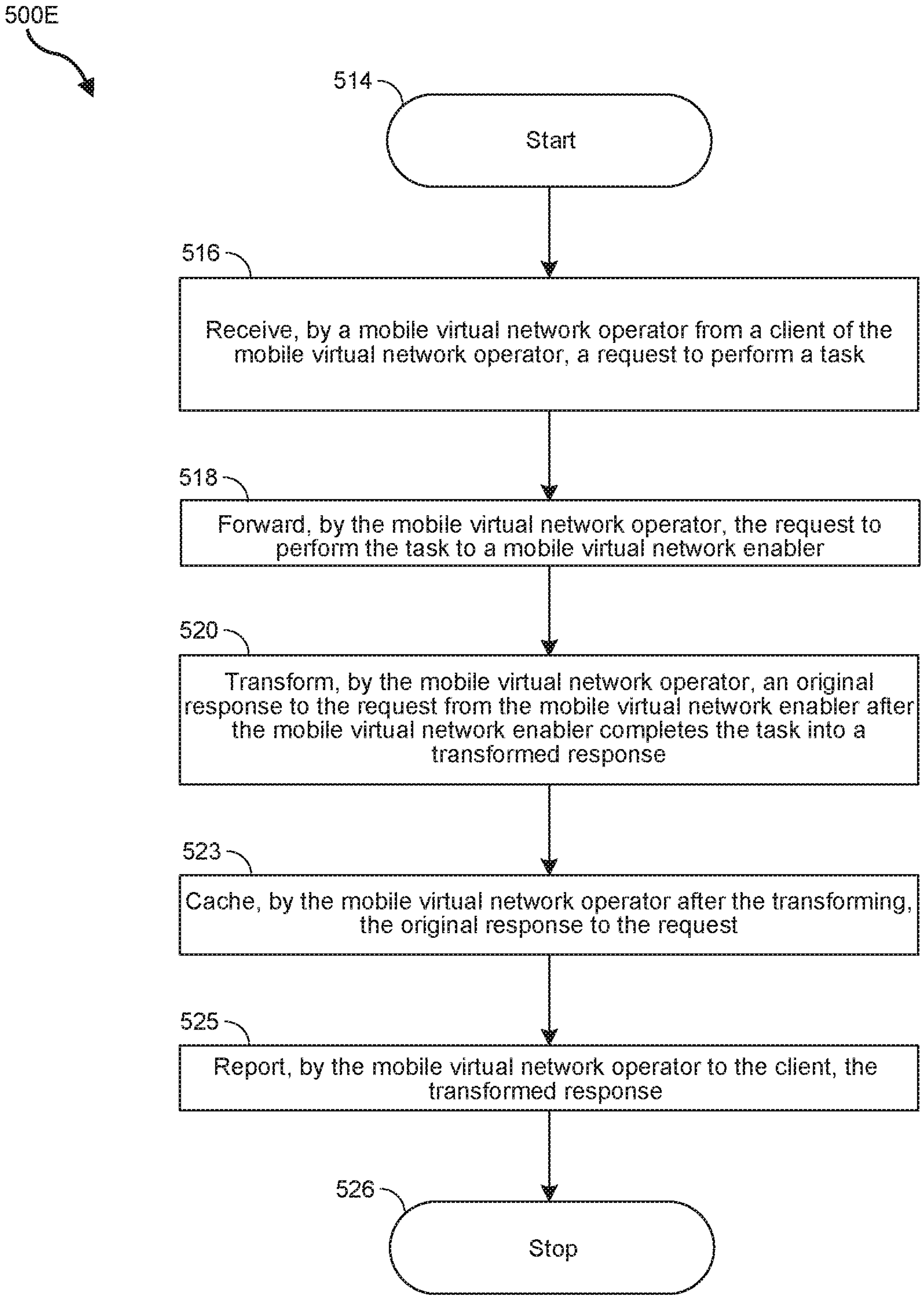
FIG. 5E shows a flow diagram for a method relating to the interface for the digital operator platform including a final result transformation feature.

FIG. 5E shows a flow diagram for a method 500E relating to the interface for the digital operator platform including a final result transformation feature. At step 514, method 500E may start or begin. At step 516, method 500E may include receiving, by a mobile virtual network operator from a client of the mobile virtual network operator, a request to perform a task relating to a telecommunication account of the client with the mobile virtual network operator. At step 518, method 500E may include forwarding, by the mobile virtual network operator, the request to perform the task to a mobile virtual network enabler. At step 520, method 500E may include transforming, by the mobile virtual network operator, an original response to the request from the mobile virtual network enabler after the mobile virtual network enabler completes the task into a transformed response that is agnostic between mobile virtual network enablers. At step 523, method 500E may include caching, by the mobile virtual network operator after the transforming, the original response to the request for reference by a troubleshooting component. At step 525, method 500E may include reporting, by the mobile virtual network operator to the client, the transformed response. At step 526, method 500E may stop or conclude. As used herein, the phrase "transformed response that is agnostic between mobile virtual network enablers" generally refers to modifying responses from various mobile virtual network enablers having different respective regional formats to render them into a standardized format. In various examples, the standardized or transformed responses may be stored within a database such that, after the transformation, the formatting of the responses does not indicate which mobile virtual network enabler originally created the response, consistent with the discussion below.

Whereas method 500 provides for a transformation procedure to transform corresponding hypertext transfer protocol response codes in response to initial requests from clients, method 500E provides a transformation procedure to transform the final results issued by the mobile virtual network enablers in response to these requests from the clients. In other words, the initial responses may acknowledge receipt of the original request and provide a corresponding transaction identifier, whereas the final responses may include the result of performing the task originally requested by the client. To achieve the mobile virtual network enabler-agnostic feature of the digital operator platform, one or both of these transformation procedures may be utilized, consistent with the discussion above.

Figure 5F:
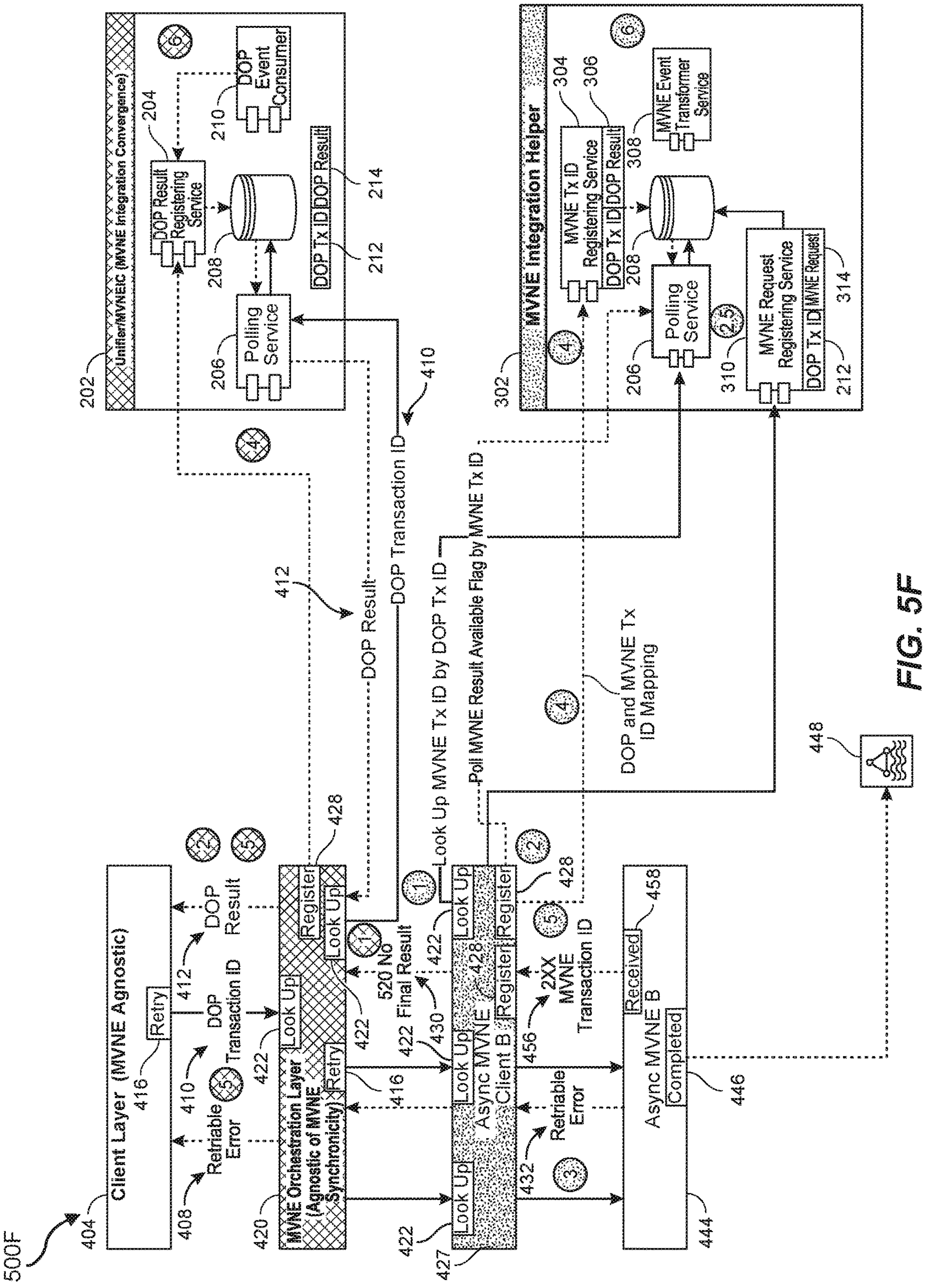
FIG. 5F shows a diagram of another excerpt from the diagram for the interface to the digital operator platform focusing upon an asynchronous connection with the mobile virtual network enabler.

FIG. 5F shows a diagram 500F of another excerpt from diagram 400 for the interface to the digital operator platform focusing upon the asynchronous connection with the mobile virtual network enabler. As further shown within this diagram, mobile virtual network enabler 444 may issue a corresponding event 448 for the final result across an event bus, which can correspond to digital operator platform buses 450 (see FIG. 4), for reporting the final result to mobile virtual network enabler unifier 202, as shown. Mobile virtual network enabler event transformer service 308 may retrieve the original final response from digital operator platform buses 450 and may furthermore effectively transform the final result into a format that is mobile virtual network enabler-agnostic, as discussed in more detail below in connection with FIGS. 5G-5I. After transformation, mobile virtual network enabler event transformer service 308 may further forward the transformed and/or enabler-agnostic final result across digital operator platform buses 450, from where digital operator platform event consumer 210 within mobile virtual network enabler unifier 202 may consume the corresponding event for recording within its instance of database 208.

Figure 5G:
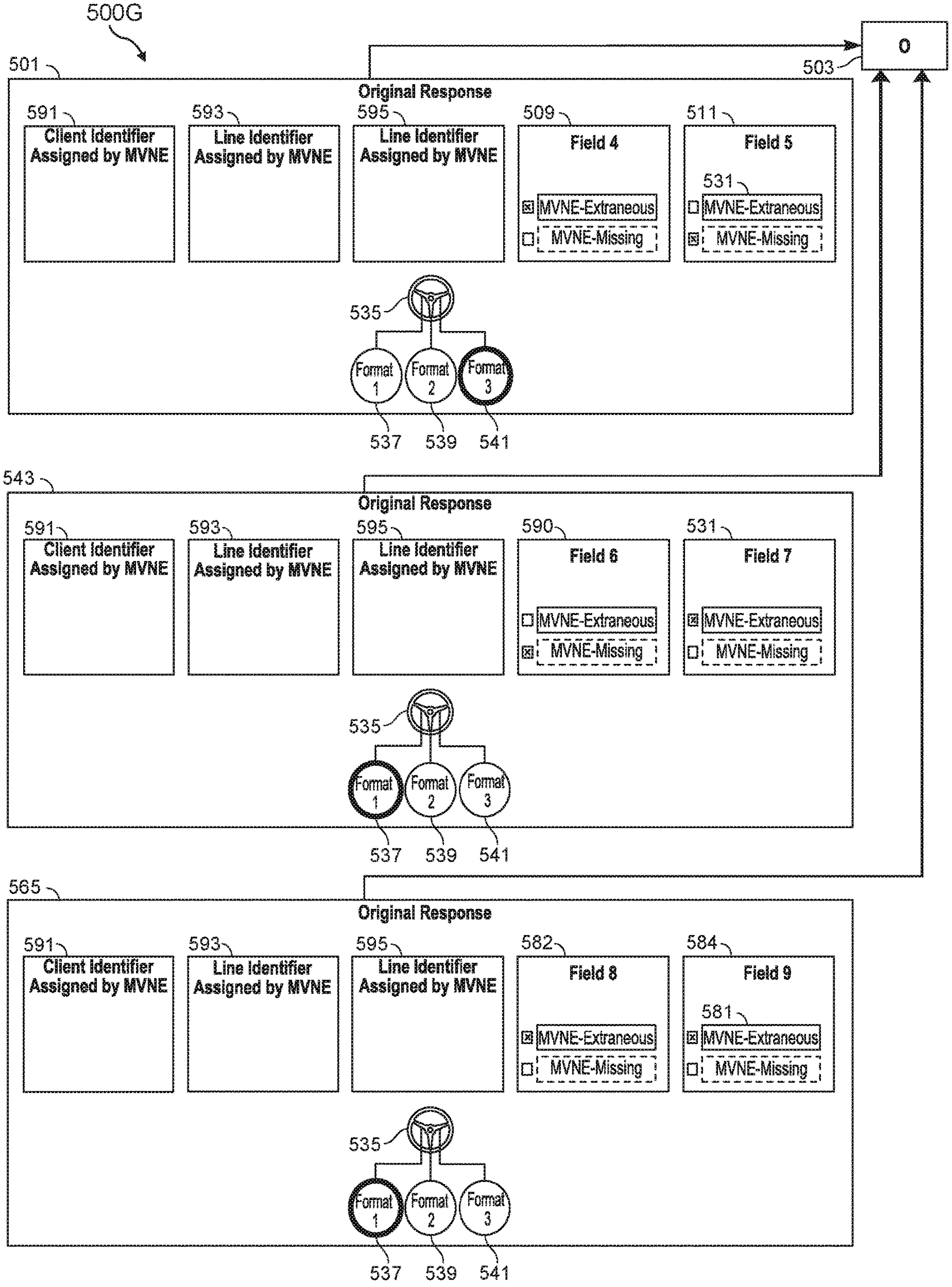
FIG. 5G shows a series of diagrams indicating different types of formatting for original responses from mobile virtual network enablers to requests from the mobile virtual network operator.

FIG. 5G shows a series 500G of diagrams, including a diagram 501, a diagram 543, and a diagram 565, indicating different types of formatting for original responses from mobile virtual network enablers to requests from the mobile virtual network operator. Each one of the separate diagrams indicates a separate original response from a different respective mobile virtual network enabler. By way of example, diagram 501 shows that the original response may include a client identifier 591 assigned by the mobile virtual network enabler, a line identifier 593 assigned by the mobile virtual network enabler, a line identifier 595 assigned by the mobile virtual network enabler, a field 509 that is extraneous or unnecessary from the perspective of the digital operator platform, and/or a field 511 that is missing from the original response but nevertheless requested or required by the digital operator platform. Diagram 543 and diagram 565 parallel diagram 501, except that diagram 543 includes a field 590 that is missing and a field 531 that is extraneous, whereas diagram 565 includes a field 582 that is extraneous and a field 584 that is also extraneous. An indicator 503 further indicates that all of these original responses may be stored together within a database in a batch operation, as discussed in more detail below.

Additionally, representative diagram 501 further includes a wheel indicator 535 associated with a format 537, a format 539, and a format 541, which together indicate how the corresponding original response from the mobile virtual network enabler can be slotted to, or configured according to, a particular format. In this particular example, format 541 is the format of the original response corresponding to diagram 501. In contrast, diagram 543 shows that its original response is formatted according to format 537. Similarly, diagram 565 shows that its original response is formatted according to format 537. Each one of these different formats may correspond to a different format used by a respective mobile virtual network enabler. The different formats may include or omit different lines, fields, values, data structures, etc. In some examples, different formats and/or different parts of these formats may include different file formats or be formatted according to different file extensions. The inclusion of extraneous fields and/or missing fields, as discussed above, further helps to illustrate how one format of original responses from a respective mobile virtual network enabler may include values or information that is extraneous, and can be stripped from, the original response, or that is missing and needs to be inserted into, as part of an enriching procedure, the original response. In other words, in some examples, transforming, by the mobile virtual network operator, the original response to the request from the mobile virtual network enabler after the mobile virtual network enabler completes the task into the transformed response that is agnostic between mobile virtual network enablers comprises includes stripping at least one value from the original response or enriching the original response with at least one value.

Generally speaking, the digital operator platform at the mobile virtual network enabler orchestration layer operates using a uniform, canonical, client-facing, standardized, and/or enabler-agnostic format. In the example of these figures for illustrative purposes, this format may correspond to format 539. Accordingly, the original responses for diagram 501, diagram 543, and diagram 565 may benefit from, or require, a transformation procedure to be transformed into format 539 that serves as the enabler-agnostic and/or standardized format to be referenced by the mobile virtual network enabler orchestration layer, consistent with the discussion above.

Figure 5H:
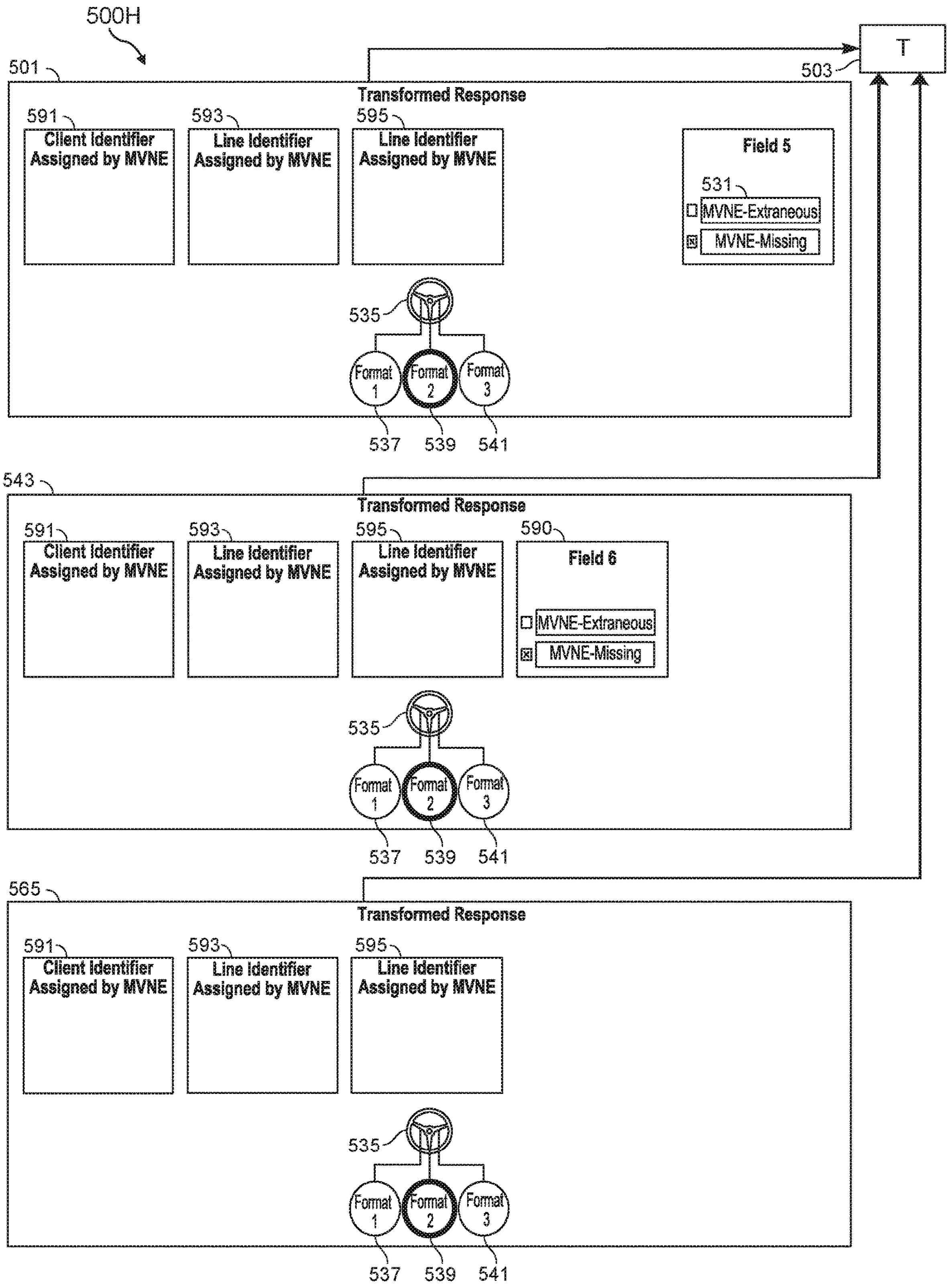
FIG. 5H shows a series of diagrams indicating a consistent format, after transformation, for the responses from the mobile virtual network enablers.

In contrast to series 500G, series 500H in FIG. 5H shows a version of diagram 501, a version of diagram 543, and a version of diagram 565, after the performance of the transformation procedure. Accordingly, each one of the diagrams within this figure indicates that it has been converted to format 539, as shown. Moreover, the fields within these diagrams that were previously indicated as extraneous in FIG. 5G have been deleted. Additionally, the fields within these diagrams that were previously indicated as missing have been inserted, as indicated by the transition from dashed lines for these fields in FIG. 5G to straight lines for these fields in FIG. 5H. Moreover, indicator 503 has been updated to indicate that each one of these transformed response has been furthermore stored within a corresponding database in a batch operation, as discussed in more detail below. Generally speaking, in various examples, transforming, by the mobile virtual network operator, the original response to the request from the mobile virtual network enabler after the mobile virtual network enabler completes the task into the transformed response that is agnostic between mobile virtual network enablers obfuscates an identity of the mobile virtual network enabler from a perspective of the client.

Figure 5I:
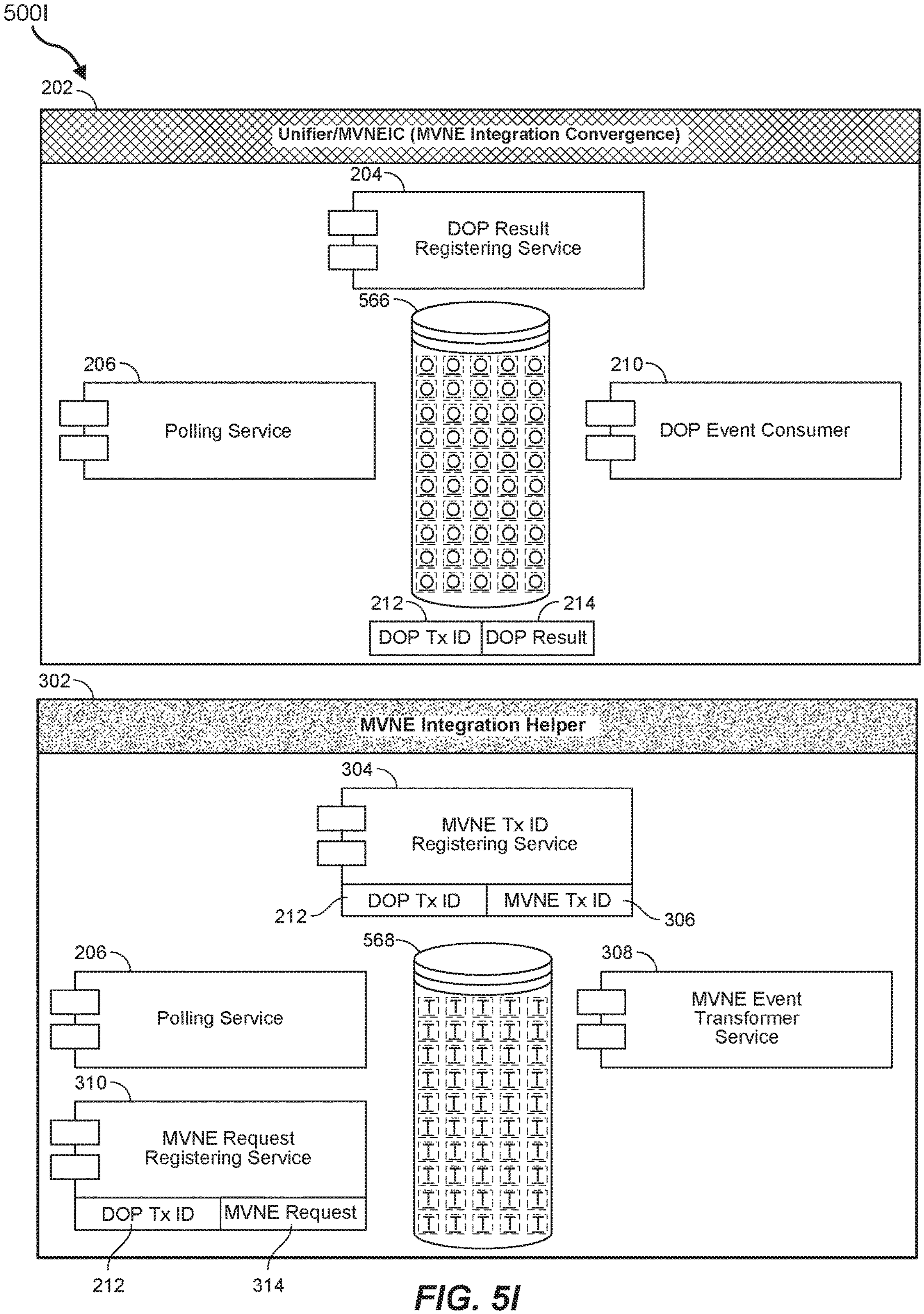
FIG. 5I shows a diagram indicating how original responses from mobile virtual network enablers may be stored within the mobile virtual network enabler unifier and transformed responses from mobile virtual network enablers may be stored within the mobile virtual network enabler integration helper.

FIG. 5I shows a diagram 500I indicating how original responses from mobile virtual network enablers may be stored within the mobile virtual network enabler unifier and transformed responses from mobile virtual network enablers may be stored within the mobile virtual network enabler integration helper. In particular, an updated database 566 within mobile virtual network enabler unifier 202 may store original responses received from respective mobile virtual network enablers, as discussed above. Accordingly, database 566 shows a plurality of "O"s corresponding to these original responses and indicator 503. Similarly, in an updated database 568 within mobile virtual network enabler integration helper 302 stores the transformed responses from the mobile virtual network enablers. Accordingly, database 568 shows a plurality of "T"s corresponding to these transformed responses and indicator 503, as discussed above.

Figure 5J:
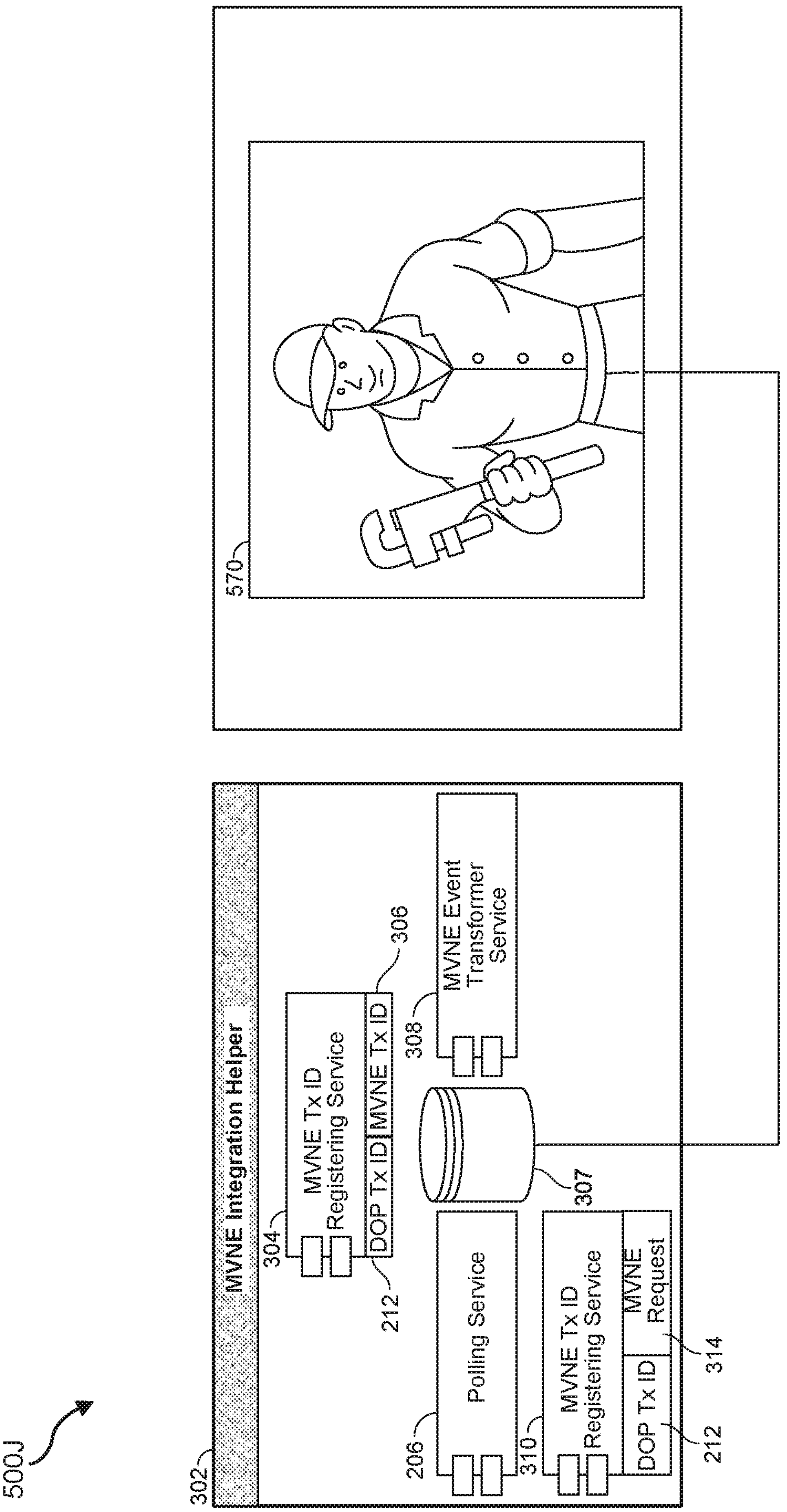
FIG. 5J shows a diagram illustrating how the caching of original responses from mobile virtual network enablers may facilitate a troubleshooting component.

Consistent with the discussion above, FIG. 5J shows a diagram 500J illustrating how the caching of original responses from mobile virtual network enablers may facilitate a troubleshooting component 570. In other words, although the mobile virtual network enabler orchestration layer may benefit from standardized responses to provide a standardized client-facing interface with respect to the client layer, the original responses prior to the transformation procedure may contain one or more items of information, or formatting aspects, they can be beneficial to troubleshooting component in a scenario where a problem arises with one or more client requests or corresponding transaction. Accordingly, although the digital operator platform may maintain the standardized responses, which may instruct one or more items of enabler-specific information from the original responses, for the benefit of the mobile virtual network enabler orchestration layer, the digital operator platform may also optionally maintain a cash of the original responses within a database of the mobile virtual network enabler integration layer, as shown, and as further discussed above.

Figure 6:
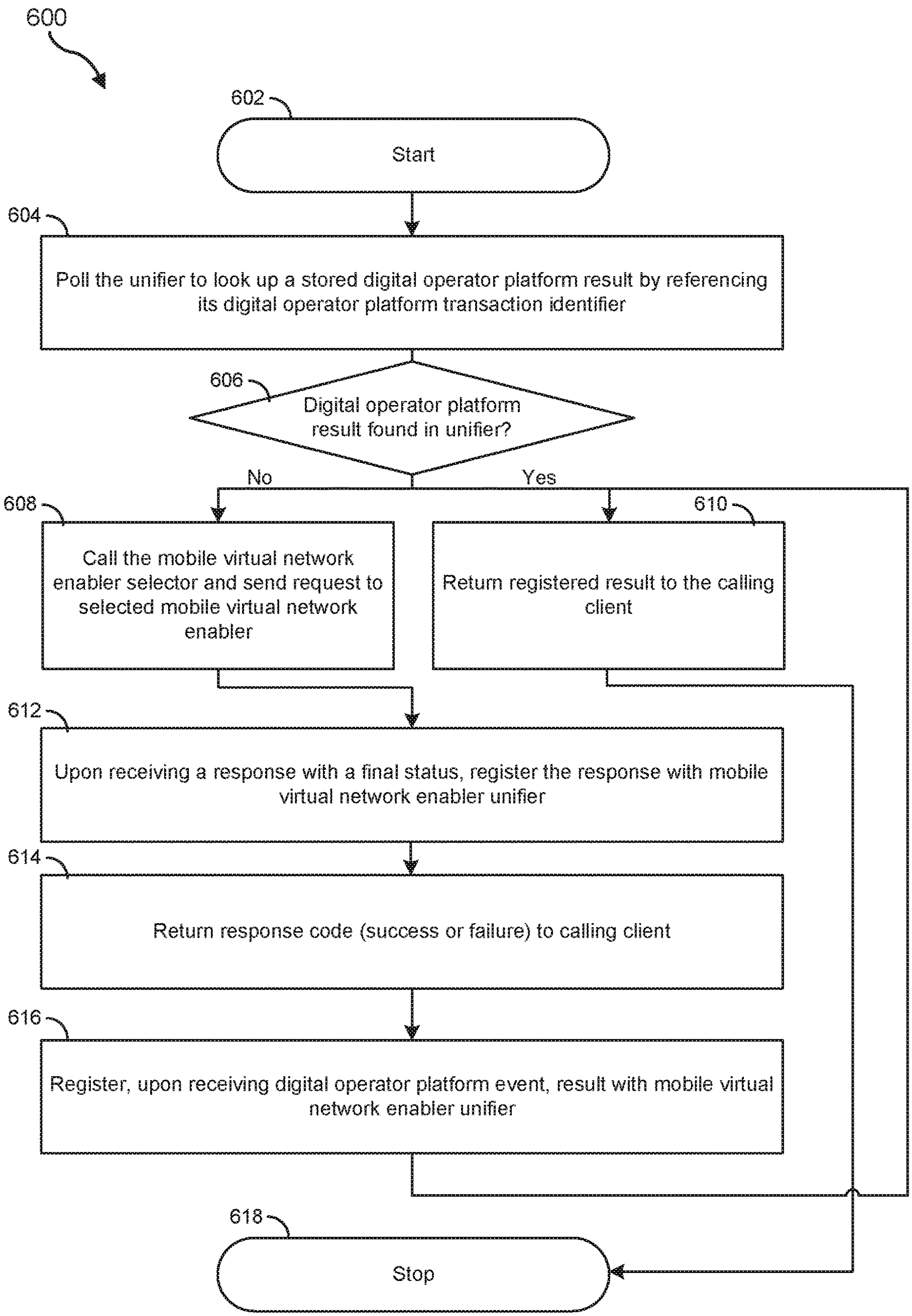
FIG. 6 shows a flow diagram for a method to be performed by a mobile virtual network enabler orchestration layer.

FIG. 6 shows a flow diagram for a method 600 to be performed by the mobile virtual network enabler orchestration layer. At step 602, method 600 may start or begin. At step 604, the mobile virtual network enabler orchestration layer may poll unifier to look up a stored digital operator platform result by referencing its digital operator platform transaction identifier (see step 1 for the mobile virtual network enabler orchestration layer in diagram 400). At step 606, the mobile virtual network enabler orchestration layer may ascertain whether a digital operator platform result is found in the unifier. If the answer is yes at step 606, then method 600 may proceed to a step 610, at which point the mobile virtual network enabler orchestration layer may return the registered result to the calling client (see step 2 for the mobile virtual network enabler orchestration layer in diagram 400). If the answer is no at step 606, then method 600 may proceed to a step 608, at which point the mobile virtual network enabler orchestration layer may call the mobile virtual network enabler selector and send the corresponding request to the selected mobile virtual network enabler (see step 3 for the mobile virtual network enabler orchestration layer in diagram 400). At step 612, upon receiving a response with a final status, the mobile virtual network enabler orchestration layer may register the response with the mobile virtual network enabler unifier (see step 4 for the mobile virtual network enabler orchestration layer in diagram 400). At step 614, the mobile virtual network enabler orchestration layer may return a response code, whether success or failure, to the calling client. (see step 5 for the mobile virtual network enabler orchestration layer in diagram 400). At step 616, the mobile virtual network enabler orchestration layer may register, upon receiving a corresponding digital operator platform event, the result with the mobile virtual network enabler unifier (see step 6 for the mobile virtual network enabler orchestration layer in diagram 400). At step 618, method 600 may stop or conclude.

Figure 7:
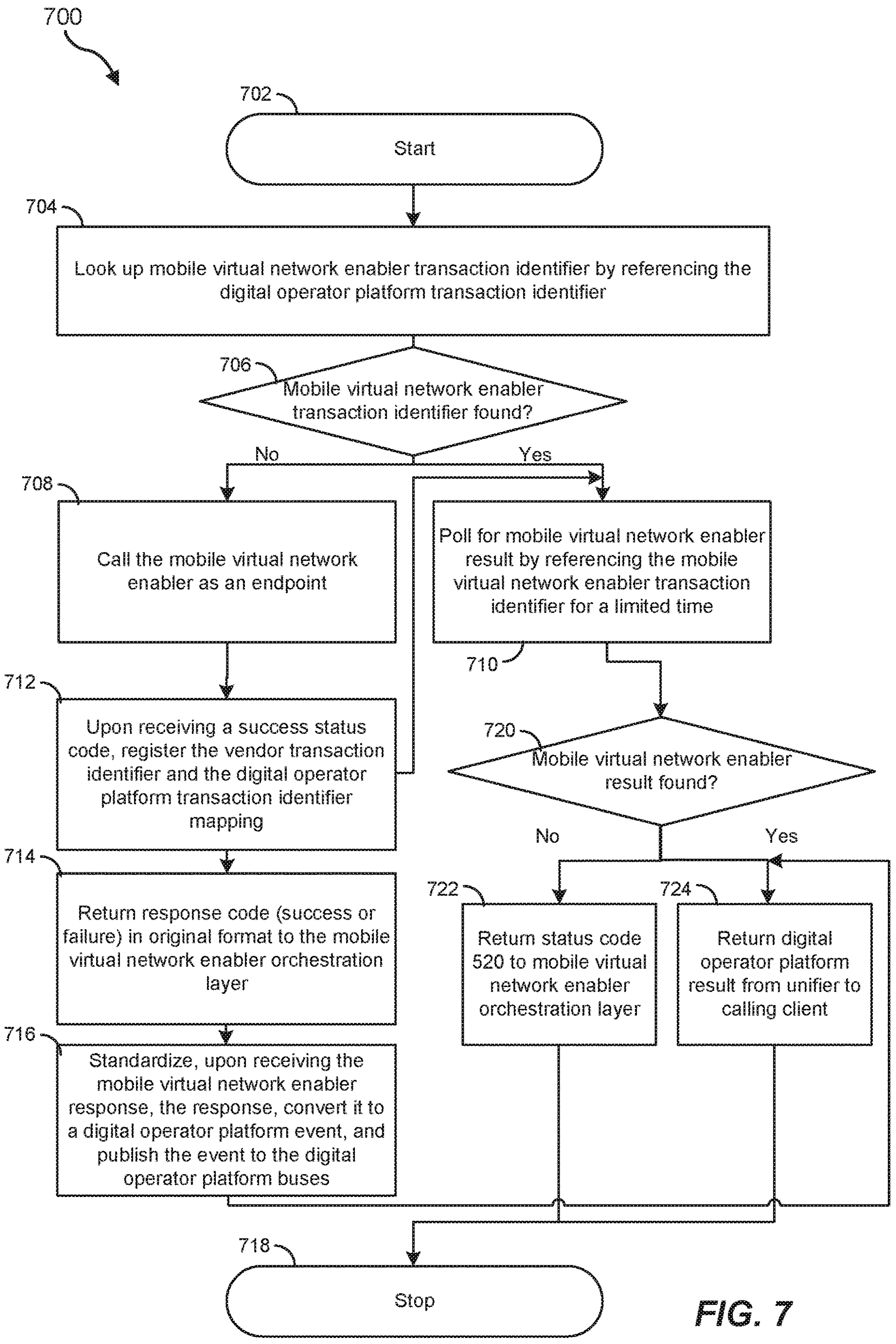
FIG. 7 shows a flow diagram for a method to be performed by a mobile virtual network enabler integration layer.

FIG. 7 shows a flow diagram for a method 700 to be performed by the mobile virtual network enabler integration layer. At step 702, method 700 may start or begin. At step 704, the mobile virtual network enabler integration layer may look up a mobile virtual network enabler transaction identifier by referencing the corresponding digital operator platform transaction identifier (see step 1 for the mobile virtual network enabler integration layer in diagram 400). At step 706, the mobile virtual network enabler integration layer may determine whether the mobile virtual network enabler transaction identifier was found or previously registered. If the answer is yes at step 706, then, at step 710, the mobile virtual network enabler integration layer may poll for the mobile virtual network enabler result by referencing the mobile virtual network enabler transaction identifier for a limited time (see step 2 for the mobile virtual network enabler integration layer in diagram 400). If the answer is no at step 706, or if the mobile virtual network enabler is synchronous, then at step 708 the mobile virtual network enabler integration layer may call the mobile virtual network enabler as an endpoint to request performance of the corresponding task (see step 3 for the mobile virtual network enabler integration layer in diagram 400). In response to the performance of step 710, at step 720, the mobile virtual network enabler integration layer may check whether the mobile virtual network enabler result was found or previously registered. If the answer is yes at step 720, then at step 724 the mobile virtual network enabler integration layer may return the digital operator platform result from the unifier to the calling client. If the answer is no at step 720, then at step 722 the mobile virtual network enabler integration layer may return status code 520, or otherwise report a server-side error or indication to retry the request, to the mobile virtual network enabler orchestration layer.

In response to the performance of step 708, at step 712, the mobile virtual network enabler integration layer may, upon receiving a success status code, register the vendor transaction identifier and/or the digital operator platform transaction identifier, as mapping information (see step 4 for the mobile virtual network enabler integration layer in diagram 400). Step 712 may be performed for asynchronous mobile virtual network enablers, whereas results from synchronous mobile virtual network enablers may be reported effectively immediately or in a synchronous manner without performing the registering of a mobile virtual network enabler transaction identifier and/or without polling for a final result. At step 714, the mobile virtual network enabler integration layer may return the response code, which can either be success or failure, in its original format to the mobile virtual network enabler orchestration layer (see step 5 for the mobile virtual network enabler integration layer in diagram 400). Despite the retaining of the original format, in the case of a 2XX success status code returned from an asynchronous mobile virtual network enabler, the mobile virtual network enabler integration layer may convert this success status code to a 5XX server-side error or other indication of server-side error or indication to retry the request, consistent with the discussion above for method 500. At step 716, the mobile virtual network enabler integration layer may standardize, upon receiving the mobile virtual network enabler response, the response by converting it to a digital operator platform event and publishing the event to the digital operator platform buses (see step 6 for the mobile virtual network enabler integration layer in diagram 400). The mobile virtual network enabler integration layer may also optionally register the mobile virtual network enabler result available flag to a mobile virtual network enabler transaction identifier mapping service. The setting of this flag may, in some embodiments, indicate to one or more other components within the digital operator platform that the final result has become available and/or this flag may be the target of one or more of the polling procedures discussed above checking for whether a final result has become available. At step 718, method 700 may stop or conclude.

Figure 8:
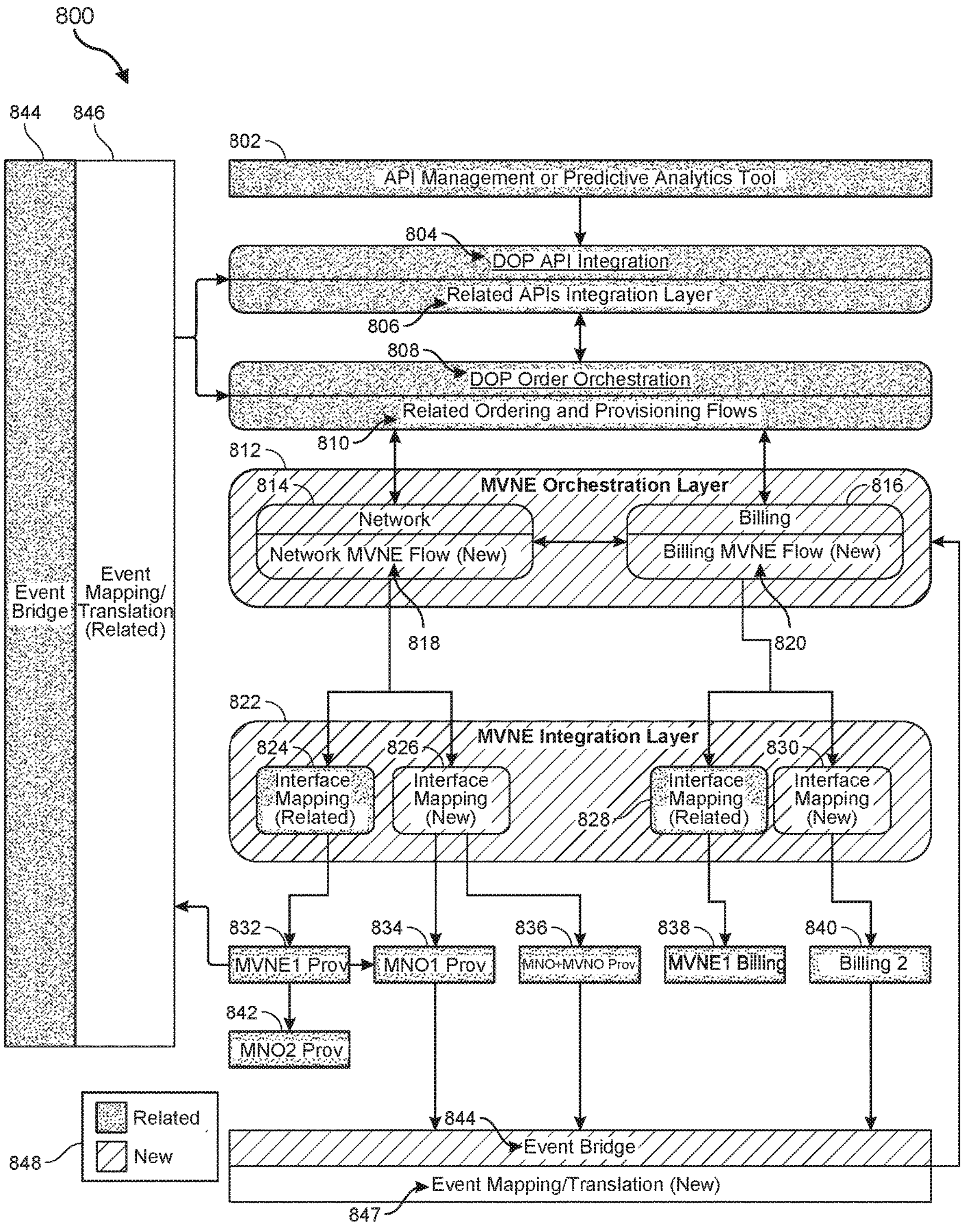
FIG. 8 shows a workflow diagram indicating how the interface for the digital operator platform may translate between identifiers assigned by mobile virtual network enablers and identifiers assigned by the mobile virtual network operator.

FIG. 8 shows a workflow diagram 800 indicating how the interface for the digital operator platform may translate between identifiers assigned by mobile virtual network enablers and identifiers assigned by the mobile virtual network operator. Workflow diagram 800 may include a related event bridge 844 and a related event mapping or translation service 846. These components may interface with an application programming interface management and/or predictive analytics tool 802 (e.g., an Apigee API tool or service), which may facilitate the client layer by managing the corresponding application programming interface. Application programming interface management and/or predictive analytics tool 802 may interface with digital operator platform application programming interface integration 804 as well as related application programming interfaces integration layer 806, which can integrate multiple distinct application programming interfaces. These components can further interface with the digital operator platform order orchestration 808 and/or related ordering and provisioning flows 810, as shown.

Consistent with the discussion above, workflow diagram 800 introduces a mobile virtual network enabler orchestration layer 812 and a mobile virtual network enabler integration layer 822. Mobile virtual network enabler orchestration layer 812 may include a network 814 with a network flow 818 and a billing component 816 with a billing flow 818, as well as a billing component 816 and a billing mobile virtual network enabler flow 820. These subcomponents may interface with a related interface mapping 824 and a new interface mapping 826 within mobile virtual network enabler integration layer 822, as well as a related interface mapping 828 and a new interface mapping 830, as shown. Workflow diagram 800 also further indicates how related interface mapping 824 may interface with the mobile virtual network enabler for provisioning services 832, a mobile network operator providing provisioning services 834, a mobile network operator functioning as a mobile virtual network operator providing provisioning services 836, a mobile virtual network enabler providing billing services 838 (which can be the same as or correspond to mobile virtual network enabler providing provisioning services 832), and a billing component 840. Lastly, workflow diagram 800 also illustrates how the above components may interface with an event bridge 844 and a new event mapping or translation service 847.

Figure 9:
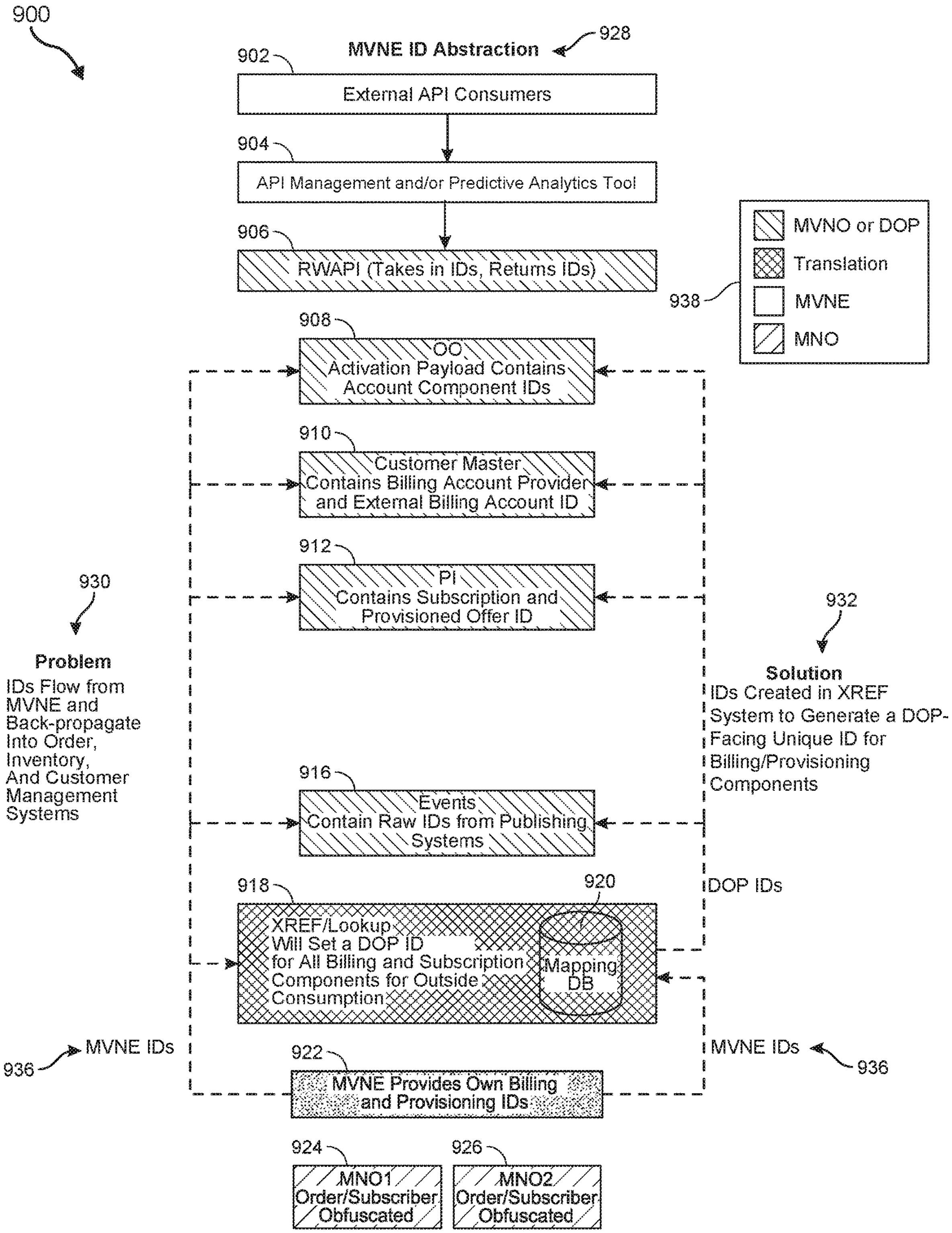
FIG. 9 shows a workflow diagram indicating how the interface for the digital operator platform may prevent identifiers assigned by the mobile virtual network enablers from being exposed to a client.

FIG. 9 shows a workflow diagram 900 indicating how the interface for the digital operator platform may prevent identifiers assigned by the mobile virtual network enablers from being exposed to a client. Indicator 928 highlights that workflow diagram 900 is generally directed to mobile virtual network enabler identifier abstraction and, in particular, obscuring, concealing, and/or translating identifiers assigned by mobile virtual network enablers, consistent with the discussion above. Workflow diagram 900 may begin with external application programming interface consumers 902, which may correspond to the client layer initiating request or communications with the digital operator platform. Subsequently, application programming interface management and/or predictive analytics tool 904 may handle the incoming communication from external application programming interface consumers 902. In particular, workflow diagram 900 indicates that retail wireless application programming interfaces 906 can accept and return digital operator platform identifiers. These may correspond to the more persistent or client-facing identifiers provided by the digital operator platform of the mobile virtual network operator based on translations or mappings with identifiers assigned by underlying mobile virtual network enablers, as discussed at length above.

Workflow diagram 900 also includes an order orchestrator 908, a customer master 910, a portfolio inventory 912, events 916, a cross reference component 918 including a mapping database 920, and a mobile virtual network enabler 922. The directional arrows connecting these various subcomponents help to illustrate how, without the translation procedures and/or the mobile virtual network enabler identifier abstraction procedures described above, the identifiers assigned by mobile virtual network enablers may circle back or back propagate from the mobile virtual network enablers into the digital operator platform, which can tend to tie external application programming interface consumers 902 into using those particular identifiers, which can tend to lock the mobile virtual network operator onto one or more mobile virtual network enablers, and/or which can create friction when attempting to attach, detach, switch, or substitute one or more mobile virtual network enablers with different mobile virtual network enablers.

In particular, indicator 930 highlights that the problem addressed by the various embodiments of the technologies within this disclosure can involve identifiers flowing from mobile virtual network enablers and back-propagating into order orchestrator 908, customer master 910, portfolio inventory 912, and/or related subcomponents of the digital operator platform. To help address this problem, an indicator 932 highlights a solution whereby identifiers created by cross reference component 918 are treated as client-facing or digital operator platform-facing unique identifiers, including potentially global unique identifiers, which can be mapped onto billing or provisioning components, as discussed above. Consistent with this discussion, two separate instances of an indicator 936 highlight how identifiers assigned by mobile virtual network enablers can flow into cross reference component 918, which can nevertheless translate these identifiers, and effectively abstract away from them, into digital operator platform identifiers at least in part by referencing mapping database 920. In this manner, not only do the mobile virtual network enablers obfuscate the order or subscriber numbers assigned by mobile network operator 924 and/or mobile network operator 926, the digital operator platform for a mobile virtual network operator (which can be configured to provide telecommunication services through multiple distinct mobile network operators, including potentially its own network infrastructure as a mobile network operator) also effectively obfuscates the identifiers assigned by the mobile virtual network enablers (i.e., the scenario effectively creates two layers of obfuscation while presenting a single, streamlined, more persistent, and more canonical or centralized identifier used within the digital operator platform and referenced by external application programming interface consumers 902). A legend 938 helps to highlight how different components of workflow diagram 900 belong to separate and distinct layers, as shown.

Figure 10:
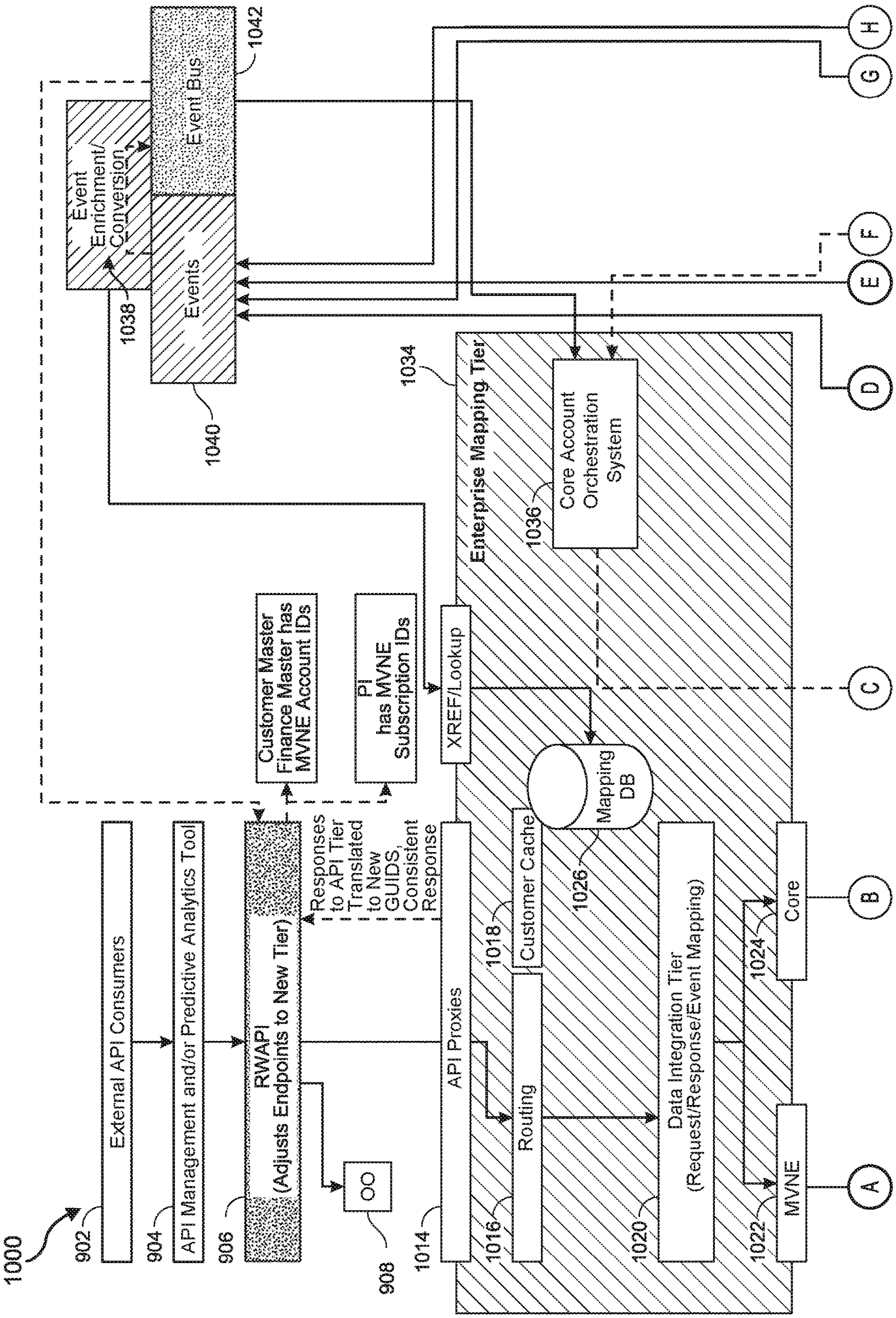
FIG. 10 shows a top portion of a workflow diagram of an interface for the digital operator platform.
Figure 11:
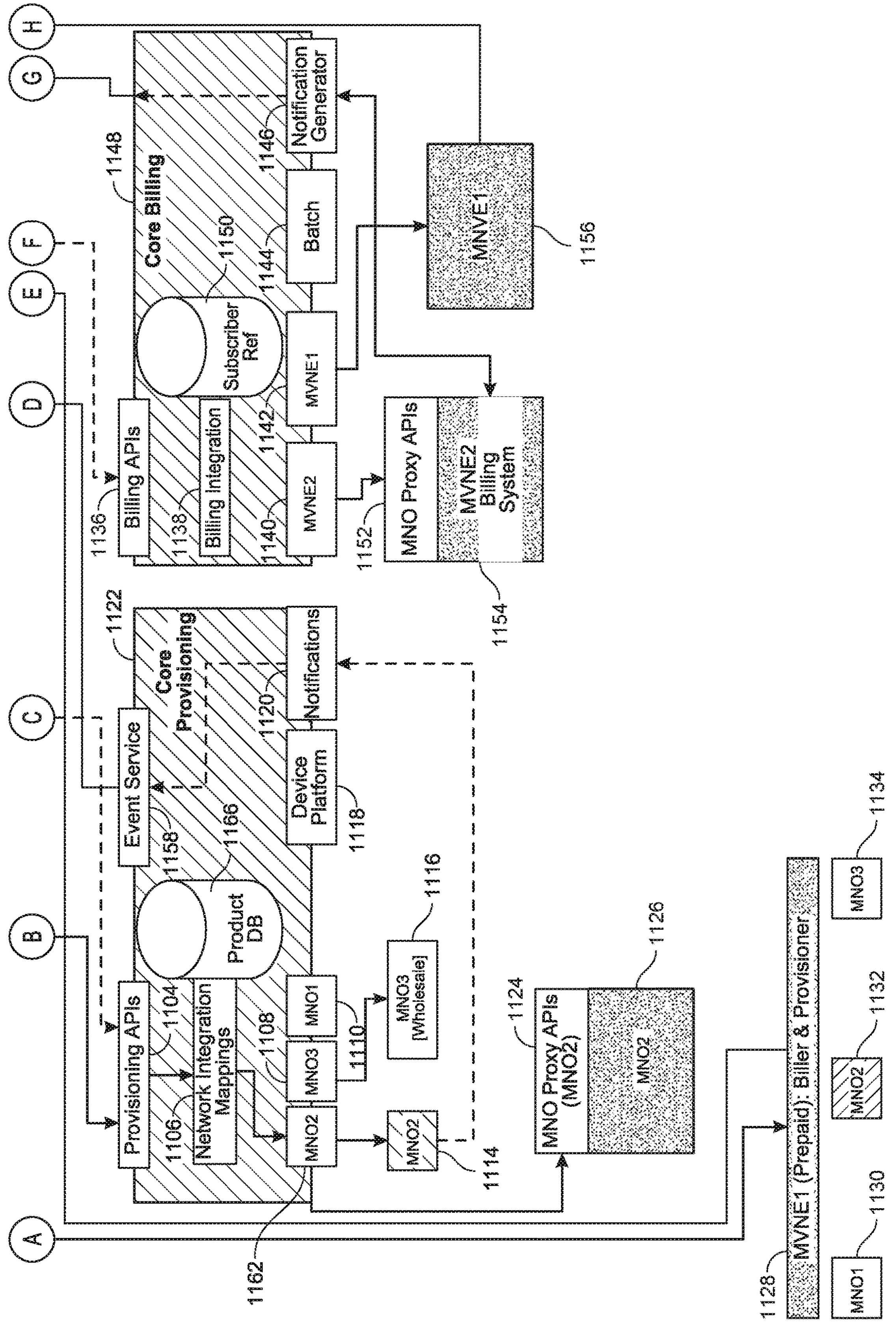
FIG. 11 shows a bottom portion of the workflow diagram of the interface for the digital operator platform.

FIG. 10 shows a top portion of a workflow diagram 1000 of an interface for the digital operator platform, and FIG. 11 shows a bottom portion of the workflow diagram of the interface for the digital operator platform. Workflow diagram 1000 may substantially parallel diagram 400 in several ways, as further discussed above, and workflow diagram 1000 is further included within this disclosure for completeness as another illustrative example of how the digital operator platform may operate in various embodiments. Different types of hatching within workflow diagram 1000 may help to group or associate together different subcomponents that are interrelated with each other, as shown.

Workflow diagram 1000 can begin with external application programming interface consumers 902, application programming interface management and/or predictive analytics tool 904, retail wireless application programming interface 906, and order orchestrator 908, as discussed above. These components may interface with an enterprise mapping tier 1034, which can correspond to the mobile virtual network enabler integration layer. Enterprise mapping tier 1034 may include application programming interface proxies 1014 forwarding requests to a routing component 1016, which can reference a customer cache 1018 and/or a mapping database 1026. Accordingly, routing component 1016 can further interface with data integration tier 1020 to forward requests from external application programming interface consumers 902 appropriately, as shown. Some of these requests may be forwarded to a mobile virtual network enabler 1022 and/or a core 1024. A core account orchestration system 1036 may receive communications from core provisioning 1122 and/or core billing 1148, which are further shown in FIG. 11.

Workflow diagram 1000 also illustrates how enterprise mapping tier 1034 can coordinate with other subcomponents within the digital operator platform through events 1040, an event bus 1042, and/or an event enrichment/conversion component 1038. Event enrichment/conversion component 1038 may correspond to the translation feature of method 500E, for example, as discussed in detail further above.

FIG. 11 continues the depiction of workflow diagram 1000. As shown, core provisioning 1122 may include provisioning application programming interfaces 1104 and event service 1158. Provisioning application programming interfaces 1104 may interface with network integration mappings 1106 at least in part by referencing a product database 1166 and directly communicating with a mobile network operator through a mobile network operator interface 1162. Core provisioning 1122 can also further include a mobile network operator interface 1108 and mobile network operator interface 1110 for communications with respect to mobile network operators, as shown. Core provisioning 1122 also includes a device platform 1118 and a notifications service 1120. Mobile network operator interface 1108 can interface with mobile network operator 1116, whereas mobile network operator interface 1162 can interface with mobile network operator 1114 through a notifications service 1120. As an alternative path, core provisioning 1122 can interface with mobile network operator proxy application programming interfaces 1124 for the same mobile network operator indicated by mobile network operator 1126 (e.g., the same mobile network operator as mobile network operator 1114). Workflow diagram 1100 illustrates how a mobile virtual network enabler 1128 can provide both billing and line provisioning services. In this illustrative example, the mobile virtual network enabler may provide or require prepaid billing plans. Workflow diagram 1100 illustrates how mobile virtual network enabler 1128 can facilitate services through a mobile network operator 1130, a mobile network operator 1132, and a mobile network operator 1134. The reader should understand that workflow diagram 1100 includes multiple references each to three mobile network operators, which are labeled as MNO1, MNO2, and MNO3, simply to facilitate the convenient illustration of how these three separate mobile network operators may interact with the digital operator platform, without suggesting that each separate instance or separate block with the same label creates additional or redundant mobile network operators.

Workflow diagram 1100 also illustrates how core billing 1148 may include billing application programming interfaces 1136, a billing integration 1138, and a subscriber reference database 1150. Core billing 1148 may interface with two separate mobile virtual network enablers, as shown. Mobile virtual network enabler interface 1140 can communicate with mobile network operator proxy application programming interfaces 1152 in coordination with a mobile virtual network enabler billing system 1154. Alternatively, core billing 1148 can utilize a mobile virtual network enabler interface 1142 to communicate with a mobile virtual network enabler 1156. Core billing 1148 can also include a batch service 1144 and a notification generator

1146. A notification generator 1146 can be used for communications with mobile virtual network enabler billing system 1154.

Generally speaking, workflow diagram 1100 helps illustrate how the digital operator platform may be configured to accommodate the differences in configuration or operations between different mobile network operators and/or between different mobile virtual network enablers when providing services to clients on behalf of the mobile virtual network operator. Some mobile virtual network enablers provide prepaid billing plans whereas others accommodate postpaid billing plans. Some mobile network operators require or prefer particular mobile virtual network enablers over other mobile virtual network enablers. Some mobile network operators can also function as mobile virtual network operators and/or can operate as wholesalers. Some mobile virtual network enablers communicate directly with the digital operator platform whereas others may communicate through a notifications service 1120 and/or a notification generator 1146, etc. Workflow diagram 1100 provides one illustrative example of how these differences between three separate mobile network operators and two specific mobile virtual network enablers can be accommodated by the overall digital operator platform provided by the mobile virtual network operator in this one particular embodiment for illustrative purposes.

Figure 12A:
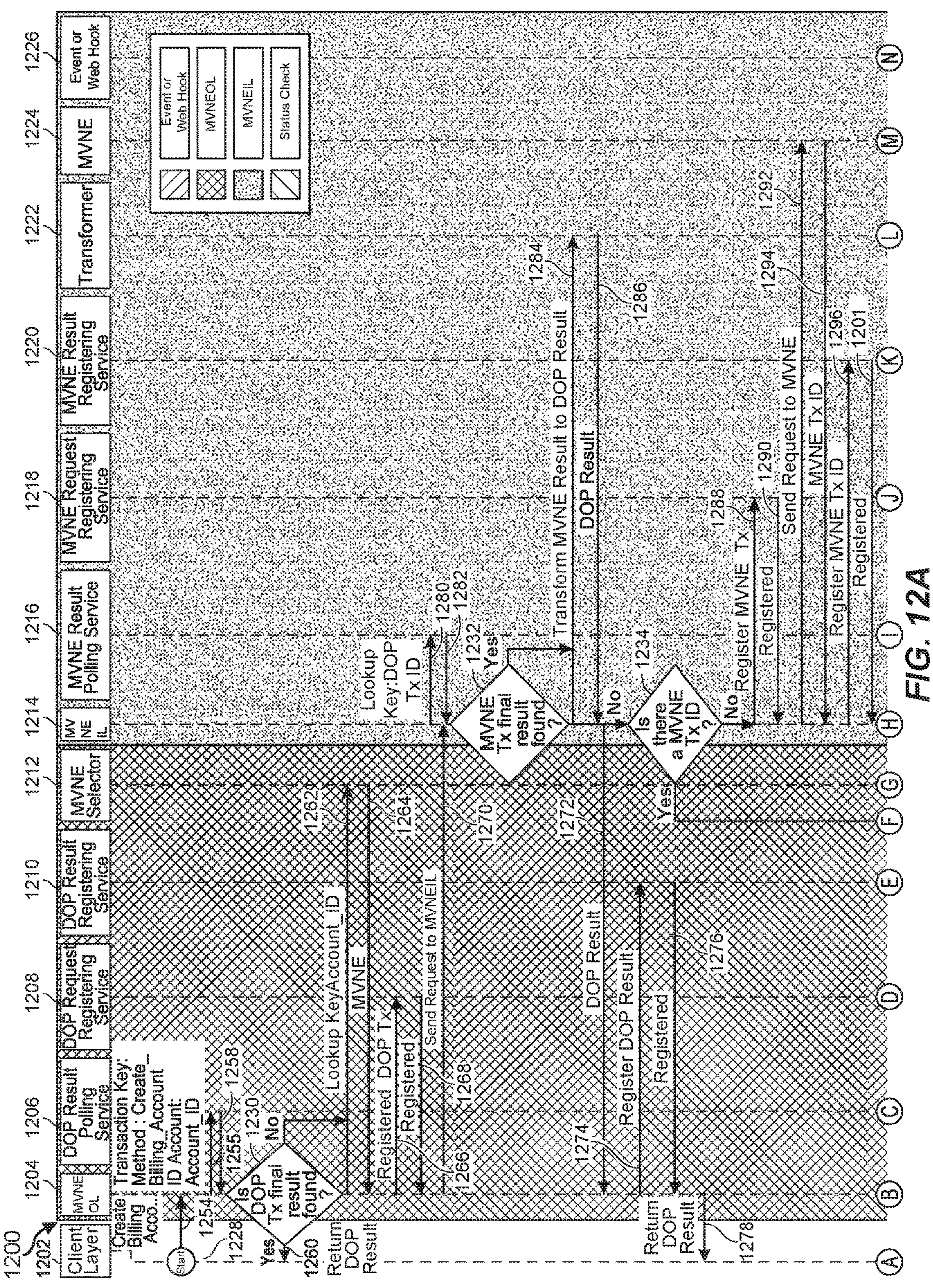
FIG. 12A shows a top portion of a timing diagram corresponding to the interface for the digital operator platform.
Figure 12B:
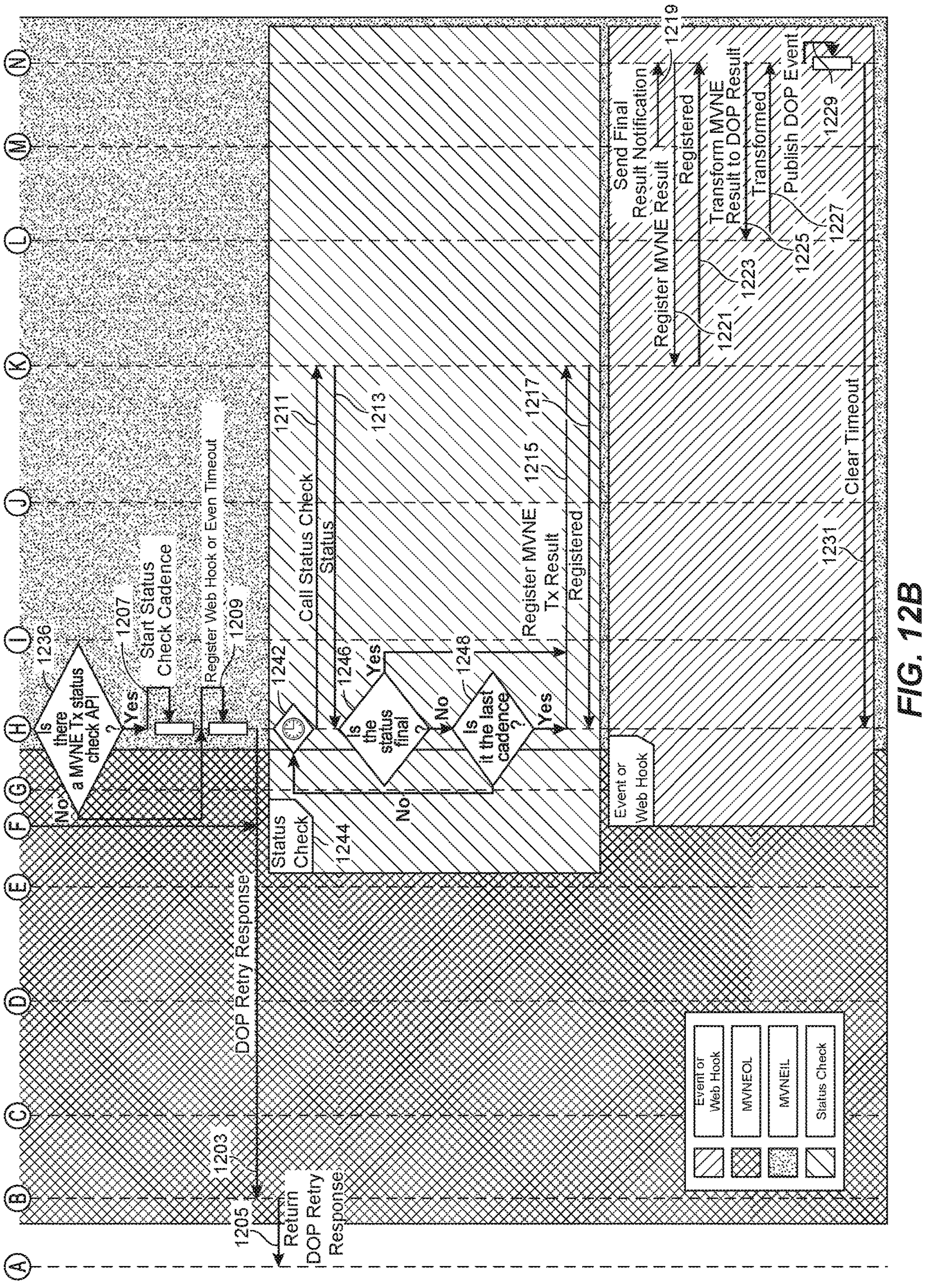
FIG. 12B shows a bottom portion of the timing diagram corresponding to the interface for the digital operator platform.

FIG. 12A shows a top portion of a timing diagram 1200 corresponding to the interface for the digital operator platform, and FIG. 12B shows a bottom portion of timing diagram 1200. Accordingly, timing diagram 1200 may provide more detail regarding specific embodiments of the functions and operations of the digital operator platform of diagram 400 and/or the flow diagrams of FIGS. 6-7. Generally speaking, timing diagram 1200 may indicate a timing of communications or interactions between different components associated with the digital operator platform, including a client layer 1202, the mobile virtual network enabler orchestration layer 1204, a digital operator platform result polling service 1206, a digital operator platform request registering service 1208, a digital operator platform result registering service 1210, a mobile virtual network enabler selector 1212, a mobile virtual network enabler integration layer 1214, a mobile virtual network enabler result polling service 1216, a mobile virtual network enabler request registering service 1218, a mobile virtual network enabler result registering service 1220, a transformer 1222, a mobile virtual network enabler 1224, and an event or web hook 1226. A legend indicates more broadly how different parts of timing diagram 1200 may be associated with event or web hook 1226, mobile virtual network enabler orchestration layer 1204, mobile virtual network enabler integration layer 1214, and/or a status check 1244.

As further shown within FIG. 12A, timing diagram 1200 may begin at a step 1228, which can trigger a step 1254 to create a billing account. Mobile virtual network enabler orchestration layer 1204 may at step 1255 poll digital operator platform result polling service 1206 using the newly created billing account identifier as a transaction key. In response, at step 1258, digital operator platform result polling service 1206 may indicate whether the digital operator platform transaction final result was found. If the answer is yes at step 1260, then mobile virtual network enabler orchestration layer 1204 may return the digital operator platform result to client layer 1202. If the answer is no at step 1230, then mobile virtual network enabler orchestration layer 1204 may call on mobile virtual network enabler selector 1212 to select a mobile virtual network enabler with which to perform the task requested by client layer 1202. At step 1266, mobile virtual network enabler orchestration layer 1204 may register the digital operator platform transaction identifier with digital operator platform request registering service 1208. In response, at step 1268, digital operator platform request registering service 1208 may return an indication that the digital operator platform transaction identifier has been registered, as shown.

Subsequently, at step 1270, mobile virtual network enabler orchestration layer 1204 may send the request to mobile virtual network enabler integration layer 1214. In response, mobile virtual network enabler integration layer 1214 may at step 1280 call on mobile virtual network enabler result polling service 1216 using the digital operator platform transaction identifier as a key to verify whether the mobile virtual network enabler transaction final result was found. At step 1282, mobile virtual network enabler result polling service 1216 may provide an indication of whether the mobile virtual network enabler transaction final result was found. If the answer is yes at step 1232, then mobile virtual network enabler integration layer 1214 can transform the mobile virtual network enabler result to a digital operator platform result at step 1284 using transformer 1222. In response, transformer 1222 may at step 1286 provide the digital operator platform result to mobile virtual network enabler integration layer 1214. Mobile virtual network enabler integration layer 1214 can also provide the digital operator platform result to mobile virtual network enabler orchestration layer 1204 at step 1272. Accordingly, at step 1278 mobile virtual network enabler orchestration layer 1204 may provide the digital operator platform result to client layer 1202.

On the other hand, if the answer is no at step 1232, then mobile virtual network enabler integration layer 1214 can check whether there is a mobile virtual network enabler transaction identifier registered with the unifier. If the answer is no at step 1234, then mobile virtual network enabler integration layer 1214 can register the mobile virtual network enabler transaction identifier at step 1288 with mobile virtual network enabler request registering service 1218. In response, at step 1290, mobile virtual network enabler request registering service 1218 can indicate that the mobile virtual network enabler transaction identifier has been successfully registered. Similarly, at step 1292, mobile virtual network enabler integration layer 1214 can send the request to mobile virtual network enabler 1224, and at step 1294, mobile virtual network enabler 1224 can provide the mobile virtual network enabler transaction identifier. At step 1296, mobile virtual network enabler integration layer 1214 can register the mobile virtual network enabler transaction identifier with mobile virtual network enabler result registering service 1220, and in response at step 1201, mobile virtual network enabler result registering service 1220 can provide an indication to mobile virtual network enabler integration layer 1214 that the mobile virtual network enabler transaction identifier was successfully registered.

FIG. 12B continues the depiction of timing diagram 1200. At step 1236, mobile virtual network enabler integration layer 1214 can check whether there is a mobile virtual network enabler transaction status check application programming interface. If the answer is yes at step 1236, then mobile virtual network enabler integration layer 1214 can check on the status using the application programming interface by starting the status check cadence at step 1207. If the answer is no at step 1236, then mobile virtual network enabler integration layer 1214 can register a web hook or event timeout 1209. This portion of timing diagram 1200 also indicates how, if the answer is yes at step 1234 (see FIG. 12A), then mobile virtual network enabler integration layer 1214 may return a digital operator platform retry response at step 1203, which can further trigger mobile virtual network enabler orchestration layer 1204 to return the digital operator platform retry response at step 1205, as shown.

Timing diagram 1200 also indicates how status check 1244 may trigger a timer 1242, which can invoke a status check with mobile virtual network enabler result registering service 1220 at step 1211, which can trigger mobile virtual network enabler result registering service 1220 to provide a corresponding status at a step 1213. Subsequently, at step 1246 mobile virtual network enabler integration layer 1214 can check whether the status is final. If the answer is yes at step 1246, then mobile virtual network enabler integration layer 1214 can register the mobile virtual network enabler transaction result with mobile virtual network enabler result registering service 1220. In response, mobile virtual network enabler result registering service 1220 can at step 1217 provide an indication to mobile virtual network enabler integration layer 1214 that the mobile virtual network enabler transaction result was successfully registered.

In contrast, with respect to web hook or event timeout 1209, mobile virtual network enabler 1224 may send a final result notification at step 1219 to event or web hook 1226. In response, at step 1221, event or web hook 1226 may register the mobile virtual network enabler result with mobile virtual network enabler result registering service 1220. Furthermore, mobile virtual network enabler result registering service 1220 can provide an indication at step 1223 that the result was registered to event or web hook 1226. In response, at step 1225, event or web hook 1226 may transform the mobile virtual network enabler result to a standardized or digital operator platform result by using transformer 1222. Accordingly, at step 1227, transformer 1222 can provide the transformed result back to event or web hook 1226. At step 1229, event or web hook 1226 can publish the digital operator platform event including the standardized response. Moreover, event or web hook 1226 can clear the timeout by providing a clear timeout indication to mobile virtual network enabler integration layer 1214 at step 1231, as shown.

Figure 13:
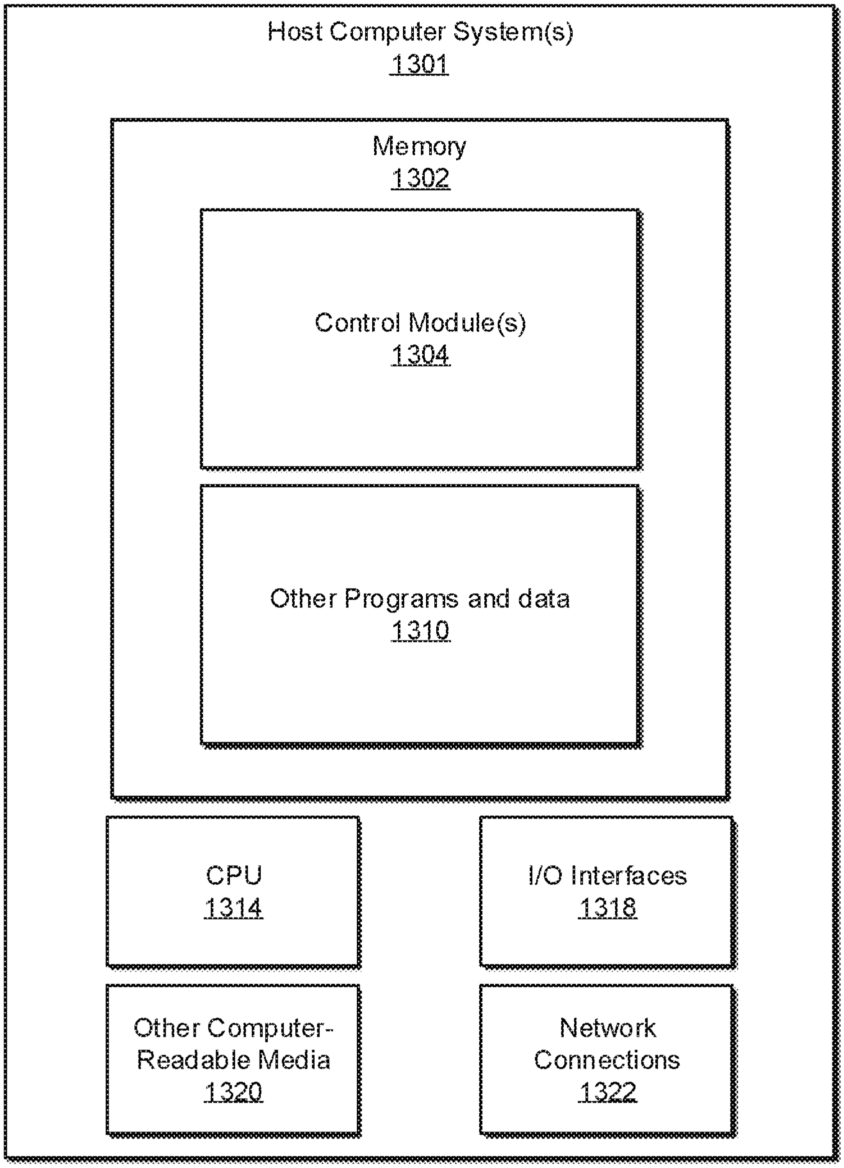
FIG. 13 shows an example computing system that may facilitate the performance of one or more of the methods described herein.

FIG. 13 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 13 illustrates an example of underlying hardware on which such software and functionality may be hosted and/or implemented.

In particular, shown is example host computer system(s) 1301. For example, such computer system(s) 1301 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1301 may include memory 1302, one or more central processing units (CPUs) 1314, I/O interfaces 1318, other computer-readable media 1320, and network connections 1322.

Memory 1302 may include one or more various types of non-volatile and/or volatile storage technologies. Examples of memory 1302 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1302 may be utilized to store information, including computer-readable instructions that are utilized by CPU 1314 to perform actions, including those of embodiments described herein.

Memory 1302 may have stored thereon control module(s) 1304. The control module(s) 1304 may be configured to implement and/or perform some or all of the functions of the systems or components described herein. Memory 1302 may also store other programs and data 1310, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1322 are configured to communicate with other computing devices to facilitate the functionality described herein. In various embodiments, the network connections 1322 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1318 may include a video interface, other data input or output interfaces, or the like. Other computer-readable media 1320 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

receiving, by a mobile virtual network operator from a client of the mobile virtual network operator, a request to perform a task relating to a telecommunication account of the client with the mobile virtual network operator;

forwarding, by the mobile virtual network operator, the request to perform the task to a mobile virtual network enabler by referencing a first client identifier that the mobile virtual network enabler assigned to the telecommunication account;

mapping, by the mobile virtual network operator, the first client identifier that the mobile virtual network enabler assigned to the telecommunication account onto a second client identifier that the mobile virtual network operator assigned to the telecommunication account and that is distinct from the first client identifier; and reporting, by the mobile virtual network operator to the client, that the task has been completed at least in part by referencing the second client identifier such that the mobile virtual network operator avoids exposing the first client identifier to the client as part of completing the task.

2. The method of claim 1, wherein the mapping provides a modular application programming interface that enables the mobile virtual network enabler to be replaced while persisting the second client identifier that the mobile virtual network operator assigned to the telecommunication account.

3. The method of claim 1, wherein the mapping prevents locking of the mobile virtual network operator onto the mobile virtual network enabler.

4. The method of claim 1, wherein the task relating to the telecommunication account of the client comprises a resource exchange task.

5. The method of claim 1, wherein the task relating to the telecommunication account of the client comprises a line provisioning task.

6. The method of claim 1, wherein the mobile virtual network enabler is configured to handle both line provisioning tasks and resource exchange tasks for the mobile virtual network operator.

7. The method of claim 6, wherein the mobile virtual network operator assigns the mobile virtual network enabler to handle one of line provisioning and resource exchange tasks for the client and assigns a different mobile virtual network enabler to handle the other of line provisioning and resource exchange tasks for the client.

8. The method of claim 1, wherein the mobile virtual network operator maintains a profile for the client that includes a field that designates the mobile virtual network enabler as handling a type of the task for the client.

9. The method of claim 8, wherein the profile includes a second field that designates a different mobile virtual network enabler as handling a second and distinct type of task for the client.

10. The method of claim 1, wherein:

the mobile virtual network operator maintains the first client identifier as secret from the client; or the mobile virtual network operator maintains the second client identifier as secret from the mobile virtual network enabler.

11. A non-transitory computer-readable medium that has instructions stored thereon that, when executed by at least one physical computing processor, cause a computing device to perform operations comprising:

receiving, by a mobile virtual network operator from a client of the mobile virtual network operator, a request to perform a task relating to a telecommunication account of the client with the mobile virtual network operator;

forwarding, by the mobile virtual network operator, the request to perform the task to a mobile virtual network enabler by referencing a first client identifier that the mobile virtual network enabler assigned to the telecommunication account;

mapping, by the mobile virtual network operator, the first client identifier that the mobile virtual network enabler assigned to the telecommunication account onto a second client identifier that the mobile virtual network operator assigned to the telecommunication account and that is distinct from the first client identifier; and reporting, by the mobile virtual network operator to the client, that the task has been completed at least in part by referencing the second client identifier such that the mobile virtual network operator avoids exposing the first client identifier to the client as part of completing the task.

12. The non-transitory computer-readable medium of claim 11, wherein the operations are configured such that the mapping provides a modular application programming interface that enables the mobile virtual network enabler to be replaced while persisting the second client identifier that the mobile virtual network operator assigned to the telecommunication account.

13. The non-transitory computer-readable medium of claim 11, wherein the operations are configured such that the mapping prevents locking of the mobile virtual network operator onto the mobile virtual network enabler.

14. The non-transitory computer-readable medium of claim 11, wherein the task relating to the telecommunication account of the client comprises a resource exchange task.

15. The non-transitory computer-readable medium of claim 11, wherein the task relating to the telecommunication account of the client comprises a line provisioning task.

16. The non-transitory computer-readable medium of claim 11, wherein the operations are configured such that the mobile virtual network enabler can handle both line provisioning tasks and resource exchange tasks for the mobile virtual network operator.

17. The non-transitory computer-readable medium of claim 16, wherein the operations are configured such that the mobile virtual network operator assigns the mobile virtual network enabler to handle one of line provisioning and resource exchange tasks for the client and assigns a different mobile virtual network enabler to handle the other of line provisioning and resource exchange tasks for the client.

18. The non-transitory computer-readable medium of claim 11, wherein the operations are configured such that the mobile virtual network operator maintains a profile for the client that includes a field that designates the mobile virtual network enabler as handling a type of the task for the client.

19. The non-transitory computer-readable medium of claim 18, wherein the profile includes a second field that designates a different mobile virtual network enabler as handling a second and distinct type of task for the client.

20. A system comprising:

at least one physical computing processor of a computing device; and a non-transitory computer-readable medium that has instructions stored thereon that, when executed by the at least one physical computing processor, cause the computing device to perform operations comprising:

receiving, by a mobile virtual network operator from a client of the mobile virtual network operator, a request to perform a task relating to a telecommunication account of the client with the mobile virtual network operator;

forwarding, by the mobile virtual network operator, the request to perform the task to a mobile virtual network enabler by referencing a first client identifier that the mobile virtual network enabler assigned to the telecommunication account;

mapping, by the mobile virtual network operator, the first client identifier that the mobile virtual network enabler assigned to the telecommunication account onto a second client identifier that the mobile virtual network operator assigned to the telecommunication account and that is distinct from the first client identifier; and reporting, by the mobile virtual network operator to the client, that the task has been completed at least in part by referencing the second client identifier such that the mobile virtual network operator avoids exposing the first client identifier to the client as part of completing the task.

* * * * *